(12) United States Patent
Aaldenberg et al.

(10) Patent No.: US 12,384,719 B2
(45) Date of Patent: Aug. 12, 2025

(54) GLASS COMPOSITIONS AND STRENGTHENED GLASS LAMINATE ARTICLES COMPRISING THE SAME

(71) Applicant: CORNING INCORPORATED, Corning, NY (US)

(72) Inventors: Emily Marie Aaldenberg, Corning, NY (US); Timothy Michael Gross, Painted Post, NY (US); Charlene Marie Smith, Corning, NY (US); Jingshi Wu, Painted Post, NY (US); Zheming Zheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/567,832

(22) PCT Filed: Jun. 8, 2022

(86) PCT No.: PCT/US2022/032593
§ 371 (c)(1),
(2) Date: Dec. 7, 2023

(87) PCT Pub. No.: WO2022/261155
PCT Pub. Date: Dec. 15, 2022

(65) Prior Publication Data
US 2024/0270636 A1 Aug. 15, 2024

Related U.S. Application Data

(60) Provisional application No. 63/209,489, filed on Jun. 11, 2021.

(51) Int. Cl.
C03C 21/00 (2006.01)
C03C 23/00 (2006.01)

(52) U.S. Cl.
CPC .......... *C03C 21/002* (2013.01); *C03C 23/007* (2013.01); *C03C 2203/52* (2013.01)

(58) Field of Classification Search
CPC .... C03C 23/007; C03C 21/007; C03C 21/002
See application file for complete search history.

(56) References Cited

U.S. PATENT DOCUMENTS

| 4,214,886 A | 7/1980 | Shay et al. |
| 9,346,699 B2 | 5/2016 | Amosov et al. |

(Continued)

FOREIGN PATENT DOCUMENTS

WO 2020/180516 A1 9/2020

OTHER PUBLICATIONS

G.W. Sherer, Relaxation in Glass and Composites, Published by John Wiley and Sons, Inc. 1986, p. 331.

(Continued)

*Primary Examiner* — Erin Snelting
(74) *Attorney, Agent, or Firm* — Russell S. Magaziner

(57) ABSTRACT

A glass composition includes from 60 mol % to 76 mol % $SiO_2$; from 7 mol % to 16 mol % $Al_2O_3$; from 0 mol % to 12 mol % $B_2O_3$; and from 0 mol to 14 mol % $Na_2O$. $(R_2O+RO)/Al_2O_3$ in the glass composition may be greater than or equal to 1. A glass laminate article includes a core glass layer having a low temperature coefficient of thermal expansion ($LTCTE_{core}$) and a high temperature coefficient of thermal expansion ($HTCTE_{core}$): a clad glass layer laminated to a surface of the core glass layer, the clad glass layer having a low temperature coefficient of thermal expansion ($LTCTE_{clad}$) and a high temperature coefficient of thermal expansion ($HTCTE_{clad}$); and a thickness t.

21 Claims, 24 Drawing Sheets

(56) References Cited

U.S. PATENT DOCUMENTS

| | | |
|---|---|---|
| 9,522,836 B2 | 12/2016 | Gulati et al. |
| 10,196,295 B2 | 2/2019 | Gulati et al. |
| 2014/0141217 A1* | 5/2014 | Gulati .................... C03C 3/087 |
| | | 428/375 |
| 2015/0140299 A1 | 5/2015 | Ellison et al. |
| 2015/0166407 A1* | 6/2015 | Varshneya ............ C03C 21/003 |
| | | 428/220 |
| 2015/0210583 A1 | 7/2015 | Amosov et al. |
| 2015/0314571 A1 | 11/2015 | Cites et al. |
| 2016/0347639 A1 | 12/2016 | Hu et al. |
| 2017/0297308 A1 | 10/2017 | Golyatin et al. |
| 2019/0023606 A1 | 1/2019 | Kiczenski et al. |
| 2019/0030861 A1* | 1/2019 | Bellman ................. C03B 17/02 |
| 2020/0307164 A1 | 10/2020 | Gross et al. |
| 2020/0307165 A1 | 10/2020 | Gross et al. |
| 2022/0009204 A1 | 1/2022 | Peng et al. |

OTHER PUBLICATIONS

International Search Report and Written Opinion of the International Searching Authority; PCT/US2022/032593; mailed on Jan. 5, 2022, 21 pages; European Patent Office.

L. Rongved, et al., "Mechanical Tempering of Optical Fibers," J. Non-Cryst. Solids, vol. 42, 1980, pp. 579-584.

M. Tomozawa, et al., "Surface Stress Relaxation and Resulting Residual Stress in Glass Fibers: A New Mechanical Strengthening Mechanism of Glasses," J. non-Cryst. Solids, vol. 358, 2012, pp. 2650-2662.

O.S. Narayanaswamy, A model of structural relaxation in glass, Journal of the American Ceramic Society, vol. 54, 197, pp. 491-498.

P.J. Lezzi, et al., "Strength Increase of Silica Glass Fibers by Surface Stress Relaxation: A New Mechanical Strengthening Method," J. Non-Cryst. Solids, vol. 379, 2013, pp. 95-106.

T.M. Gross, et al., "A Glass with high Crack Initiation Load: Role of Fictive Temperature-Independent Mechanical Properties," J. Non-Cryst. Solids, vol. 355, 2009, pp. 563-568.

T.M. Gross, et al., "Crack-Resistant Glass with High Shear Band Density," J. Non-Cryst. Solids, vol. 494, 2018, pp. 13-20.

T.M. Gross, et al., "Low Modulus, Damage Resistant Glass for Ultra-Thin Applications," Flexible Glass ed. Sean Garner, 2017, pp. 63-84.

G.W. Scherer, "Relaxation in Glass and Composites", Published by John Wiley and Sons, Inc. 1986.

Gulati et al., "Theory of the Narrow Sandwich Seal", J. Am. Ceram. Soc. 1978, 4 pages.

Narayanaswamy, "A model of structural relaxation in glass", Journal of the American Ceramic Society, 54 (1971), pp. 491-498.

U.S. Appl. No. 63/209,489, titled "Glass Compositions and Strengthened Glass Laminate Articles Comprising the Same", filed on Jun. 11, 2021.

* cited by examiner

GLASS COMPOSITIONS AND STRENGTHENED GLASS LAMINATE ARTICLES COMPRISING THE SAME

CROSS-REFERENCE TO RELATED APPLICATIONS

This application claims the benefit of priority under 35 U.S.C. § 371 of International Application No. PCT/US2022/032593, filed on Jun. 8, 2022, which claims the benefit of priority under 35 U.S.C. § 119 of U.S. Provisional Application No. 63/209,489 filed Jun. 11, 2021, the content of which is incorporated herein by reference in its entirety.

FIELD

The present specification generally relates to glass compositions and, in particular, to glass compositions that may be utilized in glass laminate articles having increased surface compressive stress.

TECHNICAL BACKGROUND

Glass articles, such as cover glass, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associate device. Accordingly, glass articles used in electronic devices may require enhanced strength to be able to withstand not only routine "touch" contact form actual use, but also incidental contact and impacts that may occur when the device is being transported.

Therefore, a continuing need exists for glass compositions that may be subjected to various strengthening processes, including lamination processes and chemical tempering, to produce strengthened glass articles.

SUMMARY

According to a first aspect A1, a glass composition may comprise: greater than or equal to 60 mol % and less than or equal to 76 mol % $SiO_2$; greater than or equal to 7 mol % and less than or equal to 16 mol % $Al_2O_3$; greater than 0 mol % and less than or equal to 12 mol % $B_2O_3$; and greater than or equal to 0 mol and less than or equal to 14 mol % $Na_2O$, wherein $(R_2O+RO)/Al_2O_3$ is greater than or equal to 1, wherein $R_2O$ is the sum of $Li_2O$, $Na_2O$, and $K_2O$ and RO is the sum of MgO, CaO, SrO, and BaO.

A second aspect A2 includes the glass composition according to the first aspect A1, wherein the glass composition comprises greater than or equal to 5 mol and less than or equal to 12 mol % $Na_2O$.

A third aspect A3 includes the glass composition according to the first aspect A1 or the second aspect A2, wherein the glass composition comprises greater than or equal to 1 mol % and less than or equal to 10 mol % $B_2O_3$.

A fourth aspect A4 includes the glass composition according to any one of the first through third aspects A1-A3, wherein the glass composition comprises greater than or equal to 8 mol % and less than or equal to 15 mol % $Al_2O_3$.

A fifth aspect A5 includes the glass composition according to any one of the first through fourth aspects A1-A4, wherein the glass composition comprises greater than or equal to 60 mol % and less than or equal to 74 mol % $SiO_2$.

A sixth aspect A6 includes the glass composition according to any one of the first through fifth aspects A1-A5, wherein the glass composition comprises greater than or equal to 0 mol % and less than or equal to 5 mol % $P_2O_5$.

A seventh aspect A7 includes the glass composition according to any one of the first through sixth aspects A1-A6, wherein RO is greater than or equal to 0 mol % and less than or equal to 10 mol %.

An eighth aspect A8 includes the glass composition according to any one of the first through seventh aspects A1-A7, wherein $R_2O$ is greater than or equal to 7 mol % and less than or equal to 16 mol %.

A ninth aspect A9 includes the glass composition according to any one of the first through eighth aspects A1-A8, wherein the glass composition comprises: greater than or equal to 0 mol % and less than or equal to 5 mol % $Li_2O$; and greater than or equal to 0 mol % and less than or equal to 3 mol % $K_2O$.

A tenth aspect A10 includes the glass composition according to any one of the first through ninth aspects A1-A9, wherein the glass composition comprises: greater than or equal to 0 mol % and less than or equal to 7 mol % MgO; greater than or equal to 0 mol % and less than or equal to 10 mol % CaO; greater than or equal to 0 mol % and less than or equal to 3 mol % SrO; and greater than or equal to 0 mol % and less than or equal to 3 mol % BaO.

An eleventh aspect A11 includes the glass composition according to any one of the first through tenth aspects A1-A10, wherein the glass composition comprises greater than 0 mol % and less than or equal to 2 mol % $SnO_2$.

A twelfth aspects A12 includes the glass composition according to the first aspect A1, wherein the glass composition comprises: greater than or equal to 65 mol % and less than or equal to 74 mol % $SiO_2$; greater than or equal to 8 mol % and less than or equal to 11 mol % $Al_2O_3$; greater than or equal to 7 mol % and less than or equal to 10 mol % $B_2O_3$; greater than or equal to 0 mol % and less than or equal to 3 mol % $P_2O_5$; greater than or equal to 0 mol % and less than or equal to 3 mol % $Li_2O$; greater than or equal to 7.5 mol % and less than or equal to 11 mol % $Na_2O$; greater than or equal to 0 mol % and less than or equal to 5 mol % MgO; and greater than or equal to 0 mol % and less than or equal to 5 mol % CaO.

A thirteenth aspect A13 includes the glass composition according to the first aspect A1, wherein the glass composition comprises: greater than or equal to 60 mol % and less than or equal to 70 mol % $SiO_2$; greater than or equal to 10 mol % and less than or equal to 15 mol % $Al_2O_3$; greater than 0 mol % and less than or equal to 7 mol % $B_2O_3$; greater than or equal to 0 mol % and less than or equal to 5 mol % $P_2O_5$; greater than or equal to 7.5 mol % and less than or equal to 12 mol % $Na_2O$; and greater than or equal to 0 mol % and less than or equal to 7 mol % MgO.

A fourteenth aspect A14 includes a glass laminate article comprising: a core glass layer; a clad glass layer laminated to a surface of the core glass layer; wherein the clad glass layer is formed from the glass composition according to any one of the first through thirteenth aspects A1-A13.

A fifteenth aspect A15 includes the glass laminate article according to the fourteenth aspect A14, wherein the core glass layer is formed from a glass composition comprising greater than or equal to 60 mol % and less than or equal to 73 mol % SiO$_2$; greater than 0 mol % and less than or equal to 10 mol % Al$_2$O$_3$; greater than or equal to 1 mol % and less than or equal to 12 mol % CaO; and greater than or equal to 3 mol % and less than or equal to 15 mol % Na$_2$O.

According to a sixteenth aspect A16, a glass composition may comprise: greater than or equal to 60 mol % and less than or equal to 73 mol % SiO$_2$; greater than 0 mol % and less than or equal to 16.5 mol % Al$_2$O$_3$; greater than or equal to 1 mol % and less than or equal to 12 mol % CaO; and greater than or equal to 3 mol % and less than or equal to 15 mol % Na$_2$O.

A seventeenth aspect A17 includes the glass composition according to the sixteenth aspect A16, wherein the glass composition comprises greater than or equal to 0 mol % and less than or equal to 24 mol % B$_2$O$_3$.

An eighteenth aspect A18 includes the glass composition according to the seventeenth aspect A17, wherein the glass composition comprises greater than or equal to 1 mol % and less than or equal to 20 mol % B$_2$O$_3$.

A nineteenth aspect A19 includes the glass composition according to any one of the sixteenth through eighteenth aspects A16-A18, wherein the glass composition comprises greater than or equal to 5 mol % and less than or equal to 14.5 mol % Na$_2$O.

A twentieth aspect A20 includes the glass composition according to the nineteenth aspect A19, wherein the glass composition comprises greater than or equal to 7 mol % and less than or equal to 14 mol % Na$_2$O.

A twenty-first aspect A21 includes the glass composition according to any one of the sixteenth through twentieth aspects A16-A20, wherein the glass composition comprises greater than or equal to 0 mol % and less than or equal to 6 mol % K$_2$O.

A twenty-second aspect A22 includes the glass composition according to the twenty-first aspect A21, wherein the glass composition comprises greater than or equal to 0.25 mol % and less than or equal to 5 mol % K$_2$O.

A twenty-third aspect A23 includes the glass composition according to any one of the sixteenth through twenty-second aspects A16-A22, wherein the glass composition comprises greater than or equal to 0 mol % and less than or equal to 10 mol % Li$_2$O.

A twenty-fourth aspect A24 includes the glass composition according to any one of the sixteenth through twenty-third aspects A16-A23, wherein the glass composition comprises greater than or equal to 0.5 mol % and less than or equal to 13 mol % Al$_2$O$_3$.

A twenty-fifth aspect A25 includes the glass composition according to any one of the sixteenth through twenty-fourth aspects A16-A24, wherein R$_2$O is greater than or equal to 3 mol % and less than or equal to 20 mol % is the sum of Li$_2$O, Na$_2$O, and K$_2$O.

A twenty-sixth aspect A26 includes the glass composition according to the twenty-fifth aspect A25, wherein R$_2$O is greater than or equal to 5 mol % and less than or equal to 18 mol %.

A twenty-seventh aspect A27 includes the glass composition according to any one of the sixteenth through twenty-sixth aspects A16-A26, wherein the glass composition comprises greater than or equal to 0 mol % and less than or equal to 10 mol % MgO.

A twenty-eighth aspect A28 includes the glass composition according to the twenty-seventh aspect A27, wherein the glass composition comprises greater than or equal to 2 mol % and less than or equal to 8 mol % MgO.

A twenty-ninth aspect A29 includes the glass composition according to any one of the sixteenth through twenty-eighth aspects A16-A28, wherein the glass composition comprises greater than or equal to 0 mol % and less than or equal to 0.5 mol % SnO$_2$.

A thirtieth aspect A30 includes a glass laminate article comprising: a core glass layer, a clad glass layer laminated to a surface of the core glass layer, wherein: the core glass layer is formed from the glass composition of any one of the sixteenth through twenty-ninth aspects A16-A29.

According to a thirty-first aspect A31, a glass laminate article may comprise: a core glass layer having a low temperature coefficient of thermal expansion (LTCTE$_{core}$) and a high temperature coefficient of thermal expansion (HTCTE$_{core}$); a clad glass layer laminated to a surface of the core glass layer, the clad glass layer having a low temperature coefficient of thermal expansion (LTCTE$_{clad}$) and a high temperature coefficient of thermal expansion (HTCTE$_{clad}$); and a thickness t, wherein the glass laminate satisfies the relationship:

$$\int_{25°C}^{T_{11}^{lower}} [CTE_{core}(T) - CTE_{clad}(T)]dT > 400 \ ppm$$

where $T_{11}^{lower}$ is the lower $10^{11}$ poise temperature of the core glass layer and the clad glass layer; and wherein at temperatures lower than $T_{11}^{lower}$, CTE$_{clad}$ is less than CTE$_{core}$.

A thirty-second aspect A32 includes the glass laminate article according to the thirty-first aspect A31, wherein |LTCTE$_{clad}$−LTCTE$_{core}$| is less than |HTCTE$_{clad}$−HTCTE$_{core}$|.

A thirty-third aspect A33 includes the glass laminate article according to the thirty-first aspect A31 or the thirty-second aspect A32, wherein an annealing point of the clad glass layer is greater than an annealing point of the core glass layer.

A thirty-fourth aspect A34 includes the glass laminate article according to any one of the thirty-first through thirty-third aspects A31-A33, wherein the clad glass layer is formed from a glass composition comprising greater than or equal to 7 mol % Na$_2$O.

A thirty-fifth aspect A35 includes the glass laminate article according to any one of the thirty-first through thirty-fourth aspects A31-A34, wherein the annealing point of the clad glass layer is greater than or equal to 525° C. and less than or equal to 715° C.

A thirty-sixth aspect A36 includes the glass laminate article according to any one of the thirty-first through thirty-fifth aspects A31-A35, wherein the annealing point of the core glass layer is greater than or equal to 500° C. and less than or equal to 600° C.

A thirty-seventh aspect A37 includes the glass laminate article according to any one of the thirty-first through thirty-sixth aspects A31-A36, wherein a thickness of the clad glass layer (t$_{clad}$) is greater than or equal to 0.2 t and a surface compressive stress of the glass laminate article is greater than or equal to 25 MPa.

A thirty-eighth aspect A38 includes the glass laminate article according to any one of the thirty-first through thirty-seventh aspects A31-A37, wherein a thickness of the clad glass layer (t$_{clad}$) is greater than or equal to 0.25 t and a surface compressive stress of the glass laminate article is greater than or equal to 25 MPa.

A thirty-ninth aspect A39 includes the glass laminate article according to any one of the thirty-first through thirty-eighth aspects A31-A38, wherein the clad glass layer is formed from a glass composition comprising: greater than or equal to 60 mol % and less than or equal to 76 mol % $SiO_2$; greater than or equal to 7 mol % and less than or equal to 16 mol % $Al_2O_3$; greater than 0 mol % and less than or equal to 12 mol % $B_2O_3$; and greater than or equal to 0 mol and less than or equal to 14 mol % $Na_2O$, wherein ($R_2O$+RO)/$Al_2O_3$ is greater than or equal to 1, wherein $R_2O$ is the sum of $Li_2O$, $Na_2O$, and $K_2O$ and RO is the sum of MgO, CaO, SrO, and BaO.

A fortieth aspect A40 include the glass laminate article according to any one of the thirty-first through thirty-ninth aspects A31-A39, wherein the core glass layer is formed from a glass composition comprising: greater than or equal to 60 mol % and less than or equal to 73 mol % $SiO_2$; greater than 0 mol % and less than or equal to 16.5 mol % $Al_2O_3$; greater than or equal to 1 mol % and less than or equal to 12 mol % CaO; and greater than or equal to 3 mol % and less than or equal to 15 mol % $Na_2O$.

A forty-first aspect A41 includes the glass laminate article according to any one of the thirty-first through fortieth aspects A31-A40, wherein the glass laminate article is strengthened in an ion-exchange bath at a temperature greater than or equal to 350° C. to less than or equal to 500° C. for a time period greater than or equal to 2 hours to less than or equal to 12 hours to form an ion-exchanged glass laminate article.

A forty-second aspect A42 includes the glass laminate article according to any one of the thirty-first through thirty-eighth aspects A31-A38, wherein the clad glass layer is formed from a glass composition comprising: greater than or equal to 63 mol % and less than or equal to 70 mol % $SiO_2$; greater than or equal to 8 mol % and less than or equal to 13 mol % $Al_2O_3$; greater than or equal to 0 mol % and less than or equal to 12 mol % $B_2O_3$; greater than or equal to 0 mol % and less than or equal to 14 mol % $Na_2O$; greater than or equal to 0 mol % and less than or equal to 3 mol % $K_2O$; greater than or equal to 0.5 mol % and less than or equal to 7 mol % MgO; greater than or equal to 0.5 mol % and less than or equal to 10 mol % CaO; and greater than or equal to 0 mol % and less than or equal to 2 mol % SrO; and wherein the core glass layer is formed from a glass composition comprising: greater than or equal to 63 mol % and less than or equal to 70 mol % $SiO_2$; greater than or equal to 0.5 mol % and less than or equal to 5 mol % $Al_2O_3$; greater than or equal to 1 mol % and less than or equal to 20 mol % $B_2O_3$; greater than or equal to 0 mol % and less than or equal to 8 mol % MgO; greater than or equal to 1 mol % and less than or equal to 12 mol % CaO; greater than or equal to 2 mol % and less than or equal to 15 mol % $Na_2O$; and greater than or equal to 0 mol % and less than or equal to 6 mol % $K_2O$.

A forty-third aspect A43 includes the glass laminate article according to any one of the thirty-first through thirty-eighth aspects A31-A38, wherein the clad glass layer is formed from a glass composition comprising: greater than or equal to 63 mol % and less than or equal to 76 mol % $SiO_2$; greater than or equal to 7 mol % and less than or equal to 16 mol % $Al_2O_3$; greater than or equal to 1 mol % and less than or equal to 12 mol % $B_2O_3$; greater than or equal to 7 mol % and less than or equal to 14 mol % $Na_2O$; greater than or equal to 0 mol % and less than or equal to 3 mol % $K_2O$; greater than or equal to 0 mol % and less than or equal to 5 mol % $Li_2O$; greater than or equal to 0 mol % and less than or equal to 7 mol % MgO; greater than or equal to 0 mol % and less than or equal to 3 mol % CaO; and greater than or equal to 0 mol % and less than or equal to 5 mol % $P_2O_5$; and wherein the core glass layer is formed from a glass composition comprising: greater than or equal to 60 mol % and less than or equal to 73 mol % $SiO_2$; greater than or equal to 1 mol % and less than or equal to 16.5 mol % $Al_2O_3$; greater than or equal to 0 mol % and less than or equal to 8 mol % $B_2O_3$; greater than or equal to 0 mol % and less than or equal to 8 mol % MgO; greater than or equal to 0 mol % and less than or equal to 10 mol % $Li_2O$; greater than or equal to 9 mol % and less than or equal to 15 mol % $Na_2O$; greater than or equal to 0 mol % and less than or equal to 5 mol % $K_2O$; and greater than or equal to 0 mol % and less than or equal to 5 mol % $P_2O_5$.

According to an aspect, a method of manufacturing a strengthened glass article includes forming a glass-to-glass laminate by fusing clad and core glasses to one another, where the clad glass has a greater high-temperature coefficient of thermal expansion (HTCTE) than the core glass but a lesser low-temperature coefficient of thermal expansion (LTCTE) than the core glass. The method further includes cooling the glass-to-glass laminate to impart stresses through contraction mismatch between the clad and core glasses, where stresses in the glass-to-glass laminate from differences in the HTCTE of the clad and core glasses at least partially offset stresses in the glass-to-glass laminate from differences in the LTCTE of the clad and core glasses. After the cooling, the method includes modifying geometry of the laminate (e.g., cutting, polishing, sigulating, bending, scoring). After the modifying, the method includes relaxing at least some of the stresses in the glass-to-glass laminate from differences in the HTCTE of the clad and core glasses such that the stresses in the glass-to-glass laminate from differences in the LTCTE of the clad and core glasses change stresses in the clad glass.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
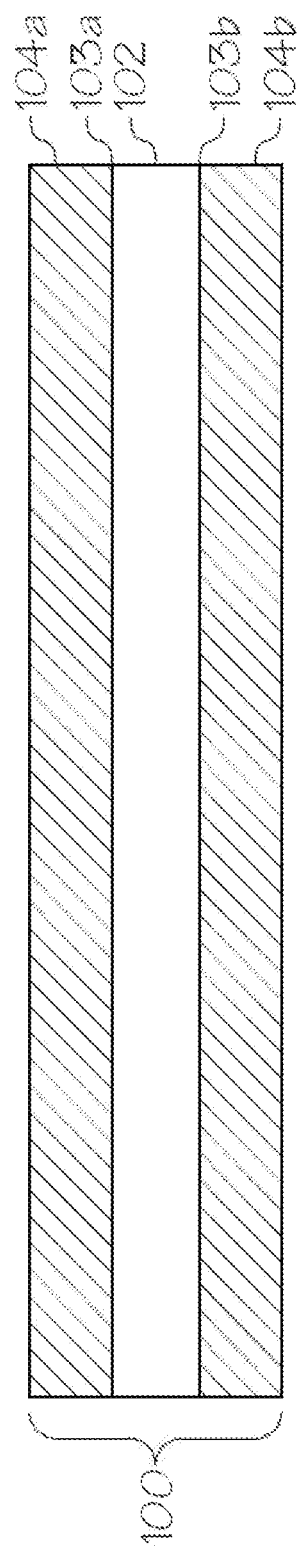
FIG. 1 is a cross-sectional view of a glass laminate article according to one or more embodiments described herein.

Reference will now be made in detail to various embodiments of glass compositions for forming strengthened glass laminate articles. According to embodiments, a glass composition includes greater than or equal to 60 mol % and less than or equal to 76 mol % SiO$_2$; greater than or equal to 7 mol % and less than or equal to 16 mol % Al$_2$O$_3$; greater than 0 mol % and less than or equal to 12 mol % B$_2$O$_3$; and greater than or equal to 0 mol and less than or equal to 14 mol % Na$_2$O. (R$_2$O+RO)/Al$_2$O$_3$ in the glass composition may be greater than or equal to 1. According to embodiments, a glass composition includes greater than or equal to 60 mol % and less than or equal to 73 mol % SiO$_2$; greater than 0 mol % and less than or equal to 16.5 mol % Al$_2$O$_3$; greater or equal to 0 mol % and less than or equal to 24 mol % B$_2$O$_3$; greater than or equal to 1 mol % and less than or equal to 12 mol % CaO; and greater than or equal to 3 mol % and less than or equal to 15 mol % Na$_2$O. According to embodiments, a glass laminate article includes a core glass layer having a low temperature coefficient of thermal expansion (LTCTE$_{core}$) and a high temperature coefficient of thermal expansion (HTCTE$_{core}$); a clad glass layer laminated to a surface of the core glass layer, the clad glass layer having a low temperature coefficient of thermal expansion (LTCTE$_{clad}$) and a high temperature coefficient of thermal expansion (HTCTE$_{clad}$); and a thickness t. The glass laminate article satisfies the relationship:

$$\int_{25°C.}^{T_{11}^{lower}} [CTE_{core}(T) - CTE_{clad}(T)]dT > 400 \ ppm$$

where $T_{11}^{lower}$ is the lower $10^{11}$ poise temperature of the core glass layer and the clad glass layer. At temperatures lower than $T_{11}^{lower}$, CTE$_{clad}$ is less than CTE$_{core}$. Various embodiments of glass compositions and strengthened glass laminate articles formed therefrom will be described herein with specific reference to the appended drawings.

Ranges may be expressed herein as from "about" one particular value, and/or to "about" another particular value.

When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in mole percent (mol %) on an oxide basis, unless otherwise specified.

The term "substantially free," when used to describe the concentration and/or absence of a particular element or compound in a glass composition, means that the element or compound is not intentionally added to the glass composition. However, the glass composition may contain traces of the element or compound as a contaminant or tramp in amounts of less than 0.1 mol %.

The terms "0 mol %" and "free," when used to describe the concentration and/or absence of a particular constituent component in a glass composition, means that the constituent component is not present in glass composition.

The term "Vogel-Fulcher-Tamman ('VFT') relation," as used herein, describes the temperature dependence of the viscosity and is represented by the following equation:

$$\log \eta = A + \frac{B}{T - T_o}$$

where η is viscosity. To determine VFT A, VFT B, and VFT $T_o$, the viscosity of the glass composition is measured over a given temperature range. The raw data of viscosity versus temperature is then fit with the VFT equation by least-squares fitting to obtain A, B, and $T_o$. With these values, a viscosity point (e.g., 200 P Temperature, 35 k P Temperature, 100 k P Temperature, and 200 k P Temperature) at any temperature above softening point may be calculated.

The term "melting point," as used herein, refers to the temperature at which the viscosity of the glass composition is 200 poise as measured in accordance with ASTM C338.

The term "softening point," as used herein, refers to the temperature at which the viscosity of the glass composition is $1 \times 10^{7.6}$ poise. The softening point is measured according to the parallel plate viscosity method which measures the viscosity of inorganic glass from $10^7$ to 109 poise as a function of temperature, similar to ASTM C1351M.

The term "annealing point" or "effective annealing temperature," as used herein, refers to the temperature at which the viscosity of the glass composition is $1 \times 10^{13.18}$ poise as measured in accordance with ASTM C598.

The term "strain point," as used herein, refers to the temperature at which the viscosity of the glass composition is $1 \times 10^{14.68}$ poise as measured in accordance with ASTM C598.

Density, as described herein, is measured by the buoyancy method of ASTM C693-93.

The terms "coefficient of thermal expansion" or "CTE," as used herein, refer to an average CTE over a particular range of temperatures. The "low temperature CTE" or "LTCTE" of the glass composition is averaged over a temperature range from about 20° C. to about 300° C. The terms "high temperature CTE" or "HTCTE," as used herein, refer to the CTE of the glass composition at the minimum temperature at which the glass has a viscosity of $10^{11}$ Poise (the $T_{11}$ temperature). Because the $T_{11}$ temperature varies depending on the particular composition, when a difference in high temperature coefficient of thermal expansion (ΔHTCTE) is referenced, it refers to a difference in the CTE of the glass compositions at the lower $T_{11}$ of the pair of glass compositions. CTE is measured by digital image correlation, which determines thermal expansion and instantaneous coefficient of thermal expansion of a glass composition on cooling through the glass transition zone with a cooling rate of 2° C./s.

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

The elastic modulus (also referred to as Young's modulus) of the glass composition, as described herein, is provided in units of gigapascals (GPa) and is measured in accordance with ASTM C623.

The shear modulus of the glass composition, as described herein, is provided in units of gigapascals (GPa). The shear modulus of the glass composition is measured in accordance with ASTM C623.

Poisson's ratio, as described herein, is measured in accordance with ASTM C623.

Refractive index, as described herein, is measured in accordance with ASTM E1967.

As used herein, "peak compressive stress" refers to the highest compressive stress (CS) value measured within a compressive stress region. In embodiments, the peak compressive stress is located at the surface of the glass article. In other embodiments, the peak compressive stress may occur at a depth below the surface, giving the compressive stress profile the appearance of a "buried peak." Unless specified otherwise, compressive stress (including surface CS) is measured by surface stress meter (FSM) using commercially available instruments, for example, the FSM- 6000, manufactured by Orihara Industrial Co., Ltd. (Japan). Surface stress measurements rely upon the accurate measurement of the stress optical coefficient (SOC) which is related to the birefringence of the glass article. SOC in turn is measured according to Procedure C (Glass Disk Method) described in ASTM C770-16, entitled "Standard Test Method for measurement of Glass Stress-Optical Coefficient." The maximum central tension (CT) values are measured using a Scattered Light Polariscope (SCALP), such as a SCALP-05 portable scattered light polariscope. The values reports for central tension (CT) herein refer to the maximum central tension, unless otherwise indicated.

According to the convention normally used in the art, compression or compressive stress (CS) is expressed as a negative (i.e., <0) stress and tension or tensile stress is expressed as a positive (i.e., >0) stress. Throughout this description, however, CS is expressed as a positive or absolute value (i.e., as recited herein, CS=|CS|).

As used herein, "depth of compression" (DOC) refers to the depth at which the stress within the glass article changes from compressive to tensile. At the DOC, the stress crosses from a compressive stress to a tensile stress and thus exhibits a stress value of zero. Depth of compression is measured using a surface stress meter, for example, a FSM-6000 surface stress meter, in conjunction with SCALP. FSM measures the depth of compression for potassium ion-exchange and SCALP measures the depth of compression for sodium ion-exchange. As used herein, "depth of layer" (DOL) refers to the depth within a glass article at which an ion of metal oxide diffuses into the glass article where the concentration of the ion reaches a minimum value. DOL may be measured using electron probe microanalysis (EPMA).

Lamination processes, such as fusion-draw or thermal bonding, may be used to produce strengthened glass articles, such as glass laminate articles. The glass laminate articles may include a core glass layer formed from a core glass composition positioned between a pair of clad glass layers formed from a clad glass composition. Conventionally, the core glass composition and clad glass composition combination is selected to produce a sufficient LTCTE difference between the core glass layer and clad glass layer (i.e., $\Delta LTCTE=|LTCTE_{clad}-LTCTE_{core}|$) such that the desired compressive stress is achieved.

In particular, the compressive stress in the clad glass layer due to the LTCTE differential between the core glass layer and clad glass layer may be approximated by the following equation:

$$\sigma_{clad} \approx \frac{(\alpha_{clad}-\alpha_{core})\cdot \Delta T}{\frac{1}{kE_{core}^{eff}}+\frac{1}{E_{clad}^{eff}}} \quad (1)$$

where $\alpha_{clad}$ and $\alpha_{core}$ are the $LTCTE_{clad}$ and the $LTCTE_{core}$, $\Delta T$ is the temperature minus 25° C. of the lower strain point of the clad glass layer or the core glass layer (i.e., $\Delta T$=strain point$^{lower}$–25° C.), and $E^{eff}$ is the elastic modulus. $E^{eff}$ is related with Poisson's ratio $v$ by the following equation, where E is the measured Young's modulus:

$$E^{eff} = \frac{E}{(1+v)(1-2v)} \quad (2)$$

and k is a thickness ratio of the core glass layer to clad glass layer:

$$k = \frac{t_{core}}{2t_{clad}} \quad (3)$$

where $t_{core}$ is the thickness of the core glass layer and $t_{clad}$ is the thickness of the clad glass layer. However, laminated silicate glass compositions may not develop sufficient compressive stress to withstand certain applications, e.g., mitigating impact stresses in day to day use, due to the limited amount of expansion differential between clad glass compositions and core glass compositions.

Disclosed herein are glass compositions and glass laminate articles formed therefrom which mitigate the aforementioned problems. Specifically, the glass compositions disclosed herein may be selected to form a glass laminate article having the desired compressive stress by ensuring there is a sufficient differential across the entire CTE curve from room temperature to above the glass transition temperature. Evaluating the entire CTE curve takes into consideration both the LTCTE differential and the HTCTE differential between the core glass layer and the clad glass layers.

Clad Glass Compositions

The clad glass compositions described herein may be described as aluminoborosilicate glass compositions and comprise $SiO_2$, $Al_2O_3$, and $B_2O_3$. The clad glass compositions described herein may also include alkali oxides, such as $Na_2O$, to enable the ion-exchangeability of the clad glass compositions.

$SiO_2$ is the primary glass former in the clad glass compositions described herein and may function to stabilize the network structure of the clad glass compositions. The concentration of $SiO_2$ in the clad glass compositions should be sufficiently high (e.g., greater than or equal to 60 mol %) to provide basic glass forming capability. The amount of $SiO_2$ may be limited (e.g., to less than or equal to 76 mol %) to control the melting point of the clad glass composition, as the melting temperature of pure $SiO_2$ glasses or glasses with relatively high $SiO_2$ concentrations is undesirably high. Thus, limiting the concentration of $SiO_2$ may aid in improving the meltability and the formability of the clad glass composition.

Accordingly, in embodiments, the clad glass composition may comprise greater than or equal to 60 mol % and less than or equal to 76 mol % $SiO_2$. In embodiments, the clad glass composition may comprise greater than or equal to 60 mol % and less than or equal to 74 mol % $SiO_2$. In embodiments, the clad glass composition may comprise greater than or equal to 65 mol % and less than or equal to 74 mol % $SiO_2$. In embodiments, the clad glass composition may comprise greater than or equal to 60 mol % and less than or equal to 70 mol % $SiO_2$. In embodiments, the concentration of $SiO_2$ in the clad glass composition may be greater than or equal to 60 mol %, greater than or equal to 63 mol %, or even greater than or equal to 65 mol %. In embodiments, the concentration of $SiO_2$ in the clad glass composition may be less than or equal to 76 mol %, less than or equal to 74 mol %, less than or equal to 72 mol %, or even less than or equal to 70 mol %. In embodiments, the concentration of $SiO_2$ in the clad glass composition may be greater than or equal to 60 mol % and less than or equal to 76 mol %, greater than or equal to 60 mol % and less than or equal to 74 mol %, greater than or equal to 60 mol % and less than or equal to 72 mol %, greater than or equal to 60 mol % and less than or equal to 70 mol %, greater than or equal to 63 mol % and less than or equal to 76 mol %, greater than or equal to 63 mol % and less than or equal to 74 mol %, greater than or equal to 63 mol % and less than or equal to 72 mol %, greater than or equal to 63 mol % and less than or equal to 70 mol %, greater than or equal to 65 mol % and less than or equal to 76 mol %, greater than or equal to 65 mol % and less than or equal to 74 mol %, greater than or equal to 65 mol % and less than or equal to 72 mol %, or even greater than or equal to 65 mol % and less than or equal to 70 mol %, or any and all sub-ranges formed from any of these endpoints.

Like $SiO_2$, $Al_2O_3$ may also stabilize the glass network and additionally provides improved mechanical properties and chemical durability to the clad glass composition. The amount of $Al_2O_3$ may also be tailored to the control the viscosity of the clad glass composition. The concentration of $Al_2O_3$ should be sufficiently high (e.g., greater than or equal to 7 mol %) such that the clad glass composition has the desired mechanical properties (e.g., Young's modulus greater than or equal to 55 GPa). However, if the concentration of $Al_2O_3$ is too high (e.g., greater than 16 mol %), the viscosity of the melt may increase, thereby diminishing the formability of the clad glass composition. In embodiments, the clad glass composition may comprise greater than or equal to 7 mol % and less than or equal to 16 mol % $Al_2O_3$. In embodiments, the clad glass composition may comprise greater than or equal to 8 mol % and less than or equal to 15 mol % $Al_2O_3$. In embodiments, the clad glass composition may comprise greater than or equal to 8 mol % and less than or equal to 11 mol % $Al_2O_3$. In embodiments, the clad glass composition may comprise greater than or equal to 10 mol % and less than or equal to 15 mol % $Al_2O_3$. In embodiments, the concentration of $Al_2O_3$ in the clad glass composition may be greater than or equal to 7 mol %, greater than or equal to 8 mol %, greater than or equal to 9 mol %, or even greater than or equal to 10 mol %. In embodiments, the concentration of $Al_2O_3$ in the clad glass composition may be less than or equal to 16 mol %, less than or equal to 15 mol %, less than or equal to 14 mol % less than or equal to 13 mol %, less than or equal to 12 mol %, or even less than or equal to 11 mol %. In embodiments, the concentration of $Al_2O_3$ in the clad glass composition may be greater than or equal to 7 mol % and less than or equal to 16 mol %, greater than or equal to 7 mol % and less than or equal to 15 mol %, greater than or equal to 7 mol % and less than or equal to 14 mol %, greater than or equal to 7 mol % and less than or equal to 13 mol %, greater than or equal to 7 mol % and less than or equal to 12 mol %, greater than or equal to 7 mol % and less than or equal to 11 mol %, greater than or equal to 8 mol % and less than or equal to 16 mol %, greater than or equal to 8 mol % and less than or equal to 15 mol %, greater than or equal to 8 mol % and less than or equal to 14 mol %, greater than or equal to 8 mol % and less than or equal to 13 mol %, greater than or equal to 8 mol % and less than or equal to 12 mol %, greater than or equal to 8 mol % and less than or equal to 11 mol %, greater than or equal to 9 mol % and less than or equal to 16 mol %, greater than or equal to 9 mol % and less than or equal to 15 mol %, greater than or equal to 9 mol % and less than or equal to 14 mol %, greater than or equal to 9 mol % and less than or equal to 13 mol %, greater than or equal to 9 mol % and less than or equal to 12 mol %, greater than or equal to 9 mol % and less than or equal to 11 mol %, greater than or equal to 10 mol % and less than or equal to 16 mol %, greater than or equal to 10 mol % and less than or equal to 15 mol %, greater than or equal to 10 mol % and less than or equal to 14 mol %, greater than or equal to 10 mol % and less than or equal to 13 mol %, greater than or equal to 10 mol % and less than or equal to 12 mol %, or even greater than or equal to 10 mol % and less than or equal to 11 mol %, or any and all sub-ranges formed from any of these endpoints.

$B_2O_3$ decreases the melting temperature of the clad glass composition. In addition, $B_2O_3$ may also improve the damage resistance of the clad glass composition. When boron in the clad glass composition is not charge balanced by alkali oxides or divalent cation oxides (such as MgO, CaO, SrO, BaO, and ZnO), the boron will be in a trigonal-coordination state (or three-coordinated boron), which opens up the structure of the glass. The network around these three-coordinated boron atoms is not as rigid as tetrahedrally coordinated (or four-coordinated) boron. Without being bound by theory, it is believed that clad glass compositions that include three-coordinated boron can tolerate some degree of deformation before crack formation compared to four-coordinated boron. By tolerating some deformation, the Vickers indentation crack initiation threshold values increase. Fracture toughness of the clad glass compositions that include three-coordinated boron may also increase. The concentration of $B_2O_3$ should be sufficiently high (e.g., greater than 0 mol %) to improve the formability and increase the fracture toughness of the clad glass composition. However, if $B_2O_3$ is too high, the chemical durability and liquidus viscosity may diminish and volatilization and evaporation of $B_2O_3$ during melting becomes difficult to control. Therefore, the amount of $B_2O_3$ may be limited (e.g., less than or equal to 12 mol %) to maintain chemical durability and manufacturability of the clad glass composition.

In embodiments, the clad glass composition may comprise greater than 0 mol % and less than or equal to 12 mol % $B_2O_3$. In embodiments, the clad glass composition may comprise greater than or equal to 1 mol % and less than or equal to 10 mol % $B_2O_3$. In embodiments, the clad glass composition may comprise greater than or equal to 7 mol % and less than or equal to 10 mol % $B_2O_3$. In embodiments, the clad glass composition may comprise greater than or equal to 0 mol % and less than or equal to 7 mol % $B_2O_3$. In embodiments, the concentration of $B_2O_3$ in the clad glass composition may be greater than 0 mol %, greater than or equal to 1 mol %, greater than or equal to 3 mol %, greater than or equal to 5 mol %, or even greater than or equal to 7 mol %. In embodiments, the concentration of $B_2O_3$ in the clad glass composition may be less than or equal to 12 mol %, less than or equal to 10 mol %, less than or equal to 8 mol %, or even less than or equal to 7 mol %. In embodiments, the concentration of $B_2O_3$ in the clad glass composition may be greater than 0 mol % and less than or equal to 12 mol %, greater than 0 mol % and less than or equal to 10 mol %, greater than 0 mol % and less than or equal to 8 mol %, greater than 0 mol % and less than or equal to 7 mol %, greater than or equal to 1 mol % and less than or equal to 12 mol %, greater than or equal to 1 mol % and less than or equal to 10 mol %, greater than or equal to 1 mol % and less than or equal to 8 mol %, greater than or equal to 1 mol % and less than or equal to 7 mol %, greater than or equal to 3 mol % and less than or equal to 12 mol %, greater than or equal to 3 mol % and less than or equal to 10 mol %, greater than or equal to 3 mol % and less than or equal to 8 mol %, greater than or equal to 3 mol % and less than or equal to 7 mol %, greater than or equal to 5 mol % and less than or equal to 12 mol %, greater than or equal to 5 mol % and less than or equal to 10 mol %, greater than or equal to 5 mol % and less than or equal to 8 mol %, greater than or equal to 5 mol % and less than or equal to 7 mol %, greater than or equal to 7 mol % and less than or equal to 12 mol %, greater than or equal to 7 mol % and less than or equal to 10 mol %, or even greater than or equal to 7 mol % and less than or equal to 8 mol %, or any and all sub-ranges formed from any of these endpoints.

As described hereinabove, the clad glass compositions may contain alkali oxides, such as $Na_2O$, to enable the ion-exchangeability of the clad glass compositions. $Na_2O$ aids in the ion-exchangeability of the clad glass composition and also reduces the softening point of the clad glass composition, thereby increasing the formability of the glass. In embodiments, the clad glass composition may comprise greater than or equal to 0 mol % and less than or equal to 14 mol % $Na_2O$. In embodiments, the clad glass composition may comprise greater than or equal to 5 mol % and less than or equal to 12 mol % $Na_2O$. In embodiments, the clad glass composition may comprise greater than or equal to 7.5 mol % and less than or equal to 11 mol % $Na_2O$. In embodiments, the concentration of $Na_2O$ in the clad glass composition may be greater than or equal to 0 mol %, greater than or equal to 5 mol %, greater than or equal to 7 mol %, greater than or equal to 7.5 mol %, greater than or equal to 8 mol %, or even greater than or equal to 8.5 mol %. In embodiments, the concentration of $Na_2O$ in the clad glass composition may be less than or equal to 14 mol %, less than or equal to 13 mol %, less than or equal to 12 mol %, or even less than or equal to 11 mol %. In embodiments, the concentration of $Na_2O$ in the clad glass composition may be greater than or equal to 0 mol % and less than or equal to 14 mol %, greater than or equal to 0 mol % and less than or equal to 13 mol %, greater than or equal to 0 mol % and less than or equal to 12 mol %, greater than or equal to 0 mol % and less than or equal to 11 mol %, greater than or equal to 5 mol % and less than or equal to 14 mol %, greater than or equal to 5 mol % and less than or equal to 13 mol %, greater than or equal to 5 mol % and less than or equal to 12 mol %, greater than or equal to 5 mol % and less than or equal to 11 mol %, greater than or equal to 7 mol % and less than or equal to 14 mol %, greater than or equal to 7 mol % and less than or equal to 13 mol %, greater than or equal to 7 mol % and less than or equal to 12 mol %, greater than or equal to 7 mol % and less than or equal to 11 mol %, greater than or equal to 7.5 mol % and less than or equal to 14 mol %, greater than or equal to 7.5 mol % and less than or equal to 13 mol %, greater than or equal to 7.5 mol % and less than or equal to 12 mol %, greater than or equal to 7.5 mol % and less than or equal to 11 mol %, greater than or equal to 8 mol % and less than or equal to 14 mol %, greater than or equal to 8 mol % and less than or equal to 13 mol %, greater than or equal to 8 mol % and less than or equal to 12 mol %, greater than or equal to 8 mol % and less than or equal to 11 mol %, greater than or equal to 8.5 mol % and less than or equal to 14 mol %, greater than or equal to 8.5 mol % and less than or equal to 13 mol %, greater than or equal to 8.5 mol % and less than or equal to 12 mol %, or even greater than or equal to 8.5 mol % and less than or equal to 11 mol %, or any and all sub-ranges formed from any of these endpoints. In embodiments, the clad glass composition may be free or substantially free of $Na_2O$.

The clad glass compositions described herein may further comprise alkali metal oxides other than $Na_2O$, such as $K_2O$ and $Li_2O$. $K_2O$, when included, promotes ion-exchange and may increase the depth of layer and decrease the melting point to improve the formability of the clad glass composition. However, adding too much $K_2O$ may cause the surface compressive stress and melting point to be too low. Accordingly, in embodiments, the amount of $K_2O$ added to the glass composition may be limited. In embodiments, the clad glass composition may comprise greater than or equal to 0 mol % and less than or equal to 3 mol % $K_2O$. In embodiments, the concentration of $K_2O$ in the clad glass composition may be greater than or equal to 0 mol %, greater than or equal to 0.1 mol %, greater than or equal to 0.5 mol %, or even greater than or equal to 1 mol %. In embodiments, the concentration of $K_2O$ in the clad glass composition may be less than or equal to 3 mol % or even less than or equal to 2 mol %. In embodiments, the concentration of $K_2O$ in the clad glass composition may be greater than or equal to 0 mol % and less than or equal to 3 mol %, greater than or equal to 0 mol % and less than or equal to 2 mol %, greater than or equal to 0.1 mol % and less than or equal to 3 mol %, greater than or equal to 0.1 mol % and less than or equal to 2 mol %, greater than or equal to 0.5 mol % and less than or equal to 3 mol %, greater than or equal to 0.5 mol % and less than or equal to 2 mol %, greater than or equal to 1 mol % and less than or equal to 3 mol %, or even greater than or equal to 1 mol % and less than or equal to 2 mol %, or any and all sub-ranges formed from any of these endpoints. In embodiments, the clad glass composition may be free or substantially free of $K_2O$.

In addition to aiding in ion-exchangeability of the clad glass composition, $Li_2O$ decreases the melting point and improves formability of the clad glass composition. In embodiments, the clad glass composition may comprise greater than or equal to 0 mol % and less than or equal to 5 mol % $Li_2O$. In embodiments, the clad glass composition may comprise greater than or equal to 0 mol % and less than or equal to 3 mol % $Li_2O$. In embodiments, the concentration of $Li_2O$ in the clad glass composition may be greater than or equal to 0 mol %, greater than or equal to 0.5 mol %, greater than or equal to 1 mol %, or even greater than or equal to 2 mol %. In embodiments, the concentration of $Li_2O$ in the clad glass composition may be less than or equal to 5 mol %, less than or equal to 4 mol %, or even less than or equal to 3 mol %. In embodiments, the concentration of $Li_2O$ in the clad glass composition may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 1 mol % and less than or equal to 5 mol %, greater than or equal to 1 mol % and less than or equal to 4 mol %, greater than or equal to 1 mol % and less than or equal to 3 mol %, greater than or equal to 2 mol % and less than or equal to 5 mol %, greater than or equal to 2 mol % and less than or equal to 4 mol %, or even greater than or equal to 2 mol % and less than or equal to 3 mol %, or any and all sub-ranges formed from any of these endpoints. In embodiments, the clad glass composition may be free or substantially free of $Li_2O$.

As used herein, $R_2O$ is the sum (in mol %) of $Na_2O$, $K_2O$, and $Li_2O$ (i.e., $R_2O = Na_2O$ (mol %) $+ K_2O$ (mol %) $+ Li_2O$ (mol %)) present in the clad glass compositions. Alkali oxides, such as $Na_2O$, $K_2O$, and $Li_2O$, aid in decreasing the softening point and molding temperature of the clad glass composition, thereby offsetting the increase in the softening point and molding temperature of the clad glass composition due to higher amounts of $SiO_2$ in the clad glass composition, for example.

In embodiments, the concentration of $R_2O$ in the clad glass composition may be greater than or equal to 7 mol % and less than or equal to 16 mol %. In embodiments, the concentration of $R_2O$ in the clad glass composition may be greater than or equal to 7 mol %, greater than or equal to 7.5 mol %, greater than or equal to 8 mol %, or even greater than or equal to 8.5 mol %. In embodiments, the concentration of $R_2O$ in the clad glass composition may be less than or equal to 16 mol %, less than or equal to 14 mol %, or even less than or equal to 12 mol %. In embodiments, the concentration of $R_2O$ in the clad glass composition may be greater than or equal to 7 mol % and less than or equal to 16 mol %, greater than or equal to 7 mol % and less than or equal to 14 mol %, greater than or equal to 7 mol % and less than or equal to 12 mol %, greater than or equal to 7.5 mol % and less than or equal to 16 mol %, greater than or equal to 7.5 mol % and less than or equal to 14 mol %, greater than or equal to 7.5 mol % and less than or equal to 12 mol %, greater than or equal to 8 mol % and less than or equal to 16 mol %, greater than or equal to 8 mol % and less than or equal to 14 mol %, greater than or equal to 8 mol % and less than or equal to 12 mol %, greater than or equal to 8.5 mol % and less than or equal to 16 mol %, greater than or equal to 8.5 mol % and less than or equal to 14 mol %, or even greater than or equal to 8.5 mol % and less than or equal to 12 mol %, or any and all sub-ranges formed from any of these endpoints.

In embodiments, the clad glass composition may comprise MgO. In embodiments, the clad glass composition may comprise greater than or equal to 0 mol % and less than or equal to 7 mol % MgO. In embodiments, the clad glass composition may comprise greater than or equal to 0 mol % and less than or equal to 5 mol % MgO. In embodiments, the concentration of MgO in the clad glass composition may be greater than or equal to 0 mol %, greater than or equal to 0.5 mol %, greater than or equal to 1 mol %, or even greater than or equal to 2 mol %. In embodiments, the concentration of MgO in the clad glass composition may be less than or equal to 7 mol %, less than or equal to 5 mol %, or even less than or equal to 3 mol %. In embodiments, the concentration of MgO in the clad glass composition may be greater than or equal to 0 mol % and less than or equal to 7 mol %, greater than or equal to 0 mol % and less than or equal to 5 mol %, greater than or equal to 0 mol % and less than or equal to 3 mol %, greater than or equal to 0.5 mol % and less than or equal to 7 mol %, greater than or equal to 0.5 mol % and less than or equal to 5 mol %, greater than or equal to 0.5 mol % and less than or equal to 3 mol %, greater than or equal to 1 mol % and less than or equal to 7 mol %, greater than or equal to 1 mol % and less than or equal to 5 mol %, greater than or equal to 1 mol % and less than or equal to 3 mol %, greater than or equal to 2 mol % and less than or equal to 7 mol %, greater than or equal to 2 mol % and less than or equal to 5 mol %, or even greater than or equal to 2 mol % and less than or equal to 3 mol %, or any and all sub-ranges formed from any of these endpoints. In embodiments, the clad glass composition may be free or substantially free of MgO.

In embodiments, the clad glass composition may comprise CaO. In embodiments, the clad glass composition may comprise greater than or equal to 0 mol % and less than or equal to 10 mol % CaO. In embodiments, the clad glass composition may comprise greater than or equal to 0 mol % and less than or equal to 5 mol % CaO. In embodiments, the concentration of CaO in the clad glass composition may be greater than or equal to 0 mol %, greater than or equal to 0.5 mol %, or even greater than or equal to 1 mol %. In embodiments, the concentration of CaO in the clad glass composition may be less than or equal to 10 mol %, less than or equal to 7 mol %, less than or equal to 5 mol %, less than or equal to 4 mol %, or even less than or equal to 3 mol %. In embodiments, the concentration of CaO in the clad glass composition may be greater than or equal to 0 mol % and less than or equal to 10 mol %, greater than or equal to 0 mol % and less than or equal to 7 mol %, greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0.5 mol % and less than or equal to 10 mol %, greater than or equal to 0.5 mol % and less than or equal to 7 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 1 mol % and less than or equal to 10 mol %, greater than or equal to 1 mol % and less than or equal to 7 mol %, greater than or equal to 1 mol % and less than or equal to 5 mol %, greater than or equal to 1 mol % and less than or equal to 4 mol %, or even greater than or equal to 1 mol % and less than or equal to 3 mol %, or any and all sub-ranges formed from any of these endpoints. In embodiments, the clad glass composition may be free or substantially free of CaO.

In embodiments, the clad glass composition may comprise SrO. In embodiments, the clad glass composition may comprise greater than or equal to 0 mol % and less than or equal to 3 mol % SrO. In embodiments, the concentration of SrO in the glass composition may be greater than or equal to 0 mol %, greater than or equal to 0.5 mol %, or even greater than or equal to 1 mol %. In embodiments, the concentration of SrO in the glass composition may be less than or equal to 3 mol % or even less than or equal to 2 mol %. In embodiments, the concentration of SrO in the glass composition may be greater than or equal to 0 mol % and less than or equal to 3 mol %, greater than or equal to 0 mol % and less than or equal to 2 mol %, greater than or equal to 0.5 mol % and less than or equal to 3 mol %, greater than or equal to 0.5 mol % and less than or equal to 2 mol %, greater than or equal to 1 mol % and less than or equal to 3 mol %, or even greater than or equal to 1 mol % and less than or equal to 2 mol %, or any and all sub-ranges formed from any of these endpoints. In embodiments, the clad glass composition may be free or substantially free of SrO.

In embodiments, the clad glass composition may comprise BaO. In embodiments, the clad glass composition may comprise greater than or equal to 0 mol % and less than or equal to 3 mol % BaO. In embodiments, the concentration of BaO in the glass composition may be greater than or equal to 0 mol %, greater than or equal to 0.5 mol %, or even greater than or equal to 1 mol %. In embodiments, the concentration of SrO in the glass composition may be less than or equal to 3 mol % or even less than or equal to 2 mol %. In embodiments, the concentration of BaO in the glass composition may be greater than or equal to 0 mol % and less than or equal to 3 mol %, greater than or equal to 0 mol % and less than or equal to 2 mol %, greater than or equal to 0.5 mol % and less than or equal to 3 mol %, greater than or equal to 0.5 mol % and less than or equal to 2 mol %, greater than or equal to 1 mol % and less than or equal to 3 mol %, or even greater than or equal to 1 mol % and less than or equal to 2 mol %, or any and all sub-ranges formed from any of these endpoints. In embodiments, the clad glass composition may be free or substantially free of BaO.

As used herein, RO is the sum (in mol %) of MgO, CaO, SrO, and BaO (i.e., RO=MgO (mol %)+CaO (mol %)+SrO (mol %)+BaO (mol %)) present in the clad glass composition. The concentration of RO in the clad glass composition may be limited (e.g., to less than or equal to 10 mol %) to enable relatively fast ion-exchange. In embodiments, the concentration of RO in the clad glass composition may be greater than or equal to 0 mol % and less than or equal to 10 mol %. In embodiments, the concentration of RO in the clad glass composition may be greater than or equal to 0 mol %, greater than or equal to 0.5 mol %, greater than or equal to 1 mol %, or even greater than or equal to 2 mol %. In embodiments, the concentration of RO in the clad glass composition may be less than or equal to 10 mol %, less than or equal to 7 mol %, less than or equal to 5 mol %, or even less than or equal to 3 mol %. In embodiments, the concentration of RO in the clad glass composition may be greater than or equal to 0 mol % and less than or equal to 10 mol %, greater than or equal to 0 mol % and less than or equal to 7 mol %, greater than or equal to 0 mol % and less than or equal to 5 mol %, greater than or equal to 0 mol % and less than or equal to 3 mol %, greater than or equal to 0.5 mol % and less than or equal to 10 mol %, greater than or equal to 0.5 mol % and less than or equal to 7 mol %, greater than or equal to 0.5 mol % and less than or equal to 5 mol %, greater than or equal to 0.5 mol % and less than or equal to 3 mol %, greater than or equal to 1 mol % and less than or equal to 10 mol %, greater than or equal to 1 mol % and less than or equal to 7 mol %, greater than or equal to 1 mol % and less than or equal to 5 mol %, greater than or equal to 1 mol % and less than or equal to 3 mol %, greater than or equal to 2 mol % and less than or equal to 10 mol %, greater than or equal to 2 mol % and less than or equal to 7 mol %, greater than or equal to 2 mol % and less than or equal to 5 mol %, or even greater than or equal to 2 mol % and less than or equal to 3 mol %, or any and all sub-ranges formed from any of these endpoints. In embodiments, the clad glass composition may be free or substantially free of RO.

In embodiments, the ratio of the sum of $R_2O$ and RO to $Al_2O_3$ (i.e., ($R_2O$ (mol %)+RO (mol %))/$Al_2O_3$ (mol %)) in the clad glass composition may be greater than or equal to 1 to ensure proper melting and the reduction or elimination of defects in the clad glass layer. In embodiments, ($R_2O$+RO)/$Al_2O_3$ in the clad glass composition may be greater than or equal to 1, greater than or equal to 1.1, greater than or equal to 1.2, or even greater than or equal to 1.3. In embodiments, ($R_2O$+RO)/$Al_2O_3$ in the clad glass composition may be less than or equal to 2, less than or equal to 1.8, less than or equal to 1.6, or even less than or equal to 1.4. In embodiments, ($R_2O$+RO)/$Al_2O_3$ in the clad glass composition may be greater than or equal to 1 and less than or equal to 2, greater than or equal to 1 and less than or equal to 1.8, greater than or equal to 1 and less than or equal to 1.6, greater than or equal to 1 and less than or equal to 1.4, greater than or equal to 1.1 and less than or equal to 2, greater than or equal to 1.1 and less than or equal to 1.8, greater than or equal to 1.1 and less than or equal to 1.6, greater than or equal to 1.1 and less than or equal to 1.4, greater than or equal to 1.2 and less than or equal to 2, greater than or equal to 1.2 and less than or equal to 1.8, greater than or equal to 1.2 and less than or equal to 1.6, or even greater than or equal to 1.2 and less than or equal to 1.4, or any and all sub-ranges formed from any of these endpoints.

In embodiments, the clad glass composition may comprise $P_2O_5$. In embodiments, the clad glass composition may comprise greater than or equal to 0 mol % and less than or equal to 5 mol % $P_2O_5$. In embodiments, the clad glass composition may comprise greater than or equal to 0 mol % and less than or equal to 3 mol % $P_2O_5$. In embodiments, the concentration of $P_2O_5$ in the clad glass composition may be greater than or equal to 0 mol %, greater than or equal to 0.5 mol %, or even greater than or equal to 1 mol %. In embodiments, the concentration of $P_2O_5$ in the clad glass composition may be less than or equal to 5 mol %, less than or equal to 4 mol %, or even less than or equal to 3 mol %. In embodiments, the concentration of $P_2O_5$ in the clad glass composition may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 1 mol % and less than or equal to 5 mol %, greater than or equal to 1 mol % and less than or equal to 4 mol %, or even greater than or equal to 1 mol % and less than or equal to 3 mol %, or any and all sub-ranges formed from any of these endpoints. In embodiments, the clad glass composition may be free or substantially free of $P_2O_5$.

In embodiments, the clad glass compositions described herein may further include one or more fining agents. In embodiments, the fining agents may include, for example, $SnO_2$. In embodiments, the clad glass composition may comprise greater than or equal to 0 mol % and less than or equal to 2 mol % $SnO_2$. In embodiments, the concentration of $SnO_2$ in the clad glass composition may be greater than or equal to 0 mol % or even greater than or equal to 0.1 mol %. In embodiments, the concentration of $SnO_2$ in the clad glass composition may be less than or equal to 2 mol %, less than or equal to 1 mol %, or even less than or equal to 0.5 mol %. In embodiments, the concentration of $SnO_2$ in the clad glass composition may be greater than or equal to 0 mol % and less than or equal to 2 mol %, greater than or equal to 0 mol % and less than or equal to 1 mol %, greater than or equal to 0 mol % and less than or equal to 0.5 mol %, greater than or equal to 0.1 mol % and less than or equal to 2 mol %, greater than or equal to 0.1 mol % and less than or equal to 1 mol %, or even greater than or equal to 0.1 mol % and less than or equal to 0.5 mol %, or any and all sub-ranges formed from any of these endpoints. In embodiments, the glass composition may be free or substantially free of $SnO_2$.

In embodiments, the clad glass compositions described herein may further include tramp materials such as $TiO_2$, MnO, $MoO_3$, $WO_3$, $Y_2O_3$, CdO, $As_2O_3$, $Sb_2O_3$, sulfur-based compounds, such as sulfates, halogens, or combinations thereof. In embodiments, the clad glass compositions may be free or substantially free of individual tramp materials, a combination of tramp materials, or all tramp materials. For example, in embodiments, the clad glass compositions may be free or substantially free of $TiO_2$, MnO, $MoO_3$, $WO_3$, $Y_2O_3$, CdO, $As_2O_3$, $Sb_2O_3$, sulfur-based compounds, such as sulfates, halogens, or combinations thereof.

In embodiments, the clad glass composition may comprise greater than or equal to 65 mol % and less than or equal to 74 mol % $SiO_2$, greater than or equal to 8 mol % and less than or equal to 11 mol % $Al_2O_3$, greater than or equal to 7 mol % and less than or equal to 10 mol % $B_2O_3$, greater than or equal to 0 mol % and less than or equal to 3 mol % $P_2O_5$, greater than or equal to 0 mol % and less than or equal to 3 mol % $Li_2O$, greater than or equal to 7.5 mol % and less than or equal to 11 mol % $Na_2O$, greater than or equal to 0 mol % and less than or equal to 5 mol % MgO, and greater than or equal to 0 mol % and less than or equal to 5 mol % CaO.

In embodiments, the clad glass composition may comprise greater than or equal to 60 mol % and less than or equal to 70 mol % $SiO_2$, greater than or equal to 10 mol % and less than or equal to 15 mol % $Al_2O_3$, greater than 0 mol % and less than or equal to 7 mol % $B_2O_3$, greater than or equal to 0 mol % and less than or equal to 5 mol % $P_2O_5$, greater than or equal to 7.5 mol % and less than or equal to 12 mol % $Na_2O$; and greater than or equal to 0 mol % and less than or equal to 7 mol % MgO.

In embodiments, the $LTCTE_{clad}$ may be greater than or equal to 5 ppm/° C. and less than or equal to 6.5 ppm/° C. In embodiments, the $LTCTE_{clad}$ may be greater than or equal to 5 ppm/° C., greater than or equal to 5.25 ppm/° C., or even greater than or equal to 5.25 ppm/° C. In embodiments, the $LTCTE_{clad}$ may be less than or equal to 6.5 ppm/° C., less than or equal to 6.25 ppm/° C., or even less than or equal to 6 ppm/° C. In embodiments, the $LTCTE_{clad}$ may be greater than or equal to 5 ppm/° C. and less than or equal to 6.5 ppm/° ° C., greater than or equal to 5 ppm/° C. and less than or equal to 6.25 ppm/° C., greater than or equal to 5 ppm/° C. and less than or equal to 6 ppm/° C., greater than or equal to 5.25 ppm/° C. and less than or equal to 6.5 ppm/° C., greater than or equal to 5.25 ppm/° C. and less than or equal to 6.25 ppm/° C., greater than or equal to 5.25 ppm/° C. and less than or equal to 6 ppm/° C., greater than or equal to 5.5 ppm/° C. and less than or equal to 6.5 ppm/° C., greater than or equal to 5.5 ppm/° C. and less than or equal to 6.25 ppm/° C., or even greater than or equal to 5.5 ppm/° ° C. and less than or equal to 6 ppm/° C., or any and all sub-ranges formed from any of these endpoints.

In embodiments, the $HTCTE_{clad}$ may be greater than or equal to 15 ppm/° C. and less than or equal to 25 ppm/° C. In embodiments, the $HTCTE_{clad}$ may be greater than or equal to 15 ppm/° C., greater than or equal to 17 ppm/° C., or even greater than or equal to 19 ppm/° C. In embodiments, the $HTCTE_{clad}$ may be less than or equal to 25 ppm/° C., less than or equal to 23 ppm/° C., or less than or equal to 21 ppm/° C. In embodiments, the $HTCTE_{clad}$ may be greater than or equal to 15 ppm/° C. and less than or equal to 25 ppm/° C., greater than or equal to 15 ppm/° C. and less than or equal to 23 ppm/° C., greater than or equal to 15 ppm/° C. and less than or equal to 21 ppm/° C., greater than or equal to 17 ppm/° C. and less than or equal to 25 ppm/° C., greater than or equal to 17 ppm/° C. and less than or equal to 23 ppm/° C., greater than or equal to 17 ppm/° C. and less than or equal to 21 ppm/° C., greater than or equal to 19 ppm/° C. and less than or equal to 25 ppm/° C., greater than or equal to 19 ppm/° C. and less than or equal to 23 ppm/° C., or even greater than or equal to 19 ppm/° C. and less than or equal to 21 ppm/° C., or any and all sub-ranges formed from any of these endpoints.

In embodiments, the clad glass composition may have an annealing point greater than or equal to 525° C. and less than or equal to 715° C. In embodiments, the annealing point of the clad glass composition may be greater than or equal to 525° C., greater than or equal to 550° C., or even greater than or equal to 575° C. In embodiments, the annealing point of the clad glass composition may be less than or equal to 715° C., less than or equal to 700° C., less than or equal to 685° C., or even less than or equal to 670° C. In embodiments, the annealing point of the clad glass composition may be greater than or equal to 525° C. and less than or equal to 715° C., greater than or equal to 525° C. and less than or equal to 700° C., greater than or equal to 525° C. and less than or equal to 685° C., greater than or equal to 525° C. and less than or equal to 670° C., greater than or equal to 550° C. and less than or equal to 715° C., greater than or equal to 550° C. and less than or equal to 700° C., greater than or equal to 550° C. and less than or equal to 685° C., greater than or equal to 550° C. and less than or equal to 670° C., greater than or equal to 575° C. and less than or equal to 715° C., greater than or equal to 575° C. and less than or equal to 700° C., greater than or equal to 575° C. and less than or equal to 685° C., or even greater than or equal to 575° C. and less than or equal to 670° C., or any and all sub-ranges formed from any of these endpoints.

In embodiments, the clad glass composition may have a density greater than or equal to 2 g/cm³ or even greater than or equal to 2.3 g/cm³. In embodiments, the clad glass composition may have a density less than or equal to 2.7 g/cm³ or even less than or equal to 2.4 g/cm³. In embodiments, the clad glass composition may have a density greater than or equal to 2 g/cm³ and less than or equal to 2.7 g/cm³, greater than or equal to 2 g/cm³ and less than or equal to 2.4 g/cm³, greater than or equal to 2.3 g/cm³ and less than or equal to 2.7 g/cm³, or even greater than or equal to 2.3 g/cm³ and less than or equal to 2.4 g/cm³, or any and all sub-ranges formed from any of these endpoints.

In embodiments, the clad glass composition may have a strain point greater than or equal to 500° C. or even greater than or equal to 525° C. In embodiments, the clad glass composition may have a strain point less than or equal to 650° C. or even less than or equal to 625° C. In embodiments, the clad glass composition may have a strain point greater than or equal to 500° C. and less than or equal to 650° ° C., greater than or equal to 500° C. and less than or equal to 625° C., greater than or equal to 525° C. and less than or equal to 650° C., or even greater than or equal to 525° C. and less than or equal to 625° C., or any and all sub-ranges formed from any of these endpoints.

In embodiments, the clad glass composition may have a softening point greater than or equal to 825° C. or even greater than or equal to 850° C. In embodiments, the clad glass composition may have a softening point less than or equal to 950° C. or even less than or equal to 925° C. In embodiments, the clad glass composition may have a softening point greater than or equal to 825° C. and less than or equal to 950° C., greater than or equal to 825° C. and less than or equal to 925° C., greater than or equal to 850° C. and less than or equal to 950° C., or even greater than or equal to 850° C. and less than or equal to 925° ° C., or any and all sub-ranges formed from any of these endpoints.

In embodiments, the clad glass composition may have a SOC greater than or equal to 3.2 nm/mm/MPa or even greater than or equal to 3.4 nm/mm/MPa. In embodiments, the clad glass composition may have a SOC less than or equal to 3.7 nm/mm/MPa or even less than or equal to 3.6 nm/mm/MPa. In embodiments, the clad glass composition may have a SOC greater than or equal to 3.2 nm/mm/MPa and less than or equal to 3.7 nm/mm/MPa, greater than or equal to 3.2 nm/mm/MPa and less than or equal to 3.6 nm/mm/MPa, greater than or equal to 3.4 nm/mm/MPa and less than or equal to 3.7 nm/mm/MPa, or even greater than or equal to 3.4 nm/mm/MPa and less than or equal to 3.6 nm/mm/MPa, or any and all sub-ranges formed from any of these endpoints.

In embodiments, the clad glass composition may have a Young's modulus greater than or equal to 55 GPa or even greater than or equal to 60 GPa. In embodiments, the clad glass composition may have a Young's modulus less than or equal to 75 GPa or even less than or equal to 70 GPa. In embodiments, the clad glass composition may have a Young's modulus greater than or equal to 55 GPa and less than or equal to 75 GPa, greater than or equal to 55 GPa and less than or equal to 70 GPa, greater than or equal to 60 GPa and less than or equal to 75 GPa, or even greater than or equal to 60 GPa and less than or equal to 70 GPa, or any and all sub-ranges formed from any of these endpoints.

In embodiments, the clad glass composition may have a shear modulus greater than or equal to 20 GPa or even greater than or equal to 25 GPa. In embodiments, the clad glass composition may have a shear modulus less than or equal to 35 GPa or even less than or equal to 30 GPa. In embodiments, the clad glass composition may have a shear modulus greater than or equal to 20 GPa and less than or equal to 35 GPa, greater than or equal to 20 GPa and less than or equal to 30 GPa, greater than or equal to 25 GPa and less than or equal to 35 GPa, or even greater than or equal to 25 GPa and less than or equal to 30 GPa, or any and all sub-ranges formed from any of these endpoints.

In embodiments, the clad glass composition may have a refractive index greater than or equal to 1.4 or even greater than or equal to 1.45. In embodiments, the clad glass composition may have a refractive index less than or equal to 1.55 or even less than or equal to 1.5. In embodiments, the clad glass composition may have a refractive index greater than or equal to 1.4 and less than or equal to 1.55, greater than or equal to 1.4 and less than or equal to 1.5, greater than or equal to 1.45 and less than or equal to 1.55, or even greater than or equal to 1.45 and less than or equal to 1.5, or any and all sub-ranges formed from any of these endpoints.

In embodiments, the clad glass composition may have a Poisson's ratio greater than or equal to 0.15 or even greater than or equal to 0.2. In embodiments, the clad glass composition may have a Poisson's ratio less than or equal to 0.25 or even less than or equal to 0.23. In embodiments, the clad glass composition may have a Poisson's ratio greater than or equal to 0.15 and less than or equal to 0.25, greater than or equal to 0.15 and less than or equal to 0.23, greater than or equal to 0.2 and less than or equal to 0.25, or even greater than or equal to 0.2 and less than or equal to 0.23, or any and all sub-ranges formed from any of these endpoints.

In embodiments, the clad glass composition may have a VFT A greater than or equal to −5 and less than or equal to −2, a VFT B greater than or equal to 800 and less than or equal to 14500, and a VFT T, greater than or equal to −400 and less than or equal to 100.

In embodiments, the clad glass composition may have a 200 Poise temperature greater than or equal to 1600° C. or even greater than or equal to 1650° C. In embodiments, the clad glass composition may have a 200 Poise temperature less than or equal to 1850° C. or even less than or equal to 1800° C. In embodiments, the clad glass composition may have a 200 Poise temperature greater than or equal to 1600° C. and less than or equal to 1850° C., greater than or equal to 1600° C. and less than or equal to 1800° C., greater than or equal to 1650° C. and less than or equal to 1850° C., or even greater than or equal to 1650° C. and less than or equal to 1800° C., or any and all sub-ranges formed from any of these endpoints.

In embodiments, the clad glass composition may have a 35 k Poise temperature greater than or equal to 1100° C. or even greater than or equal to 1150° C. In embodiments, the clad glass composition may have a 35 k Poise temperature less than or equal to 1300° C. or even less than or equal to 1250° C. In embodiments, the clad glass composition may have a 35 k Poise temperature greater than or equal to 1100° C. and less than or equal to 1300° C., greater than or equal to 1100° C. and less than or equal to 1250° C., greater than or equal to 1150° C. and less than or equal to 1300° C., or even greater than or equal to 1150° C. and less than or equal to 1250° C., or any and all sub-ranges formed from any of these endpoints.

In embodiments, the clad glass composition may have a 100 k Poise temperature greater than or equal to 1050° C. or even greater than or equal to 1100° C. In embodiments, the clad glass composition may have a 100 k Poise temperature less than or equal to 1200° C. or even less than or equal to 1150° C. In embodiments, the clad glass composition may have a 100 k Poise temperature greater than or equal to 1050° C. and less than or equal to 1200° C., greater than or equal to 1050° C. and less than or equal to 1150° C., greater than or equal to 1100° C. and less than or equal to 1200° C., or even greater than or equal to 1100° C. and less than or equal to 1150° C., or any and all sub-ranges formed from any of these endpoints.

In embodiments, the clad glass composition may have a 200 k Poise temperature greater than or equal to 1000° C. or even greater than or equal to 1050° C. In embodiments, the clad glass composition may have a 200 k Poise temperature less than or equal to 1200° C. or even less than or equal to 1150° C. In embodiments, the clad glass composition may have a 200 k Poise temperature greater than or equal to 1000° C. and less than or equal to 1200° C., greater than or equal to 1000° C. and less than or equal to 1150° C., greater than or equal to 1050° C. and less than or equal to 1200° C., or even greater than or equal to 1050° C. and less than or equal to 1150° C., or any and all sub-ranges formed from any of these endpoints.

In embodiments, the clad glass composition may have a liquidus temperature greater than or equal to 900° C. or even greater than or equal to 950° C. In embodiments, the clad glass composition may have a liquidus temperature less than or equal to 1200° C. or even less than or equal to 1150° C. In embodiments, the clad glass composition may have a liquidus temperature greater than or equal to 900° C. and less than or equal to 1200° C., greater than or equal to 900° C. and less than or equal to 1150° C., greater than or equal to 950° C. and less than or equal to 1200° C., or even greater than or equal to 950° C. and less than or equal to 1150° C., or any and all sub-ranges formed from any of these endpoints.

Core Glass Compositions

The core glass compositions described herein may be described as aluminosilicate glass compositions and comprise $SiO_2$ and $Al_2O_3$. The core glass compositions described herein further include CaO and $Na_2O$ to reduce the viscosity for melting, thereby enhancing the formability of the core glass composition.

$SiO_2$ is the primary glass former in the core glass compositions described herein and may function to stabilize the network structure of the core glass compositions. The concentration of $SiO_2$ in the core glass compositions should be sufficiently high (e.g., greater than or equal to 60 mol %) to provide basic glass forming capability. The amount of $SiO_2$ may be limited (e.g., to less than or equal to 73 mol %) to control the melting point of the core glass composition, as the melting temperature of pure $SiO_2$ or high $SiO_2$ glasses is undesirably high. Thus, limiting the concentration of $SiO_2$ may aid in improving the meltability and the formability of the core glass composition.

Accordingly, in embodiments, the core glass composition may comprise greater than or equal to 60 mol % and less than or equal to 73 mol % $SiO_2$. In embodiments, the concentration of $SiO_2$ in the core glass composition may be greater than or equal to 60 mol %, greater than or equal to 63 mol %, or even greater than or equal to 65 mol %. In embodiments, the concentration of $SiO_2$ in the core glass composition may be less than or equal to 73 mol %, less than or equal to 71 mol %, or even less than or equal to 69 mol %. In embodiments, the concentration of $SiO_2$ in the core glass composition may be greater than or equal to 60 mol % and less than or equal to 73 mol %, greater than or equal to 60 mol % and less than or equal to 71 mol %, greater than or equal to 60 mol % and less than or equal to 69 mol %, greater than or equal to 63 mol % and less than or equal to 73 mol %, greater than or equal to 63 mol % and less than or equal to 71 mol %, greater than or equal to 63 mol % and less than or equal to 69 mol %, greater than or equal to 65 mol % and less than or equal to 73 mol %, greater than or equal to 65 mol % and less than or equal to 71 mol %, or even greater than or equal to 65 mol % and less than or equal to 69 mol %, or any and all sub-ranges formed from any of these endpoints.

Like $SiO_2$, $Al_2O_3$ may also stabilize the core glass network and additionally provides improved mechanical properties and chemical durability to the core glass composition. The amount of $Al_2O_3$ may also be tailored to the control the viscosity of the core glass composition. The concentration of $Al_2O_3$ should be sufficiently high (e.g., greater than 0 mol %) such that the core glass composition has the desired mechanical properties (e.g., Young's modulus greater than or equal to 65 GPa). However, if the amount of $Al_2O_3$ is too high (e.g., greater than 16.5 mol %), the viscosity of the melt may increase, thereby diminishing the formability of the core glass composition. In embodiments, the core glass composition may comprise greater than 0 mol % and less than or equal to 16.5 mol % $Al_2O_3$. In embodiments, the core glass composition may comprise greater than or equal to 0.5 mol % and less than or equal to 13 mol % $Al_2O_3$. In embodiments, the concentration of $Al_2O_3$ in the core glass composition may be greater than 0 mol %, greater than or equal to 0.5 mol %, or even greater than or equal to 1 mol %. In embodiments, the concentration of $Al_2O_3$ in the core glass composition may be less than or equal to 16.5 mol %, less than or equal to 13 mol %, less than or equal to 10 mol %, less than or equal to 7 mol %, less than or equal to 5 mol %, or even less than or equal to 3 mol %. In embodiments, the concentration of $Al_2O_3$ in the core glass composition may be greater than 0 mol % and less than or equal to 16.5 mol %, greater than 0 mol % and less than or equal to 13 mol %, greater than 0 mol % and less than or equal to 10 mol %, greater than 0 mol % and less than or equal to 7 mol %, greater than 0 mol % and less than or equal to 5 mol %, greater than 0 mol % and less than or equal to 3 mol %, greater than or equal to 0.5 mol % and less than or equal to 16.5 mol %, greater than or equal to 0.5 mol % and less than or equal to 13 mol %, greater than or equal to 0.5 mol % and less than or equal to 10 mol %, greater than or equal to 0.5 mol % and less than or equal to 7 mol %, greater than or equal to 0.5 mol % and less than or equal to 5 mol %, greater than or equal to 0.5 mol % and less than or equal to 3 mol %, greater than or equal to 1 mol % and less than or equal to 16.5 mol %, greater than or equal to 1 mol % and less than or equal to 13 mol %, greater than or equal to 1 mol % and less than or equal to 10 mol %, greater than or equal to 1 mol % and less than or equal to 7 mol %, greater than or equal to 1 mol % and less than or equal to 5 mol %, or even greater than or equal to 1 mol % and less than or equal to 3 mol %, or any and all sub-ranges formed from any of these endpoints.

The core glass composition described herein comprises CaO to reduce the viscosity for melting. In embodiments, the core glass composition may comprise greater than or equal to 1 mol % and less than or equal to 12 mol % CaO. In embodiments, the concentration of CaO in the core glass composition may be greater than or equal to 1 mol %, greater than or equal to 3 mol %, greater than or equal to 5 mol %, or even greater than or equal to 7 mol %. In embodiments, the concentration of CaO in the core glass composition may be less than or equal to 12 mol % or even less than or equal to 10 mol %. In embodiments, the concentration of CaO in the core glass composition may be greater than or equal to 1 mol % and less than or equal to 12 mol %, greater than or equal to 1 mol % and less than or equal to 10 mol %, greater than or equal to 3 mol % and less than or equal to 12 mol %, greater than or equal to 3 mol % and less than or equal to 10 mol %, greater than or equal to 5 mol % and less than or equal to 12 mol %, greater than or equal to 5 mol % and less than or equal to 10 mol %, greater than or equal to 7 mol % and less than or equal to 12 mol %, or even greater than or equal to 7 mol % and less than or equal to 10 mol %, or any and all sub-ranges formed from any of these endpoints.

In embodiments, the core glass composition may comprise MgO. In embodiments, the core glass composition may comprise greater than or equal to 0 mol % and less than or equal to 10 mol % MgO. In embodiments, the core glass composition may comprise greater than or equal to 2 mol % and less than or equal to 8 mol % MgO. In embodiments, the concentration of MgO in the core glass composition may be greater than or equal to 0 mol %, greater than or equal to 2 mol %, greater than or equal to 4 mol %, or even greater than or equal to 6 mol %. In embodiments, the concentration of MgO in the core glass composition may be less than or equal to 10 mol % or even less than or equal to 8 mol %. In embodiments, the concentration of MgO in the core glass composition may be greater than or equal to 0 mol % and less than or equal to 10 mol %, greater than or equal to 0 mol % and less than or equal to 8 mol %, greater than or equal to 2 mol % and less than or equal to 10 mol %, greater than or equal to 2 mol % and less than or equal to 8 mol %, greater than or equal to 4 mol % and less than or equal to 10 mol %, greater than or equal to 4 mol % and less than or equal to 8 mol %, greater than or equal to 6 mol % and less than or equal to 10 mol %, or even greater than or equal to 6 mol % and less than or equal to 8 mol %, or any and all sub-ranges formed from any of these endpoints. In embodiments, the core glass composition may be free or substantially free of MgO.

As described hereinabove, the core glass compositions may contain $Na_2O$ to reduce the viscosity for melting. In embodiments, the core glass composition may comprise greater than or equal to 3 mol % and less than or equal to 15 mol % $Na_2O$. In embodiments, the core glass composition may comprise greater than or equal to 5 mol % and less than or equal to 14.5 mol % $Na_2O$. In embodiments, the core glass composition may comprise greater than or equal to 7 mol % and less than or equal to 14 mol % $Na_2O$. In embodiments, the concentration of $Na_2O$ in the core glass composition may be greater than or equal to 3 mol %, greater than or equal to 5 mol %, greater than or equal to 7 mol %, or even greater than or equal to 9 mol %. In embodiments, the concentration of $Na_2O$ in the core glass composition may be less than or equal to 15 mol %, less than or equal to 14.5 mol %, less than or equal to 14 mol %, less than or equal to 13.5 mol %, or even less than or equal to 13 mol %. In embodiments, the concentration of $Na_2O$ in the core glass composition may be greater than or equal to 3 mol % and less than or equal to 15 mol %, greater than or equal to 3 mol % and less than or equal to 14.5 mol %, greater than or equal to 3 mol % and less than or equal to 14 mol %, greater than or equal to 3 mol % and less than or equal to 13.5 mol %, greater than or equal to 3 mol % and less than or equal to 13 mol %, greater than or equal to 5 mol % and less than or equal to 15 mol %, greater than or equal to 5 mol % and less than or equal to 14.5 mol %, greater than or equal to 5 mol % and less than or equal to 14 mol %, greater than or equal to 5 mol % and less than or equal to 13.5 mol %, greater than or equal to 5 mol % and less than or equal to 13 mol %, greater than or equal to 7 mol % and less than or equal to 15 mol %, greater than or equal to 7 mol % and less than or equal to 14.5 mol %, greater than or equal to 7 mol % and less than or equal to 14 mol %, greater than or equal to 7 mol % and less than or equal to 13.5 mol %, greater than or equal to 7 mol % and less than or equal to 13 mol %, greater than or equal to 9 mol % and less than or equal to 15 mol %, greater than or equal to 9 mol % and less than or equal to 14.5 mol %, greater than or equal to 9 mol % and less than or equal to 14 mol %, greater than or equal to 9 mol % and less than or equal to 13.5 mol %, or even greater than or equal to 9 mol % and less than or equal to 13 mol %, or any and all sub-ranges formed from any of these endpoints.

In embodiments, CaO may be substituted for $Na_2O$ to decrease the LTCTE of the core glass composition. In embodiments, $Na_2O$ may be substituted for CaO to increase the HTCTE of the core glass composition. Accordingly, CaO may be substituted for $Na_2O$ or vice versa to tune the core glass composition LTCTE or HTCTE to ensure there is a sufficient differential across the entire CTE curve from room temperature to above the glass transition temperature.

The core glass compositions described herein may further comprise alkali metal oxides other than $Na_2O$, such as $K_2O$ and $Li_2O$. $K_2O$, when included, may decrease the melting point to improve the formability of the core glass composition. However, adding too much $K_2O$ may cause the melting point to be too low. Accordingly, in embodiments, the amount of $K_2O$ added to the core glass composition may be limited. In embodiments, the core glass composition may comprise greater than or equal to 0 mol % and less than or equal to 6 mol % $K_2O$. In embodiments, the core glass composition may comprise greater than or equal to 0.25 mol % and less than or equal to 5 mol % $K_2O$. In embodiments, the concentration of $K_2O$ in the core glass composition may be greater than or equal to 0 mol %, greater than or equal to 0.25 mol %, greater than or equal to 0.5 mol %, or even greater than or equal to 1 mol %. In embodiments, the concentration of $K_2O$ in the core glass composition may be less than or equal to 6 mol %, less than or equal to 5 mol %, or even less than or equal to 4 mol %. In embodiments, the concentration of $K_2O$ in the core glass composition may be greater than or equal to 0 mol % and less than or equal to 6 mol %, greater than or equal to 0 mol % and less than or equal to 5 mol %, greater than or equal to 0 mol % and less than or equal to 4 mol %, greater than or equal to 0.25 mol % and less than or equal to 6 mol %, greater than or equal to 0.25 mol % and less than or equal to 5 mol %, greater than or equal to 0.25 mol % and less than or equal to 4 mol %, greater than or equal to 0.5 mol % and less than or equal to 6 mol %, greater than or equal to 0.5 mol % and less than or equal to 5 mol %, greater than or equal to 0.5 mol % and less than or equal to 4 mol %, greater than or equal to 1 mol % and less than or equal to 6 mol %, greater than or equal to 1 mol % and less than or equal to 5 mol %, or even greater than or equal to 1 mol % and less than or equal to 4 mol %, or any and all sub-ranges formed from any of these endpoints. In embodiments, the core glass composition may be free or substantially free of $K_2O$.

$Li_2O$ decreases the melting point and improves formability of the core glass composition. In embodiments, the concentration of $Li_2O$ in the core glass composition may be greater than or equal to 0 mol %, greater than or equal to 0.5 mol %, or even greater than or equal to 1 mol %. In embodiments, the concentration of $Li_2O$ in the core glass composition may be less than or equal to 10 mol %, less than or equal to 7 mol %, less than or equal to 5 mol % or even less than or equal to 3 mol %. In embodiments, the concentration of $Li_2O$ in the core glass composition may be greater than or equal to 0 mol % and less than or equal to 10 mol %, greater than or equal to 0 mol % and less than or equal to 7 mol %, greater than or equal to 0 mol % and less than or equal to 5 mol %, greater than or equal to 0 mol % and less than or equal to 3 mol %, greater than or equal to 0.5 mol % and less than or equal to 10 mol %, greater than or equal to 0.5 mol % and less than or equal to 7 mol %, greater than or equal to 0.5 mol % and less than or equal to 5 mol %, greater than or equal to 0.5 mol % and less than or equal to 3 mol %, greater than or equal to 1 mol % and less than or equal to 10 mol %, greater than or equal to 1 mol % and less than or equal to 7 mol %, greater than or equal to 1 mol % and less than or equal to 5 mol %, or even greater than or equal to 1 mol % and less than or equal to 3 mol %, or any and all sub-ranges and formed from any of these endpoints. In embodiments, the core glass composition may be free or substantially free of $Li_2O$.

As used herein, $R_2O$ is the sum (in mol %) of $Na_2O$, $K_2O$, and $Li_2O$ (i.e., $R_2O=Na_2O$ (mol %)+$K_2O$ (mol %)+$Li_2O$ (mol %)) present in the core glass compositions. Alkali oxides, such as $Na_2O$, $K_2O$, and $Li_2O$, aid in decreasing the softening point and molding temperature of the core glass composition, thereby offsetting the increase in the softening point and molding temperature of the core glass composition due to higher amounts of $SiO_2$ in the core glass composition, for example.

In embodiments, the concentration of $R_2O$ in the core glass composition may be greater than or equal to 3 mol % and less than or equal to 20 mol %. In embodiments, the concentration of $R_2O$ in the core glass composition may be greater than or equal to 5 mol % and less than or equal to 18 mol %. In embodiments, the concentration of $R_2O$ in the core glass composition may be greater than or equal to 3 mol %, greater than or equal to 5 mol %, or even greater than or equal to 7 mol %. In embodiments, the concentration of $R_2O$ in the core glass composition may be less than or equal to 20 mol %, less than or equal to 18 mol %, less than or equal to 16 mol %, less than or equal to 14 mol %, or even less than or equal to 12 mol %. In embodiments, the concentration of $R_2O$ in the core glass composition may be greater than or equal to 3 mol % and less than or equal to 20 mol %, greater than or equal to 3 mol % and less than or equal to 18 mol %, greater than or equal to 3 mol % and less than or equal to 16 mol %, greater than or equal to 3 mol % and less than or equal to 14 mol %, greater than or equal to 3 mol % and less than or equal to 12 mol %, greater than equal to 5 mol % and less than or equal to 20 mol %, greater than or equal to 5 mol % and less than or equal to 18 mol %, greater than or equal to 5 mol % and less than or equal to 16 mol %, greater than or equal to 5 mol % and less than or equal to 14 mol %, greater than or equal to 5 mol % and less than or equal to 12 mol %, equal to 7 mol % and less than or equal to 20 mol %, greater than or equal to 7 mol % and less than or equal to 18 mol %, greater than or equal to 7 mol % and less than or equal to 16 mol %, greater than or equal to 7 mol % and less than or equal to 14 mol %, or even greater than or equal to 7 mol % and less than or equal to 12 mol %, or any and all sub-ranges formed from any of these endpoints.

In embodiments, the core glass compositions described herein may further comprise $B_2O_3$. The addition of $B_2O_3$ in the core glass composition may help to increase the HTCTE differential. When boron in the core glass composition is not charge balanced by alkali oxides or divalent cation oxides (such as MgO, CaO, SrO, BaO, and ZnO), the boron will be in a trigonal-coordination state (or three-coordinated boron). Lower coordinated species, such as three-coordinated boron, may have higher configurational expansion. In embodiments, the core glass composition may comprise greater than or equal to 0 mol % and less than or equal to 24 mol % $B_2O_3$. In embodiments, the core glass composition may comprise greater than or equal to 1.5 mol % and less than or equal to 22 mol % $B_2O_3$. In embodiments, the concentration of $B_2O_3$ in the core glass composition may be greater than or equal to 0 mol %, greater than or equal to 1 mol %, greater than or equal to 3 mol %, or even greater than or equal to 5 mol %. In embodiments, the concentration of $B_2O_3$ in the core glass composition may be less than or equal to 24 mol %, less than or equal to 20 mol %, less than or equal to 16 mol %, less than or equal to 12 mol %, or even less than or equal to 8 mol %. In embodiments, the concentration of $B_2O_3$ in the core glass composition may be greater than or equal to 0 mol % and less than or equal to 24 mol %, greater than or equal to 0 mol % and less than or equal to 20 mol %, greater than or equal to 0 mol % and less than or equal to 16 mol %, greater than or equal to 0 mol % and less than or equal to 12 mol %, greater than or equal to 0 mol % and less than or equal to 8 mol %, greater than or equal to 1 mol % and less than or equal to 24 mol %, greater than or equal to 1 mol % and less than or equal to 20 mol %, greater than or equal to 1 mol % and less than or equal to 16 mol %, greater than or equal to 1 mol % and less than or equal to 12 mol %, greater than or equal to 1 mol % and less than or equal to 8 mol %, greater than or equal to 3 mol % and less than or equal to 24 mol %, greater than or equal to 3 mol % and less than or equal to 20 mol %, greater than or equal to 3 mol % and less than or equal to 16 mol %, greater than or equal to 3 mol % and less than or equal to 12 mol %, greater than or equal to 3 mol % and less than or equal to 8 mol %, greater than or equal to 5 mol % and less than or equal to 24 mol %, greater than or equal to 5 mol % and less than or equal to 20 mol %, greater than or equal to 5 mol % and less than or equal to 16 mol %, greater than or equal to 5 mol % and less than or equal to 12 mol %, or even greater than or equal to 5 mol % and less than or equal to 8 mol %, or any and all sub-ranges formed from any of these endpoints. In embodiments, the core glass composition may be free or substantially free of $B_2O_3$.

In embodiments, the core glass compositions described herein may further comprise $P_2O_5$. In embodiments, the concentration of $P_2O_5$ in the core glass composition may be greater than or equal to 0 mol %, greater than or equal to 0.5 mol %, greater than or equal to 1 mol %, or even greater than or equal to 2 mol %. In embodiments, the concentration of $P_2O_5$ in the core glass composition may be less than or equal to 5 mol % or even less than or equal to 4 mol %. In embodiments, the concentration of $P_2O_5$ in the core glass composition may be greater than or equal to 0 mol % and less than or equal to 5 mol %, greater than or equal to 0 mol % and less than or equal to 4 mol %, greater than or equal to 0.5 mol % and less than or equal to 5 mol %, greater than or equal to 0.5 mol % and less than or equal to 4 mol %, greater than or equal to 1 mol % and less than or equal to 5 mol %, greater than or equal to 1 mol % and less than or equal to 4 mol %, greater than or equal to 2 mol % and less than or equal to 5 mol %, or even greater than or equal to 2 mol % and less than or equal to 4 mol %, or any and all sub-ranges formed from any of these endpoints.

In embodiments, the core glass compositions described herein may further include one or more fining agents. In embodiments, the fining agents may include, for example, $SnO_2$. In embodiments, the concentration of $SnO_2$ in the core glass composition may be greater than or equal to 0 mol % and less than or equal to 0.5 mol %. In embodiments, the glass composition may be free or substantially free of $SnO_2$.

In embodiments, the core glass compositions described herein may further include tramp materials such as $Fe_2O_3$, $TiO_2$, MnO, $MoO_3$, $WO_3$, $Y_2O_3$, CdO, $As_2O_3$, $Sb_2O_3$, sulfur-based compounds, such as sulfates, halogens, or combinations thereof. In embodiments, the core glass compositions may be free or substantially free of individual tramp materials, a combination of tramp materials, or all tramp materials. For example, in embodiments, the core glass compositions may be free or substantially free of $Fe_2O_3$, $TiO_2$, MnO, $MoO_3$, $WO_3$, $Y_2O_3$ CdO, $As_2O_3$, $Sb_2O_3$, sulfur-based compounds, such as sulfates, halogens, or combinations thereof.

In embodiments, the $LTCTE_{core}$ may be greater than or equal to 6 ppm/° C. and less than or equal to 9 ppm/° C. In embodiments, the $LTCTE_{core}$ may be greater than or equal to 6 ppm/° C., greater than or equal to 6.5 ppm/° C., or even greater than or equal to 7 ppm/° C. In embodiments, the $LTCTE_{core}$ may be less than or equal to 9 ppm/° C. or even less than or equal to 8.5 ppm/° C. In embodiments, the $LTCTE_{core}$ may be greater than or equal to 6 ppm/° C. and less than or equal to 9 ppm/° C., greater than or equal to 6 ppm/° C. and less than or equal to 8.5 ppm/° C., greater than or equal to 6.5 ppm/° C. and less than or equal to 9 ppm/° C., greater than or equal to 6.5 ppm/° C. and less than or equal to 8.5 ppm/° C., greater than or equal to 7 ppm/° C. and less than or equal to 9 ppm/° C., or even greater than or equal to 7 ppm/° C. and less than or equal to 8.5 ppm/° C., or any and all sub-ranges formed from any of these endpoints.

In embodiments, the $HTCTE_{core}$ may be greater than or equal to 35 ppm/° C. and less than or equal to 45 ppm/° C. In embodiments, the $HTCTE_{core}$ may be greater than or equal to 35 ppm/° C. or even greater than or equal to 38 ppm/° C. In embodiments, the $HTCTE_{core}$ may be less than or equal to 45 ppm/° C. or even less than or equal to 43 ppm/° C. In embodiments, the $HTCTE_{core}$ may be greater than or equal to 35 ppm/° C. and less than 45 ppm/° C., greater than or equal to 35 ppm/° C. and less than 43 ppm/° C., greater than or equal to 38 ppm/° C. and less than 45 ppm/° C., or even greater than or equal to 38 ppm/° C. and less than 43 ppm/° C., or any and all sub-ranges formed from any of these endpoints.

In embodiments, the core glass composition may have an annealing point greater than or equal to 500° C. and less than or equal to 600° C. In embodiments, the core glass composition may have an annealing point greater than or equal to 500° ° C. or even greater than or equal to 525° C. In embodiments, the core glass composition may have an annealing point less than or equal to 600° C. or even less than or equal to 575° C. In embodiments, the core glass composition may have an annealing point greater than or equal to 500° C. and less than or equal to 600° C., greater than or equal to 500° C. and less than or equal to 575° C., greater than or equal to 525° C. and less than or equal to 600° C., or even greater than or equal to 525° C. and less than or equal to 575° C., or any and all sub-ranges formed from any of these endpoints.

In embodiments, the core glass composition may have a density greater than or equal to 2.4 g/cm$^3$ or even greater than or equal to 2.45 g/cm$^3$. In embodiments, the core glass composition may have a density less than or equal to 2.6 g/cm$^3$ or even less than or equal to 2.55 g/cm$^3$. In embodiments, the core glass composition may have a density greater than or equal to 2.4 g/cm$^3$ and less than or equal to 2.6 g/cm$^3$, greater than or equal to 2.4 g/cm$^3$ and less than or equal to 2.55 g/cm$^3$, greater than or equal to 2.45 g/cm$^3$ and less than or equal to 2.6 g/cm$^3$, or even greater than or equal to 2.45 g/cm$^3$ and less than or equal to 2.55 g/cm$^3$, or any and all sub-ranges formed from any of these endpoints.

In embodiments, the core glass composition may have a strain point greater than or equal to 450° C. or even greater than or equal to 500° C. In embodiments, the core glass composition may have a strain point less than or equal to 600° C. or even less than or equal to 550° C. In embodiments, the core glass composition may have a strain point greater than or equal to 450° C. and less than or equal to 600° C., greater than or equal to 450° C. and less than or equal to 550° ° C., greater than or equal to 500° C. and less than or equal to 600° C., or even greater than or equal to 500° C. and less than or equal to 550° C., or any and all sub-ranges formed from any of these endpoints.

In embodiments, the core glass composition may have a softening point greater than or equal to 650° C. or even greater than or equal to 675° C. In embodiments, the core glass composition may have a softening point less than or equal to 750° C. or even less than or equal to 725° C. In embodiments, the core glass composition may have a softening point greater than or equal to 650° C. and less than or equal to 750° C., greater than or equal to 650° C. and less than or equal to 725° C., greater than or equal to 675° C. and less than or equal to 750° C., greater than or equal to 675° C. and less than or equal to 725° C., or any and all sub-ranges formed from any of these endpoints.

In embodiments, the core glass composition may have an SOC greater than or equal to 2.4 nm/mm/MPa or even greater than or equal to 2.6 nm/mm/MPa. In embodiments, the core glass composition may have an SOC less than or equal to 3.2 nm/mm/MPa or even less than or equal to 2.8 nm/mm/MPa. In embodiments, the core glass composition may have an SOC greater than or equal to 2.4 nm/mm/MPa and less than or equal to 3.2 nm/mm/MPa, greater than or equal to 2.4 nm/mm/MPa and less than or equal to 2.8 nm/mm/MPa, greater than or equal to 2.6 nm/mm/MPa and less than or equal to 3.2 nm/mm/MPa, or even greater than or equal to 2.6 nm/mm/MPa and less than or equal to 2.8 nm/mm/MPa, or any and all sub-ranges formed from any of these endpoints.

In embodiments, the core glass composition may have a Young's modulus greater than or equal to 65 GPa or even greater than or equal to 70 GPa. In embodiments, the core glass composition may have a Young's modulus less than or equal to 85 GPa or even less than or equal to 80 GPa. In embodiments, the core glass composition may have a Young's modulus greater than or equal to 65 GPa and less than or equal to 85 GPa, greater than or equal to 65 GPa and less than or equal to 80 GPa, greater than or equal to 70 GPa and less than or equal to 85 GPa, or even greater than or equal to 70 GPa and less than or equal to 80 GPa, or any and all sub-ranges formed from any of these endpoints.

In embodiments, the core glass composition may have a shear modulus greater than or equal to 25 GPa or even greater than or equal to 30 GPa. In embodiments, the core glass composition may have a shear modulus less than or equal to 40 GPa or even less than or equal to 25 GPa. In embodiments, the core glass composition may have a shear modulus greater than or equal to 25 GPa and less than or equal to 40 GPa, greater than or equal to 25 GPa and less than or equal to 35 GPa, greater than or equal to 30 GPa and less than or equal to 40 GPa, or even greater than or equal to 30 GPa and less than or equal to 35 GPa, or any and all sub-ranges formed from any of these endpoints.

In embodiments, the core glass composition may have a refractive index greater than or equal to 1.45 or even greater than or equal to 1.5. In embodiments, the core glass composition may have a refractive index less than or equal to 1.6 or even less than or equal to 1.55. In embodiments, the core glass composition may have a refractive index greater than or equal to 1.45 and less than or equal to 1.6, greater than or equal to 1.45 and less than or equal to 1.55, greater than or equal to 1.5 and less than or equal to 1.6, or even greater than or equal to 1.5 and less than or equal to 1.55, or any and all sub-ranges formed from any of these endpoints.

In embodiments, the core glass composition may have a Poisson's ratio greater than or equal to 0.15 or even greater than or equal to 0.2. In embodiments, the core glass composition may have a Poisson's ratio less than or equal to 0.3 or even less than or equal to 0.25. In embodiments, the core glass composition may have a Poisson's ratio greater than or equal to 0.15 and less than or equal to 0.3, greater than or equal to 0.15 and less than or equal to 0.25, greater than or equal to 0.2 and less than or equal to 0.3, or even greater than or equal to 0.2 and less than or equal to 0.25, or any and all sub-ranges formed from any of these endpoints.

In embodiments, the core glass composition may have a VFT A greater than or equal to −2 and less than or equal to 0, a VFT B greater than or equal to 2500 and less than or equal to 4000, and a VFT T$_o$ greater than or equal to 300 and less than or equal to 400.

In embodiments, the core glass composition may have a liquidus viscosity greater than or equal to 5 kP or even greater than or equal to 10 kP. In embodiments, the core glass composition may have a liquidus viscosity less than or equal to 30 kP or even less than or equal to 25 kP. In embodiments, the core glass composition may have a liquidus viscosity greater than or equal to 5 kP and less than or equal to 30 kP, greater than or equal to 5 kP and less than or equal to 25 kP, greater than or equal to 10 kP and less than or equal to 30 kP, or even greater than or equal to 10 kP and less than or equal to 25 kP, or any and all sub-ranges formed from any of these endpoints.

Glass Laminate Article

Referring now to FIG. 1, the glass compositions described herein may be used to form a glass article, such as glass laminate article 100. The glass laminate article 100 includes a glass core layer 102 formed from a core glass composition. The core glass layer 102 may be interposed between a pair of clad glass layers, first clad glass layer 104a and second clad glass layer 104b. The first clad glass layer 104a and the second clad glass layer 104b may be formed from a first clad glass composition and a second clad glass composition, respectively. In embodiments, the first clad glass composition and the second clad glass composition may be the same material. In embodiments, the first clad glass composition and the second clad glass composition may be different materials.

FIG. 1 illustrates the core glass layer 102 having a first surface 103a and a second surface 103b opposed to the first surface 103a. The first clad glass layer 104a is fused directly to the first surface 103a of the core glass layer 102 and the second clad glass layer 104b is fused directly to the second surface 103b of the core glass layer 102. The clad glass layers 104a, 104b are fused to the core glass layer 102 without any additional materials, such as adhesives, polymer layers, coating layers or the like being disposed between the core glass layer 102 and the clad glass layers 104a, 104b. Thus, the first surface 103a of the core glass layer 102 is directly adjacent the first clad glass layer 104a, and the second surface 103b of the core glass layer 102 is directly adjacent the second clad glass layer 104b. In embodiments, the core glass layer 102 and the clad glass layers 104a, 104b are formed via a fusion lamination process. Diffusive layers (not shown) may form between the core glass layer 102 and the clad glass layers 104a, 104b. In such case, the CTE of the diffusive layer has a value between that of the CTE of the core glass layer 102 and the clad glass layers 104a, 104b.

In embodiments, the glass laminate article may have a thickness greater than or equal to 0.1 mm and less than or equal 3 mm, greater than or equal to 0.1 mm and less than or equal to 2 mm, greater than or equal to 0.1 mm and less than or equal to 1 mm, greater than or equal to 0.3 mm and less than or equal 3 mm, greater than or equal to 0.3 mm and less than or equal to 2 mm, greater than or equal to 0.3 mm and less than or equal to 1 mm, greater than or equal to 0.5 mm and less than or equal 3 mm, greater than or equal to 0.5 mm and less than or equal to 2 mm, or even greater than or equal to 0.5 mm and less than or equal to 1 mm, or any and all sub-ranges formed from any of these endpoints.

In embodiments, the glass laminate article 100 may have a thickness t and each clad glass layer 104a, 104b may have a thickness greater than or equal to 0.01 t and less than or equal to 0.35 t, greater than or equal to 0.01 t and less than or equal to 0.25 t, greater than or equal to 0.01 t and less than or equal to 0.15 t, greater than or equal to 0.01 t and less than or equal to 0.1 t, greater than or equal to 0.025 t and less than or equal to 0.35 t, greater than or equal to 0.025 t and less than or equal to 0.25 t, greater than or equal to 0.025 t and less than or equal to 0.15 t, greater than or equal to 0.025 t and less than or equal to 0.1 t, greater than or equal to 0.05 t and less than or equal to 0.35 t, greater than or equal to 0.05 t and less than or equal to 0.25 t, greater than or equal to 0.05 t and less than or equal to 0.15 t, or even greater than or equal to 0.05 t and less than or equal to 0.1 t, or any and all sub-ranges formed from any of these endpoints.

Figure 2:
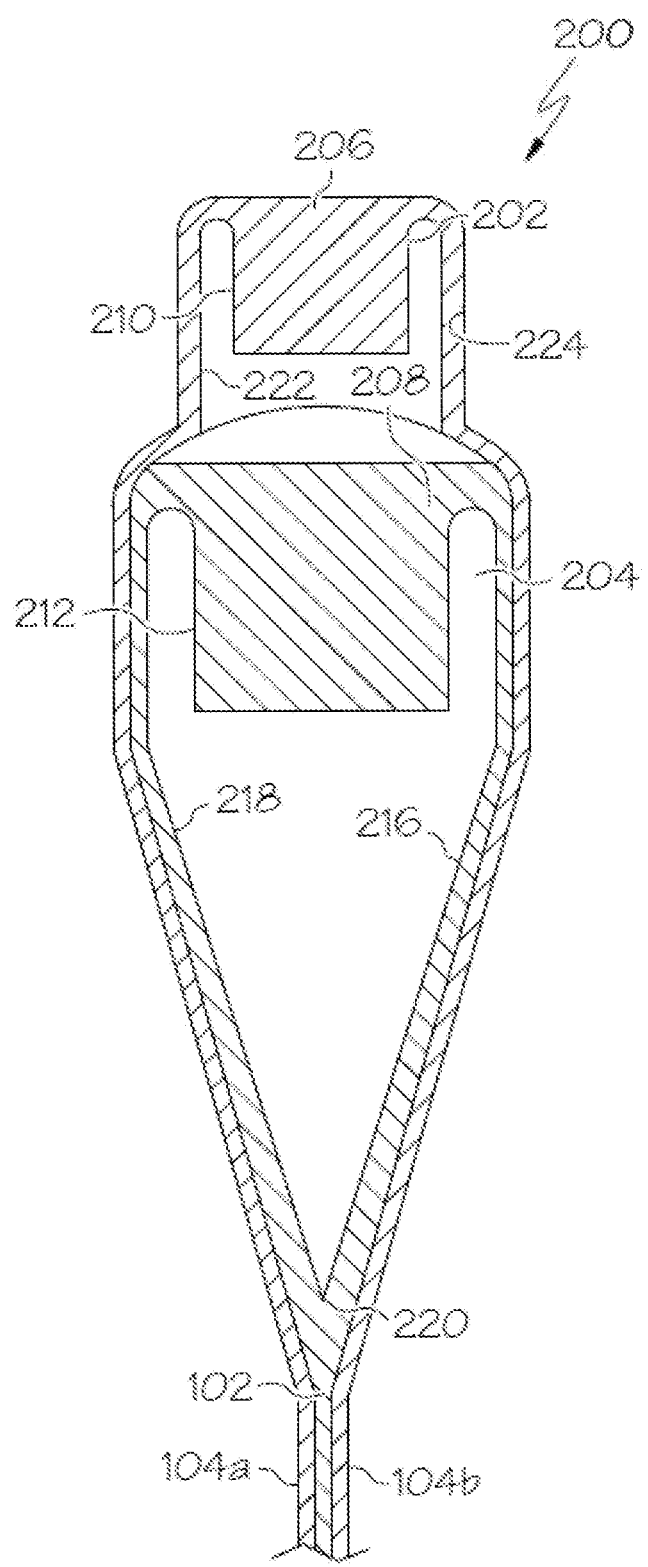
FIG. 2 is a schematic view of an embodiment of a fusion draw process for making the glass laminate article of FIG. 1.

The glass laminate articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a glass laminate article includes an upper isopipe 202 which is positioned over a lower isopipe 204. The upper isopipe 202 includes a trough 210 into which a molten clad glass composition 206 is fed from a melter (not shown). Similarly, the lower isopipe 204 includes a trough 212 into which a molten core glass composition is fed from a melter (not shown).

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten core glass composition 208 flowing over the outer forming surfaces 216, 218 rejoins at the root 220 of the lower isopipe 204, thereby forming a core glass layer 102 of a glass laminate article.

Simultaneously, the molten clad glass composition 206 overflows the trough 210 formed in the upper isopipe 202 and flows over outer forming surfaces 222, 224 of the upper isopipe 202. The molten clad glass composition 206 is outwardly deflected by the upper isopipe 202 such that the molten clad glass composition 206 flows around the lower isopipe 204 and contacts the molten core composition 208 flowing over the outer forming surfaces 216, 218 of the lower isopipe, fusing the molten core glass composition and forming clad glass layers 104a, 104b around the core layer 102.

Upon cooling of the glass laminate article 100 after the lamination process, the CTE differential between the core glass layer 102 and the clad glass layers 104a, 104b is sufficient to cause the core glass layer 102 to contract or shrink more than the clad glass layers 104a, 104b. This causes the core glass layer 102 to be in a state of tension and the clad glass layers 104a, 104b to be in a state of compression. The compressive stresses in the clad glass layers 104a, 104b inhibit fracture formation and fracture propagation into clad glass layers 104a, 104b, thereby strengthening the glass laminate article 100.

As described herein, conventionally, the core glass composition and clad glass composition combination is selected to produce a sufficient LTCTE difference between the core glass layer and clad glass layer (i.e., $\Delta \text{LTCTE}=|\text{LTCTE}_{clad}-\text{LTCTE}_{core}|$) such that the desired compressive stress (e.g., greater than or equal to 25 MPa) is achieved as calculated by Equation (1).

Instead of using Equation (1), the glass compositions disclosed herein may be selected to form a glass laminate article having the desired compressive stress by ensuring that there is a sufficient differential across the entire CTE curve from room temperature to above the glass transition temperature. Evaluating the entire CTE curve takes into consideration both the LTCTE differential and the HTCTE differential between the core glass layer and the clad glass layers.

The entire curve CTE differential appreciates these contributions and may be represented by the integrated CTE differential according to the following formula:

$$\int_{25°C.}^{T_{11}^{lower}} [\text{CTE}_{core}(T)-\text{CTE}_{clad}(T)]dt \qquad (4)$$

where $T_{11}^{lower}$ is the lower $10^{11}$ poise temperature of the core glass layer and the clad glass layer. $T_{11}^{lower}$ may be calculated using the VFT parameters of the clad glass composition and the core glass composition. In embodiments, the integrated CTE differential may be greater than or equal to 400 ppm to ensure that a desired compressive stress (e.g., greater than or equal to 25 MPa) is achieved. In embodiments, the integrated CTE differential may be greater than or equal to 400 ppm, greater than or equal to 600 ppm, greater than or equal to 800 ppm, or even greater than or equal to 1000 ppm.

To produce a glass laminate article having a relatively large integrated CTE and, thus, a relative increased CS, a clad glass composition may be paired with a core glass composition such that $\text{CTE}_{clad}$ is less than $\text{CTE}_{core}$ at temperatures lower than $T_{11}^{lower}$. In embodiments, an annealing point of the clad glass layer may be greater than an annealing point of the core glass layer to enable a larger entire CTE curve differential. A relatively greater annealing point of the clad glass layer moves the CTE curve of the clad glass layer to the right, creating a larger CTE curve differential between the core glass layer and the clad glass layer.

In embodiments, the LTCTE differential is less than the HTCTE differential (i.e., $|\text{LTCTE}_{clad}-\text{LTCTE}_{core}|$ is less than $|\text{HTCTE}_{clad}-\text{HTCTE}_{core}|$). Accordingly, in embodiments, substantial compressive stresses may be generated due to the HTCTE differential between the core glass composition and the clad glass composition while their LTCTE are similar or matched. In such embodiments, for example, the clad glass composition may comprise greater than or equal to 63 mol % and less than or equal to 70 mol % $SiO_2$; greater than or equal to 8 mol % and less than or equal to 13 mol % $Al_2O_3$; greater than or equal to 0 mol % and less than or equal to 12 mol % $B_2O_3$; greater than or equal to 0 mol % and less than or equal to 14 mol % $Na_2O$; greater than or equal to 0 mol % and less than or equal to 3 mol % $K_2O$; greater than or equal to 0.5 mol % and less than or equal to 7 mol % MgO; greater than or equal to 0.5 mol % and less than or equal to 10 mol % CaO; and greater than or equal to 0 mol % and less than or equal to 2 mol % SrO; and the core glass composition may comprise greater than or equal to 63 mol % and less than or equal to 70 mol % $SiO_2$; greater than or equal to 0.5 mol % and less than or equal to 5 mol % $Al_2O_3$; greater than or equal to 1 mol % and less than or equal to 20 mol % $B_2O_3$; greater than or equal to 0 mol % and less than or equal to 8 mol % MgO; greater than or equal to 1 mol % and less than or equal to 12 mol % CaO; greater than or equal to 2 mol % and less than or equal to 15 mol % $Na_2O$; and greater than or equal to 0 mol % and less than or equal to 6 mol % $K_2O$.

The laminate stress σ may be predicted by a viscoelastic model using finite element analysis (FEA) simulations as described in G. W. Scherer, Relaxation in Glass and Composites, Published by John Wiley and Sons, Inc. 1986 and O. S. Narayanaswamy, A model of structural relaxation in glass, Journal of the American Ceramic Society, 54 (1971) 491-498, (3) U.S. Pat. No. 9,346,699, which are incorporated herein by reference, and can be approximated by the following equation:

$$\sigma = \int_{25°C.}^{T_{max}} \frac{[CTE_{core}(T) - CTE_{clad}(T)]}{wt(T)} dT \quad (5)$$

where $T_{max}$ is the temperature when the laminate is formed, wt(T) is a function approximating the stress relaxation effect from the glass, having a unit of 1/Pa. wt(T) approaches a constant $wt_0$ when T is low enough so that both core and clad glass behave elastically, and approaches infinity when T is high enough so that both core and clad glass behave viscously. Equation (5) may be further simplified to:

$$\sigma = \frac{A}{wt_0} \quad (6)$$

where A is Equation (4). $T_{11}^{lower}$ is the chosen set temperature, above which the glasses are treated viscously wt(T)→∞; below which the glasses are treated elastically wt(T)=$wt_0$. The larger the integrated area A in Equation (4), the greater the laminate stress.

In embodiments, a thickness of the clad glass layer ($t_{clad}$) may be greater than or equal to 0.2 t and a surface compressive stress of the glass laminate article may be greater than or equal to 25 MPa. In embodiments, a thickness of the clad glass layer ($t_{clad}$) may be greater than or equal to 0.2 t and a surface compressive stress of the glass laminate article may be greater than or equal to 25 MPa, greater than or equal to 50 MPa, or even greater than or equal to 75 MPa. In embodiments, a thickness of the clad glass layer ($t_{clad}$) may be greater than or equal to 0.2 t and a surface compressive stress of the glass laminate article may be less than or equal to 200 MPa, less than or equal to 150 MPa, or even less than or equal to 100 MPa. In embodiments, a thickness of the clad glass layer ($t_{clad}$) may be greater than or equal to 0.2 t and a surface compressive stress of the glass laminate article may be greater than or equal to 25 MPa and less than or equal to 200 MPa, greater than or equal to 25 MPa and less than or equal to 150 MPa, greater than or equal to 25 MPa and less than or equal to 100 MPa, greater than or equal to 50 MPa and less than or equal to 200 MPa, greater than or equal to 50 MPa and less than or equal to 150 MPa, greater than or equal to 50 MPa and less than or equal to 100 MPa, greater than or equal to 75 MPa and less than or equal to 200 MPa, greater than or equal to 75 MPa and less than or equal to 150 MPa, or even greater than or equal to 75 MPa and less than or equal to 100 MPa, or any and all sub-ranges formed from any of these endpoints.

In embodiments, a thickness of the clad glass layer ($t_{clad}$) may be greater than or equal to 0.25 t and a surface compressive stress of the glass laminate article is greater than or equal to 25 MPa. In embodiments, a thickness of the clad glass layer ($t_{clad}$) may be greater than or equal to 0.25 t and a surface compressive stress of the glass laminate article may be greater than or equal to 25 MPa, greater than or equal to 50 MPa, or even greater than or equal to 75 MPa. In embodiments, a thickness of the clad glass layer ($t_{clad}$) may be greater than or equal to 0.25 t and a surface compressive stress of the glass laminate article may be less than or equal to 200 MPa, less than or equal to 150 MPa, or even less than or equal to 100 MPa. In embodiments, a thickness of the clad glass layer ($t_{clad}$) may be greater than or equal to 0.25 t and a surface compressive stress of the glass laminate article may be greater than or equal to 25 MPa and less than or equal to 200 MPa, greater than or equal to 25 MPa and less than or equal to 150 MPa, greater than or equal to 25 MPa and less than or equal to 100 MPa, greater than or equal to 50 MPa and less than or equal to 200 MPa, greater than or equal to 50 MPa and less than or equal to 150 MPa, greater than or equal to 50 MPa and less than or equal to 100 MPa, greater than or equal to 75 MPa and less than or equal to 200 MPa, greater than or equal to 75 MPa and less than or equal to 150 MPa, or even greater than or equal to 75 MPa and less than or equal to 100 MPa, or any and all sub-ranges formed from any of these endpoints.

In embodiments, a central tension of the glass laminate article may be greater than or equal to 25 MPa, greater than or equal to 35 MPa, or even greater than or equal to 45 MPa. In embodiments, a central tension of the glass laminate article may be less than or equal to 75 MPa, less than or equal to 65 MPa, or even greater than or equal to 55 MPa. In embodiments, a central tension of the glass laminate article may be greater than or equal to 25 MPa and less than or equal to 75 MPa, greater than or equal to 25 MPa and less than or equal to 65 MPa, greater than or equal 25 MPa and less than or equal to 55 MPa, greater than or equal to 35 MPa and less than or equal to 75 MPa, greater than or equal to 35 MPa and less than or equal to 65 MPa, greater than or equal 35 MPa and less than or equal to 55 MPa, greater than or equal to 45 MPa and less than or equal to 75 MPa, greater than or equal to 45 MPa and less than or equal to 65 MPa, or even greater than or equal 45 MPa and less than or equal to 55 MPa, or any and all sub-ranges formed from any of these endpoints.

In embodiments, it may be desirable to further strengthen the glass laminate article via ion-exchange chemical strengthening. Therefore, it may be desirable for the clad glass composition to include a relatively high concentration of $Na_2O$ (e.g., greater than or equal to 7 mol %) such that the laminated glass article may be subjected to ion-exchange strengthening. However, increasing the concentration of Na$_2$O increases the LTCTE$_{clad}$, which reduces the LTCTE differential between the core glass layer and the clad glass layers and decreases the compressive stress of the glass laminate articles as calculated by Equation (1). However, evaluating the entire CTE curve as represented by Equation (4) allows for a reduced LTCTE differential resulting from a relatively high concentration of Na$_2$O (e.g., greater than or equal to 7 mol %) in the clad glass layer to be compensated for by ensuring a relatively greater HTCTE differential. In such embodiments, for example, the clad glass composition may comprise greater than or equal to 63 mol % and less than or equal to 76 mol % SiO$_2$; greater than or equal to 7 mol % and less than or equal to 16 mol % Al$_2$O$_3$; greater than or equal to 1 mol % and less than or equal to 12 mol % B$_2$O$_3$; greater than or equal to 7 mol % and less than or equal to 14 mol % Na$_2$O; greater than or equal to 0 mol % and less than or equal to 3 mol % K$_2$O; greater than or equal to 0 mol % and less than or equal to 5 mol % Li$_2$O; greater than or equal to 0 mol % and less than or equal to 7 mol % MgO; greater than or equal to 0 mol % and less than or equal to 3 mol % CaO; and greater than or equal to 0 mol % and less than or equal to 5 mol % P$_2$O$_5$; and the core glass composition may comprise greater than or equal to 60 mol % and less than or equal to 73 mol % SiO$_2$; greater than or equal to 1 mol % and less than or equal to 16.5 mol % Al$_2$O$_3$; greater than or equal to 0 mol % and less than or equal to 8 mol % B$_2$O$_3$; greater than or equal to 0 mol % and less than or equal to 8 mol % MgO; greater than or equal to 0 mol % and less than or equal to 10 mol % Li$_2$O; greater than or equal to 9 mol % and less than or equal to 15 mol % Na$_2$O; greater than or equal to 0 mol % and less than or equal to 5 mol % K$_2$O; and greater than or equal to 0 mol % and less than or equal to 5 mol % P$_2$O$_5$.

In typical ion-exchange processes, smaller metal ions in the glass compositions are replaced or "exchanged" with larger metal ions of the same valence within the clad glass layer made from the clad glass composition. The replacement of smaller ions with larger ions increases the compressive stress within the clad glass layer of the glass laminate article. In embodiments, the metal ions are monovalent metal ions (e.g., Li$^+$, Na$^+$, K$^+$, and the like), and ion-exchange is accomplished by immersing the glass laminate article in a bath comprising at least one molten salt of the larger metal ion that is to replace the smaller metal ion in clad glass layer formed from the clad glass composition. Alternatively, other monovalent ions such as Ag$^+$, Tl$^+$, Cu$^+$, and the like may be exchanged for monovalent ions. The ion-exchange process or processes that are used to strengthen the glass laminate article may include, but are not limited to, immersion in a single bath or multiple baths of like or different compositions with washing and/or annealing steps between immersions.

Upon exposure to the glass laminate article, the ion-exchange solution (e.g., KNO$_3$ and/or NaNO$_3$ molten salt bath) may, according to embodiments, be at a temperature greater than or equal to 350° C. and less than or equal to 500° ° C., greater than or equal to 360° C. and less than or equal to 450° ° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 500° C., greater than or equal to 410° ° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In embodiments, the glass laminate article may be exposed to the ion-exchange solution for a duration greater than or equal to 2 hours and less than or equal to 48 hours, greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 44 hours, greater than or equal to 12 hours and less than or equal to 40 hours, greater than or equal to 16 hours and less than or equal to 36 hours, greater than or equal to 20 hours and less than or equal to 32 hours, or even greater than or equal to 24 hours and less than or equal to 28 hours, or any and all sub-ranges between the foregoing values.

In embodiments, the glass laminate article may have a compressive stress after ion-exchange strengthening greater than or equal to 500 MPa, greater than or equal than or equal to 550 MPa, or even greater than or equal to 600 MPa. In embodiments, the glass laminate article may have a compressive stress after ion-exchange strengthening less than or equal to 900 MPa, less than or equal to 800 MPa, or even less than or equal to 700 MPa. In embodiments, the glass laminate article may have a compressive stress after ion-exchange strengthening greater than or equal to 500 MPa and less than or equal to 900 MPa, greater than or equal to 500 MPa and less than or equal to 800 MPa, greater than or equal to 500 MPa and less than or equal to 700 MPa, greater than or equal to 550 MPa and less than or equal to 900 MPa, greater than or equal to 550 MPa and less than or equal to 800 MPa, greater than or equal to 550 MPa and less than or equal to 700 MPa, greater than or equal to 600 MPa and less than or equal to 900 MPa, greater than or equal to 600 MPa and less than or equal to 800 MPa, or even greater than or equal to 600 MPa and less than or equal to 700 MPa, or any and all sub-ranges formed from any of these endpoints.

In embodiments, a glass laminate article having a thickness greater than or equal to 0.1 mm and less than or equal to 3 mm may be ion-exchanged to achieve a depth of compression greater than or equal to 5 μm and less than or equal to 45 μm, greater than or equal to 5 μm and less than or equal to 40 μm, greater than or equal to 5 μm and less than or equal to 35 μm, greater than or equal to 5 μm and less than or equal to 30 μm, greater than or equal to 10 μm and less than or equal to 45 μm, greater than or equal to 10 μm and less than or equal to 40 μm, greater than or equal to 10 μm and less than or equal to 35 μm, greater than or equal to 10 μm and less than or equal to 30 μm, greater than or equal to 15 μm and less than or equal to 45 μm, greater than or equal to 15 μm and less than or equal to 40 μm, greater than or equal to 15 μm and less than or equal to 35 μm, greater than or equal to 15 μm and less than or equal to 30 μm, greater than or equal to 20 μm and less than or equal to 45 μm, greater than or equal to 20 μm and less than or equal to 40 μm, greater than or equal to 20 μm and less than or equal to 35 μm, or even greater than or equal to 20 μm and less than or equal to 30 μm, or any and all sub-ranges formed from any of these endpoints.

In embodiments, a glass laminate article may be ion-exchanged to achieve a depth of compression greater than or equal to 5%, greater than or equal to 10%, or even greater than or equal to 15% of a thickness of the glass laminate article. In embodiments, a glass laminate article m may be ion-exchanged to achieve a depth of compression less than or equal to 35%, less than or equal to 30%, or even less than or equal to 25% of a thickness of the glass laminate article. In embodiments, a glass laminate article may be ion-exchanged to achieve a depth of compression greater than or equal to 5% and less than or equal to 35%, greater than or equal to 5% and less than or equal to 30%, greater than or equal to 5% and less than or equal to 25%, greater than or equal to 10% and less than or equal to 35%, greater than or equal to 10% and less than or equal to 30%, greater than or equal to 10% and less than or equal to 25%, greater than or equal to 15% and less than or equal to 35%, greater than or equal to 15% and less than or equal to 30%, or even greater than or equal to 15% and less than or equal to 25%, or any and all sub-ranges formed from any of these endpoints, of a thickness of the glass laminate article.

In embodiments, the glass laminate articles may have a central tension after ion-exchange strengthening greater than or equal to 40 MPa, greater than or equal to 80 MPa, or even greater than or equal to 120 MPa. In embodiments, the glass laminate articles may have a central tension after ion-exchange strengthening less than or equal to 500 MPa, less than or equal to 400 MPa, less than or equal to 300 MPa, or even less than or equal to 200 MPa. In embodiments, the glass laminate articles may have a central tension after ion-exchange strengthening greater than or equal to 40 MPa and less than or equal to 500 MPa, greater than or equal to 40 MPa and less than or equal to 400 MPa, greater than or equal to 40 MPa and less than or equal to 300 MPa, greater than or equal to 40 MPa and less than or equal to 200 MPa, greater than or equal to 80 MPa and less than or equal to 500 MPa, greater than or equal to 80 MPa and less than or equal to 400 MPa, greater than or equal to 80 MPa and less than or equal to 300 MPa, greater than or equal to 80 MPa and less than or equal to 200 MPa, greater than or equal to 120 MPa and less than or equal to 500 MPa, greater than or equal to 120 MPa and less than or equal to 400 MPa, greater than or equal to 120 MPa and less than or equal to 300 MPa, or even greater than or equal to 120 MPa and less than or equal to 200 MPa, or any and all sub-ranges formed from any of these endpoints.

Figure 3:
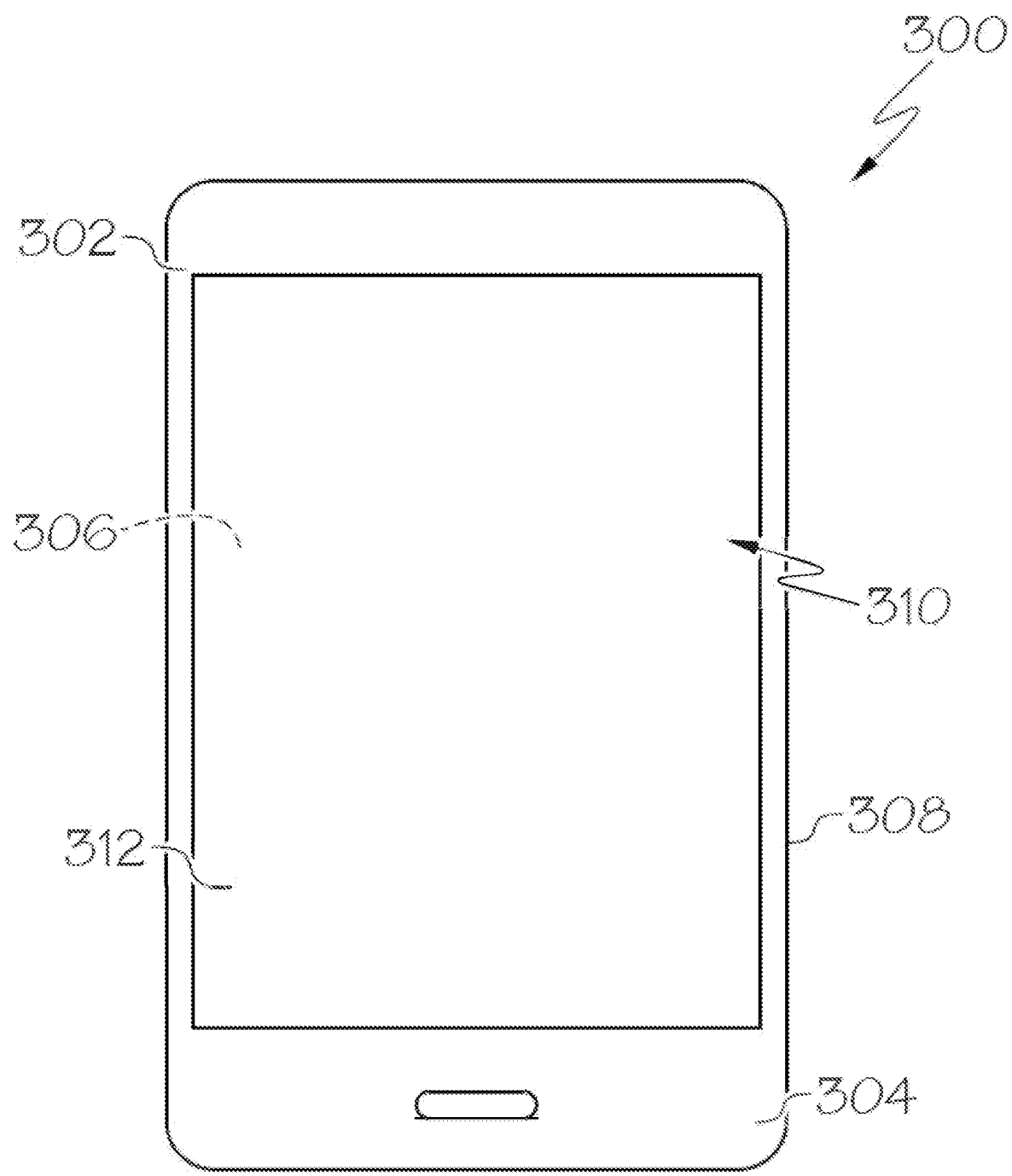
FIG. 3 is a plan view of an electronic device incorporating any of the glass laminate articles according to one or more embodiments described herein.
Figure 4:
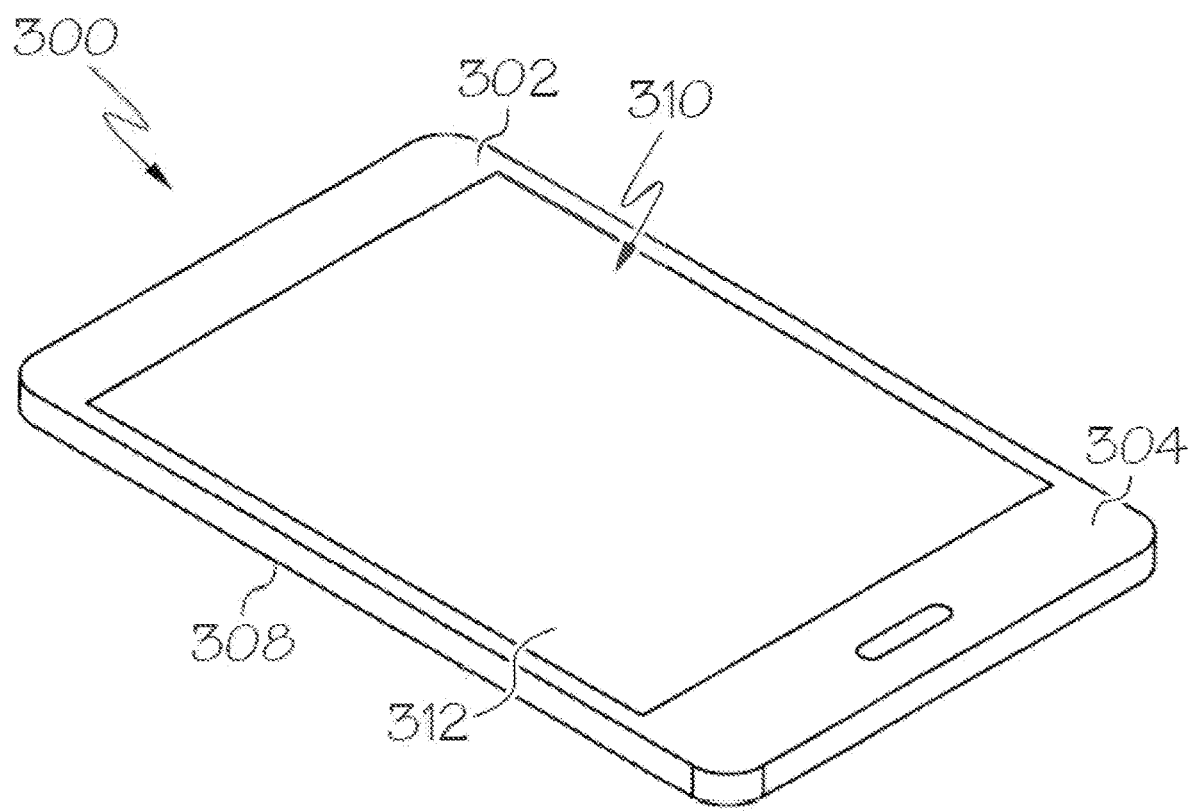
FIG. 4 is a perspective view of the electronic device of FIG. 3.

The glass laminate articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass laminate articles disclosed herein is shown in FIGS. 3 and 4. Specifically, FIGS. 3 and 4 show a consumer electronic device 300 including a housing 302 having front 304, back 306, and side surfaces 308; electrical components (not shown) that are at least partially inside or entirely within the housing and including at least a controller, a memory, and a display 310 at or adjacent to the front surface of the housing; and a cover substrate 312 at or over the front surface of the housing such that it is over the display. In some embodiments, at least one of the cover substrate 312 or a portion of housing 302 may include any of the glass articles disclosed herein.

EXAMPLES

In order that various embodiments be more readily understood, reference is made to the following examples, which are intended to illustrate various embodiments of the glass compositions described herein.

Table 1 shows clad glass compositions (in terms of mol %) and the respective properties of the glass compositions. Clad glass layers are formed having the example clad glass compositions 1-31. Table 2 shows core glass compositions (in terms of mol %) and the respective properties of the glass compositions. Core glass layers are formed having the example core glass compositions 32-39.

TABLE 1

| Example | 1 | 2 | 3 | 4 | 5 | 6 |
|---|---|---|---|---|---|---|
| $SiO_2$ | 72.77 | 70.79 | 70.61 | 72.67 | 72.60 | 73.57 |
| $Al_2O_3$ | 8.66 | 10.00 | 9.99 | 8.98 | 8.97 | 8.96 |
| $P_2O_5$ | 0 | 0 | 0 | 0 | 0 | 0 |
| $B_2O_3$ | 8.57 | 8.57 | 8.69 | 8.61 | 8.43 | 7.68 |
| $Li_2O$ | 0 | 0 | 0 | 0 | 0 | 0 |
| $Na_2O$ | 9.87 | 10.51 | 10.34 | 9.61 | 9.62 | 9.65 |
| $K_2O$ | 0 | 0 | 0.23 | 0 | 0.24 | 0 |
| MgO | 0 | 0 | 0 | 0 | 0 | 0 |
| CaO | 0 | 0 | 0 | 0 | 0 | 0 |
| SrO | 0 | 0 | 0 | 0 | 0 | 0 |
| $SnO_2$ | 0.10 | 0.10 | 0.10 | 0.10 | 0.10 | 0.10 |
| $R_2O$ | 9.87 | 10.51 | 10.57 | 9.61 | 9.86 | 9.65 |
| RO | 0 | 0 | 0 | 0 | 0 | 0 |
| $(R_2O + RO)/Al_2O_3$ | 1.14 | 1.05 | 1.06 | 1.07 | 1.10 | 1.08 |
| LTCE (ppm/° C.) | 5.91 | 6.32 | 6.38 | 5.98 | 6.07 | 5.97 |
| Density (g/cm$^3$) | 2.322 | 2.326 | 2.325 | 2.313 | 2.318 | 2.318 |
| Strain Pt. (° C.) | 536 | 543 | 552 | 540 | 544 | 547 |
| Anneal Pt. (° C.) | 586 | 597 | 606 | 594 | 597 | 601 |
| Softening Pt. (° C.) | 846.3 | 877.3 | 887.3 | 879.8 | 877.0 | 883.3 |
| SOC (nm/mm/MPa) | — | — | — | — | — | — |
| Young's modulus (GPa) | 64.1 | 62.9 | 62.9 | 62.7 | 63.5 | 63.7 |
| Shear modulus (GPa) | 26.6 | 26.1 | 26.0 | 26.1 | 26.4 | 26.5 |
| Refractive index | — | — | — | — | — | — |
| Poisson's ratio | 0.204 | 0.207 | 0.209 | 0.202 | 0.202 | 0.199 |
| VFT A | −2.816 | −4.400 | −4.328 | −3.946 | −3.647 | −4.303 |
| VFT B | 9764.5 | 13896.1 | 13885.3 | 13096.8 | 12356.4 | 14201 |
| VFT $T_o$ | −140.9 | −323.4 | −320.7 | −300.0 | −278.2 | −348.9 |
| 200 Poise temperature (° C.) | 1767 | 1750 | 1774 | 1796 | 1799 | 1801 |
| 35k Poise temperature (° C.) | 1186 | 1230 | 1244 | 1243 | 1230 | 1256 |
| 100k Poise temperature (° C.) | 1108 | 1155 | 1168 | 1164 | 1151 | 1178 |

TABLE 1-continued

| | | | | | | |
|---|---|---|---|---|---|---|
| 200k Poise temperature (° C.) | 1062 | 1109 | 1121 | 1116 | 1103 | 1130 |
| Liquidus temperature (° C.) | <815 | <895 | <810 | <790 | <805 | <840 |

| Example | 7 | 8 | 9 | 10 | 11 | 12 |
|---|---|---|---|---|---|---|
| $SiO_2$ | 72.56 | 70.86 | 70.36 | 70.84 | 72.47 | 70.76 |
| $Al_2O_3$ | 8.08 | 8.68 | 8.68 | 8.68 | 8.05 | 8.66 |
| $P_2O_5$ | 0 | 0 | 0 | 0 | 0 | 0 |
| $B_2O_3$ | 7.60 | 8.46 | 8.46 | 8.45 | 7.65 | 8.51 |
| $Li_2O$ | 0 | 0 | 0 | 0 | 0 | 0 |
| $Na_2O$ | 8.57 | 9.85 | 10.35 | 8.85 | 8.42 | 8.66 |
| $K_2O$ | 0 | 0 | 0 | 0 | 0.24 | 0.24 |
| MgO | 3.05 | 2.02 | 2.02 | 3.04 | 3.04 | 3.03 |
| CaO | 0 | 0 | 0 | 0 | 0 | 0 |
| SrO | 0 | 0 | 0 | 0 | 0 | 0 |
| $SnO_2$ | 0.10 | 0.10 | 0.10 | 0.10 | 0.10 | 0.10 |
| $R_2O$ | 8.57 | 9.85 | 10.35 | 8.85 | 8.66 | 8.90 |
| RO | 3.05 | 2.02 | 2.02 | 3.04 | 3.04 | 3.03 |
| $(R_2O + RO)/Al_2O_3$ | 1.44 | 1.37 | 1.43 | 1.37 | 1.45 | 1.38 |
| LTCTE (ppm/° C.) | 5.59 | 6.06 | — | 5.68 | 5.7 | 5.77 |
| Density (g/cm$^3$) | 2.327 | 2.336 | 2.348 | 2.327 | 2.329 | 2.327 |
| Strain Pt. (° C.) | 552.0 | 534.9 | — | 553.0 | 555.0 | 552.0 |
| Anneal Pt. (° C.) | 603.0 | 584.8 | — | 603.0 | 604.0 | 603.0 |
| Softening Pt. (° C.) | 871.1 | 839.5 | — | 861.9 | 868.0 | 871.1 |
| SOC (nm/mm/MPa) | 3.570 | 3.562 | — | 3.621 | 3.562 | 3.57 |
| Young's modulus (GPa) | 65.7 | 65.4 | — | 65.0 | 65.8 | 65.7 |
| Shear modulus (GPa) | 27.4 | 27.1 | — | 26.9 | 27.3 | 27.4 |
| Refractive index | 1.4885 | 1.4903 | — | 1.4893 | 1.4885 | 1.4885 |
| Poisson's ratio | 0.201 | 0.207 | — | 0.208 | 0.204 | 0.201 |
| VFT A | −3.847 | −3.190 | −2.596 | −3.725 | −3.343 | −3.847 |
| VFT B | 11918.3 | 10021.5 | 8381.6 | 11220.3 | 10411.8 | 11918.3 |
| VFT $T_o$ | −199.6 | −117.2 | −21.0 | −146.6 | −102.0 | −199.6 |
| 200 Poise temperature (° C.) | 1739 | 1708 | 1691 | 1715 | 1743 | 1739 |
| 35k Poise temperature (° C.) | 1221 | 1179 | 1153 | 1210 | 1218 | 1221 |
| 100k Poise temperature (° C.) | 1148 | 1106 | 1082 | 1139 | 1146 | 1148 |
| 200k Poise temperature (° C.) | 1103 | 1063 | 1040 | 1097 | 1103 | 1103 |
| Liquidus temperature (° C.) | 1075 | 960 | — | 1065 | 1080 | 1075 |

| Example | 13 | 14 | 15 | 16 | 17 | 18 |
|---|---|---|---|---|---|---|
| $SiO_2$ | 69.72 | 69.74 | 65.17 | 69.87 | 69.37 | 69.00 |
| $Al_2O_3$ | 8.66 | 8.63 | 14.03 | 8.71 | 8.68 | 8.65 |
| $P_2O_5$ | 0 | 2.90 | 1.95 | 0 | 0 | 0 |
| $B_2O_3$ | 8.50 | 8.75 | 2.95 | 9.44 | 9.53 | 9.61 |
| $Li_2O$ | 0 | 0 | 0 | 0 | 0 | 0 |
| $Na_2O$ | 7.91 | 9.85 | 9.68 | 9.15 | 8.78 | 8.38 |
| $K_2O$ | 0 | 0 | 0 | 0 | 0 | 0 |
| MgO | 5.06 | 0 | 6.06 | 2.24 | 2.53 | 2.75 |
| CaO | 0 | 0 | 0 | 0 | 1.00 | 2.00 |
| SrO | 0 | 0 | 0 | 0 | 0 | 0 |
| $SnO_2$ | 0.10 | 0.10 | 0.10 | 0.10 | 0.11 | 0.11 |
| $R_2O$ | 7.91 | 9.85 | 9.68 | 9.15 | 8.78 | 8.38 |
| RO | 5.06 | 0.00 | 6.06 | 2.24 | 3.53 | 4.75 |
| $(R_2O + RO)/Al_2O_3$ | 1.50 | 1.14 | 1.12 | 1.31 | 1.42 | 1.52 |
| LTCTE (ppm/° C.) | 5.37 | 6.08 | 5.68 | 5.87 | 5.8 | 5.59 |
| Density (g/cm$^3$) | 2.334 | 2.310 | 2.400 | 2.334 | 2.338 | 2.343 |
| Strain Pt. (° C.) | 563.0 | 508.2 | 632.1 | 533.4 | 551.1 | 546.7 |
| Anneal Pt. (° C.) | 614.0 | 559.5 | 685.1 | 582.2 | 601.4 | 594.5 |
| Softening Pt. (° C.) | 872.4 | — | 947.2 | 832.9 | 838.4 | 842.8 |
| SOC (nm/mm/MPa) | 3.574 | 3.659 | 3.202 | 3.591 | 3.593 | 3.535 |
| Young's modulus (GPa) | 66.4 | 60.7 | 71.7 | 68.1 | 65.4 | 66.3 |
| Shear modulus (GPa) | 27.4 | 25.2 | 29.6 | 28.1 | 27.0 | 27.3 |
| Refractive index | 1.4912 | 1.4823 | 1.4985 | 1.4910 | 1.4920 | 1.4933 |
| Poisson's ratio | 0.209 | 0.202 | 0.210 | 0.210 | 0.210 | 0.214 |
| VFT A | −3.387 | −3.231 | −3.186 | −3.385 | −3.352 | −3.090 |
| VFT B | 9763.8 | 10539.9 | 9834.0 | 10182.0 | 9938.3 | 9189.2 |
| VFT $T_o$ | −33.5 | −160.0 | −93.0 | −101.7 | −73.7 | −30.0 |
| 200 Poise temperature (° C.) | 1683 | 1745 | 1664 | 1699 | 1689 | 1684 |
| 35k Poise temperature (° C.) | 1198 | 1196 | 1240 | 1179 | 1182 | 1185 |
| 100k Poise temperature (° C.) | 1131 | 1121 | 1181 | 1108 | 1113 | 1116 |
| 200k Poise temperature (° C.) | 1090 | 1075 | 1146 | 1066 | 1071 | 1075 |
| Liquidus temperature (° C.) | 1120 | 1140 | 1100 | 975 | 990 | 995 |

| Example | 19 | 20 | 21 | 22 | 23 | 24 |
|---|---|---|---|---|---|---|
| $SiO_2$ | 68.78 | 67.68 | 66.76 | 65.82 | 66.03 | 67.44 |
| $Al_2O_3$ | 8.65 | 9.65 | 10.66 | 10.93 | 10.53 | 10.20 |
| $P_2O_5$ | 0 | 0 | 0 | 0 | 0 | 0 |
| $B_2O_3$ | 9.51 | 9.66 | 9.62 | 9.65 | 9.42 | 8.93 |
| $Li_2O$ | 0.00 | 0.00 | 0.00 | 3.89 | 3.66 | 2.71 |

TABLE 1-continued

| | | | | | | |
|---|---|---|---|---|---|---|
| Na₂O | 7.93 | 7.87 | 7.85 | 8.94 | 9.43 | 9.53 |
| K₂O | 0 | 0 | 0 | 0 | 0 | 0 |
| MgO | 3.01 | 3.02 | 3.01 | 0.69 | 0.85 | 1.09 |
| CaO | 2.00 | 2.00 | 2.00 | 0 | 0 | 0 |
| SrO | 0 | 0 | 0 | 0 | 0 | 0 |
| SnO₂ | 0.10 | 0.10 | 0.10 | 0.07 | 0.07 | 0.08 |
| R₂O | 7.93 | 7.87 | 7.85 | 12.83 | 13.09 | 12.24 |
| RO | 5.01 | 5.02 | 5.01 | 0.69 | 0.85 | 1.09 |
| (R₂O + RO)/Al₂O₃ | 1.50 | 1.34 | 1.21 | 1.24 | 1.32 | 1.31 |
| LTCTE (ppm/° C.) | 5.52 | 5.43 | 5.28 | — | — | — |
| Density (g/cm³) | 2.347 | 2.349 | 2.350 | — | — | — |
| Strain Pt. (° C.) | 549.5 | 553.7 | 564.2 | — | — | — |
| Anneal Pt. (° C.) | 598.8 | 603.5 | 615.5 | — | — | — |
| Softening Pt. (° C.) | 852.4 | 858.2 | 870.7 | — | — | — |
| SOC (nm/mm/MPa) | 3.522 | 3.550 | 3.518 | — | — | — |
| Young's modulus (GPa) | 66.8 | 66.7 | 66.9 | — | — | — |
| Shear modulus (GPa) | 27.6 | 27.4 | 27.4 | — | — | — |
| Refractive index | 1.4946 | 1.4955 | 1.4963 | — | — | — |
| Poisson's ratio | 0.212 | 0.215 | 0.220 | — | — | — |
| VFT A | −3.449 | −3.384 | −3.231 | — | — | — |
| VFT B | 9607.4 | 9179.2 | 10539.9 | — | — | — |
| VFT $T_o$ | −26.6 | 31.9 | −160.0 | — | — | — |
| 200 Poise temperature (° C.) | 1675 | 1644 | 1647 | — | — | — |
| 35k Poise temperature (° C.) | 1174 | 1175 | 1190 | — | — | — |
| 100k Poise temperature (° C.) | 1106 | 1111 | 1127 | — | — | — |
| 200k Poise temperature (° C.) | 1065 | 1071 | 1089 | — | — | — |
| Liquidus temperature (° C.) | 995 | 970 | 930 | — | — | — |

| Example | 25 | 26 | 27 | 28 | 29 | 30 |
|---|---|---|---|---|---|---|
| SiO₂ | 68.65 | 69.24 | 70.02 | 70.02 | 66.53 | 68.00 |
| Al₂O₃ | 9.78 | 9.29 | 8.73 | 8.71 | 10.97 | 11.00 |
| P₂O₅ | 0 | 0 | 0 | 0 | 0 | 0 |
| B₂O₃ | 8.50 | 8.45 | 8.43 | 8.55 | 9.74 | 10.00 |
| Li₂O | 2.13 | 1.62 | 1.27 | 0.00 | 3.86 | 0 |
| Na₂O | 9.49 | 9.75 | 9.74 | 9.82 | 8.30 | 0 |
| K₂O | 0 | 0 | 0 | 0 | 0 | 0 |
| MgO | 1.37 | 1.57 | 1.74 | 1.94 | 0.50 | 2.00 |
| CaO | 0 | 0 | 0 | 0 | 0 | 9.00 |
| SrO | 0 | 0 | 0 | 0 | 0 | 1.00 |
| SnO₂ | 0.07 | 0.07 | 0.06 | 0.06 | 0.10 | 0 |
| R₂O | 11.62 | 11.37 | 11.01 | 9.82 | 12.16 | 0.00 |
| RO | 1.37 | 1.57 | 1.74 | 1.94 | 0.50 | 11.00 |
| (R₂O + RO)/Al₂O₃ | 1.33 | 1.39 | 1.46 | 1.35 | 1.15 | 1.00 |
| LTCTE (ppm/° C.) | — | — | — | — | 6.36 | — |
| Density (g/cm³) | — | — | — | — | 2.334 | — |
| Strain Pt. (° C.) | — | — | — | — | 493.0 | — |
| Anneal Pt. (° C.) | — | — | — | — | 535.0 | — |
| Softening Pt. (° C.) | — | — | — | — | 758.0 | — |
| SOC (nm/mm/MPa) | — | — | — | — | 3.416 | — |
| Young's modulus (GPa) | — | — | — | — | 69.6 | — |
| Shear modulus (GPa) | — | — | — | — | 28.7 | — |
| Refractive index | — | — | — | — | 1.4979 | — |
| Poisson's ratio | — | — | — | — | 0.214 | — |
| VFT A | — | — | — | — | — | — |
| VFT B | — | — | — | — | — | — |
| VFT $T_o$ | — | — | — | — | — | — |
| 200 Poise temperature (° C.) | — | — | — | — | — | — |
| 35k Poise temperature (° C.) | — | — | — | — | — | — |
| 100k Poise temperature (° C.) | — | — | — | — | — | — |
| 200k Poise temperature (° C.) | — | — | — | — | — | — |
| Liquidus temperature (° C.) | — | — | — | — | — | — |

| Example | 31 |
|---|---|
| SiO₂ | 66.37 |
| Al₂O₃ | 10.29 |
| P₂O₅ | 0 |
| B₂O₃ | 0.60 |
| Li₂O | 0 |
| Na₂O | 13.80 |
| K₂O | 2.40 |
| MgO | 5.74 |
| CaO | 0.59 |
| SrO | 0 |
| SnO₂ | 0.21 |
| R₂O | 16.20 |
| RO | 6.33 |
| (R₂O + RO)/Al₂O₃ | 2.19 |
| LTCTE (ppm/° C.) | — |

TABLE 1-continued

| | |
|---|---|
| Density (g/cm³) | — |
| Strain Pt. (° C.) | — |
| Anneal Pt. (° C.) | — |
| Softening Pt. (° C.) | — |
| SOC (nm/mm/MPa) | — |
| Young's modulus (GPa) | — |
| Shear modulus (GPa) | — |
| Refractive index | — |
| Poisson's ratio | — |
| VFT A | — |
| VFT B | — |
| VFT $T_o$ | — |
| 200 Poise temperature (° C.) | — |
| 35k Poise temperature (° C.) | — |
| 100k Poise temperature (° C.) | — |
| 200k Poise temperature (° C.) | — |
| Liquidus temperature (° C.) | — |

TABLE 2

| Example | 32 | 33 | 34 | 35 | 36 | 37 |
|---|---|---|---|---|---|---|
| $SiO_2$ | 67.22 | 65.43 | 67.11 | 68.48 | 65.43 | 72.43 |
| $Al_2O_3$ | 0.96 | 0.96 | 0.99 | 0.97 | 3.70 | 9.03 |
| $P_2O_5$ | 0 | 0 | 0 | 0 | 0 | 0 |
| $B_2O_3$ | 3.41 | 5.34 | 4.31 | 5.06 | 16.86 | 0 |
| $Li_2O$ | 0 | 0 | 0 | 0 | 0 | 0 |
| $Na_2O$ | 12.40 | 12.32 | 6.39 | 12.11 | 6.47 | 12.55 |
| $K_2O$ | 0.43 | 0.43 | 5.30 | 0.40 | 0 | 3.89 |
| MgO | 6.56 | 6.54 | 6.69 | 4.03 | 0 | 2.00 |
| CaO | 9.01 | 8.98 | 9.21 | 8.95 | 3.06 | 0 |
| $SnO_2$ | 0 | 0 | 0.01 | 0.01 | 0.05 | 0.05 |
| $Fe_2O_3$ | 0 | 0 | 0 | 0 | 0 | 0 |
| $R_2O$ | 12.83 | 12.75 | 11.69 | 12.51 | 6.47 | 16.44 |
| LTCTE (ppm/° C.) | 8.47 | 8.42 | 8.47 | 8.20 | 6.22 | 8.85 |
| HTCTE (ppm/° C.) | 39.20 | 44.60 | 43.50 | 43.00 | 39.36 | — |
| Density (g/cm³) | 2.528 | 2.535 | 2.509 | 2.519 | 2.432 | — |
| Strain Pt. (° C.) | 521 | 522 | 532 | 526 | 492 | — |
| Anneal Pt. (° C.) | 557 | 557 | 569 | 563 | 527 | — |
| Softening Pt. (° C.) | 713 | 705 | 733 | 716 | 673 | — |
| SOC (nm/mm/MPa) | 2.698 | 2.696 | 2.728 | 2.769 | 3.105 | — |
| Young's modulus (GPa) | 77.20 | 79.20 | 76.00 | 78.30 | 78.53 | — |
| Shear modulus (GPa) | 31.90 | 32.20 | 31.00 | 32.10 | 32.41 | — |
| Refractive index | 1.5267 | 1.5292 | 1.5247 | 1.5260 | 1.5116 | — |
| Poisson's ratio | 0.212 | 0.229 | 0.225 | 0.219 | 0.212 | — |
| VFT A | −1.103 | −1.086 | −1.601 | −1.234 | −0.779 | — |
| VFT B | 3054.6 | 2868.8 | 3916.3 | 3207.9 | 2734.7 | — |
| VFT $T_o$ | 367.7 | 379.2 | 313.1 | 352.2 | 347.9 | — |
| Liquidus viscosity (kP) | 7.677 | 4.886 | 20.712 | 29.243 | — | — |

| Example | 38 | 39 |
|---|---|---|
| $SiO_2$ | 60.32 | 66.37 |
| $Al_2O_3$ | 16.36 | 13.94 |
| $P_2O_5$ | 3.77 | 0 |
| $B_2O_3$ | 0 | 5.12 |
| $Li_2O$ | 7.34 | 0 |
| $Na_2O$ | 11.52 | 13.73 |
| $K_2O$ | 0.04 | 0.01 |
| MgO | 0 | 2.42 |
| CaO | 0 | 0 |
| $SnO_2$ | 0.05 | 0.08 |
| $Fe_2O_3$ | 0 | 0.01 |
| $R_2O$ | 11.56 | 13.82 |
| LTCTE (ppm/° C.) | 86.50 | — |
| HTCTE (ppm/° C.) | — | — |
| Density (g/cm³) | 2.42 | — |
| Strain Pt. (° C.) | 561.00 | — |
| Anneal Pt. (° C.) | 611.00 | — |
| Softening Pt. (° C.) | 854.00 | — |
| SOC (nm/mm/MPa) | 2.96 | — |
| Young's modulus (GPa) | 74.60 | — |
| Shear modulus (GPa) | 30.80 | — |
| Refractive index | 1.5036 | — |
| Poisson's ratio | 0.2110 | — |
| VFT A | — | — |
| VFT B | — | — |

TABLE 2-continued

| | | |
|---|---|---|
| VFT $T_o$ | — | — |
| Liquidus viscosity (kP) | — | — |

Referring now to Table 3, clad glass layers formed from the example glass compositions listed in the Table 3 having a thickness of 1 mm were immersed in a molten salt bath comprises of 100 wt % KNO₃ at 410° C. for the listed time period. The compressive stress and depth of compression values listed in Table 3 were measured by FSM.

TABLE 3

| Example | 1 | 2 | 3 | 4 | 5 | 6 |
|---|---|---|---|---|---|---|
| 1 hr. | | | | | | |
| CS (MPa) | — | — | — | — | — | — |
| DOC (μm) | — | — | — | — | — | — |
| 4 hrs. | | | | | | |
| CS (MPa) | 658 | 722 | 706 | 647 | 652 | 670 |
| DOC (μm) | 18.8 | 21.7 | 22.0 | 19.7 | 21.0 | 21.0 |
| 9 hrs. | | | | | | |
| CS (MPa) | 630 | 697 | 673 | 627 | 618 | 643 |
| DOC (μm) | 28.1 | 30.6 | 32.9 | 30.6 | 31.1 | 31.1 |
| 16 hrs. | | | | | | |
| CS (MPa) | 610 | 670 | 652 | 605 | 604 | 625 |
| DOC (μm) | 35.9 | 40.6 | 42.8 | 40.1 | 40.3 | 41.0 |
| Example | 8 | 10 | 12 | 14 | 15 | 16 |
| 1 hr. | | | | | | |
| CS (MPa) | 660 | 604 | 600 | 494 | 734 | — |
| DOC (μm) | 8.8 | 9.1 | 9.2 | 12.0 | 7.4 | — |
| 4 hrs. | | | | | | |
| CS (MPa) | 644 | 592 | 593 | 457 | 763 | 615 |
| DOC (μm) | 17.5 | 18.2 | 18.5 | 23.7 | 14.7 | 16.0 |
| 9 hrs. | | | | | | |
| CS (MPa) | 618 | 574 | 570 | 423 | 774 | 593 |
| DOC (μm) | 25.6 | 26.4 | 26.8 | 34.7 | 22.1 | 22.9 |
| 16 hrs. | | | | | | |
| CS (MPa) | — | — | — | — | — | 569 |
| DOC (μm) | — | — | — | — | — | 30.5 |
| Example | 17 | 18 | 19 | 20 | 21 | |
| 1 hr. | | | | | | |
| CS (MPa) | — | — | — | — | — | |
| DOC (μm) | — | — | — | — | — | |
| 4 hrs. | | | | | | |
| CS (MPa) | 595 | 586 | 550 | 561 | 586 | |
| DOC (μm) | 14.9 | 13.6 | 12.2 | 11.2 | 9.6 | |
| 9 hrs. | | | | | | |
| CS (MPa) | 575 | 565 | 550 | 564 | 583 | |
| DOC (μm) | 21.6 | 19.7 | 18.8 | 16.3 | 14.2 | |
| 16 hrs. | | | | | | |
| CS (MPa) | 556 | 554 | 534 | 554 | 577 | |
| DOC (μm) | 28.6 | 26.5 | 24.1 | 21.5 | 19.0 | |

Referring now to Table 4, comparative glass laminate articles CA and CB and example glass laminate article A were formed using the example clad glass compositions and example core glass compositions listed in the Table 4. The integrated CTE differentials listed in Table 4 were calculated using Equation (4), including the listed $T_{11}^{lower}$ (i.e., the lower $10^{11}$ poise temperature of the core glass layer and the clad glass layer).

TABLE 4

| Glass laminate article | CA | CB | A |
|---|---|---|---|
| Example clad glass composition | 29 | 29 | 8 |
| Example core glass composition | 38 | 37 | 37 |
| $T_{11}^{lower}$ (° C.) | 600 (clad) | 600 (clad) | 637 (core) |
| Integrated CTE differential (ppm) | 668 | 601 | 2195 |

Figure 5:
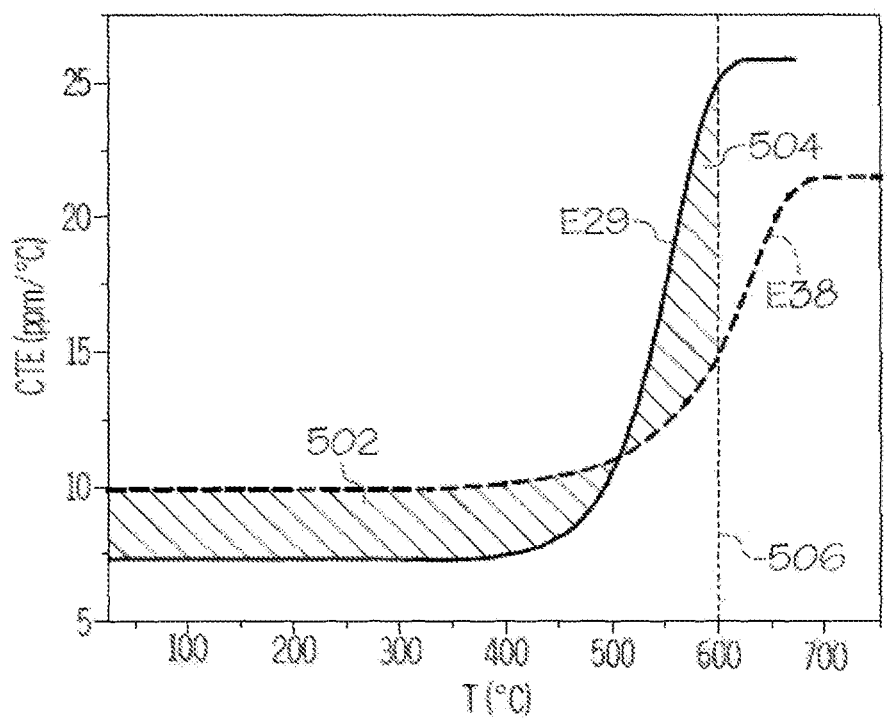
FIG. 5 is a plot of coefficient of thermal explanation (CTE) vs. temperature (x-axis: temperature; y-axis: CTE) of an example clad glass composition and an example core glass composition according to one or more embodiments described herein.
Figure 6:
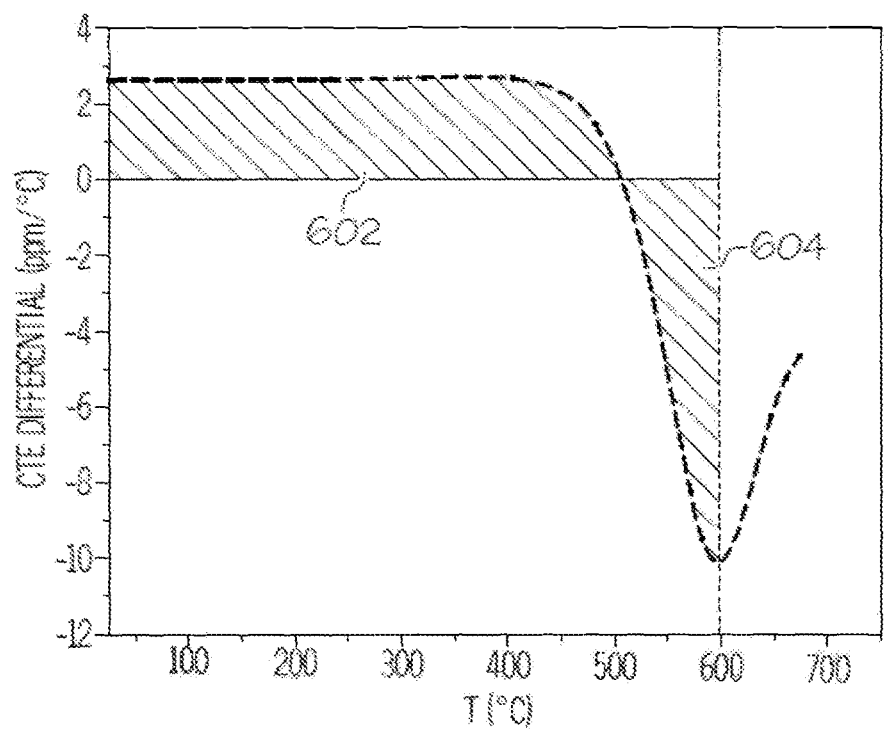
FIG. 6 is a plot of CTE differential vs. temperature (x-axis: temperature; y-axis: CTE differential) of an example clad glass composition and an example core glass composition according to one or more embodiments described herein.

Referring now to FIGS. 5 and 6, a plot of CTE vs. temperature and a plot of CTE differential vs. temperature of comparative glass laminate article CA are shown. Area 502, where the example core glass composition E38 CTE was higher than the example clad glass composition E29 CTE was equivalent to area 602 above a CTE differential of 0 ppm/° C. Area 504, where the example core glass composition E38 CTE was lower than the example clad glass composition E29 CTE, was equivalent to area 604 below a CTE difference of 0 ppm/° C. The integrated CTE differential of example clad glass composition E29 and example core glass composition E38, corresponding to areas 602 and 604, was 668 ppm as calculated using Equation (4) and TH $T_{11}^{lower}$=600° C. (indicated by line 506), the $10^{11}$ poise temperature of example clad glass composition E29. The CTE of example clad glass composition E29 was greater than the CTE of the example core glass composition E38 at a temperature lower than $T_{11}^{lower}$, as indicated by the cross over in CTE curves prior to line 506.

Figure 7:
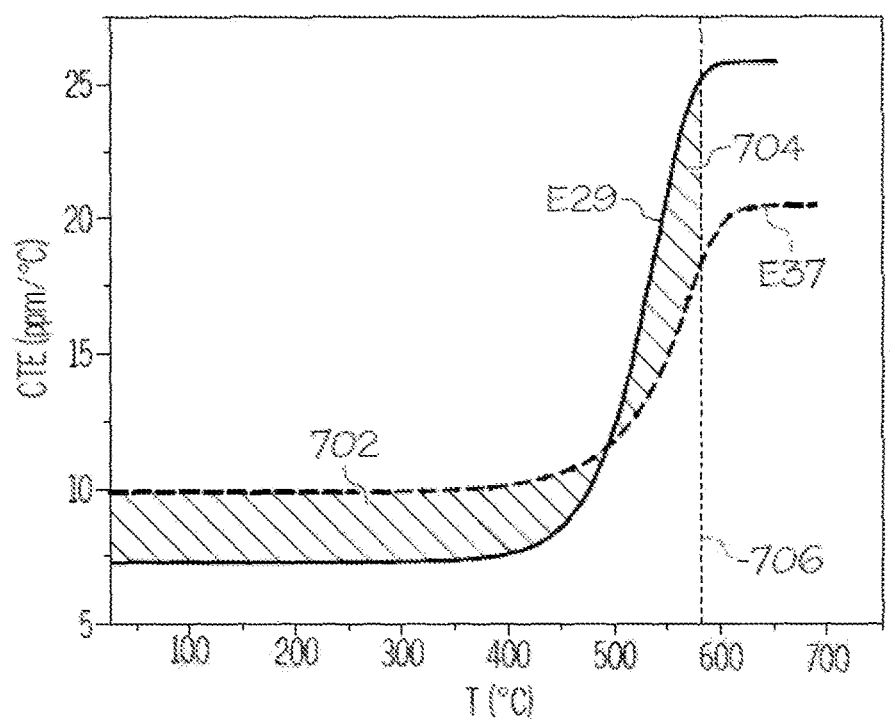
FIG. 7 is a plot of CTE vs. temperature (x-axis: temperature; y-axis: CTE) of an example clad glass composition and an example core glass composition according to one or more embodiments described herein.
Figure 8:
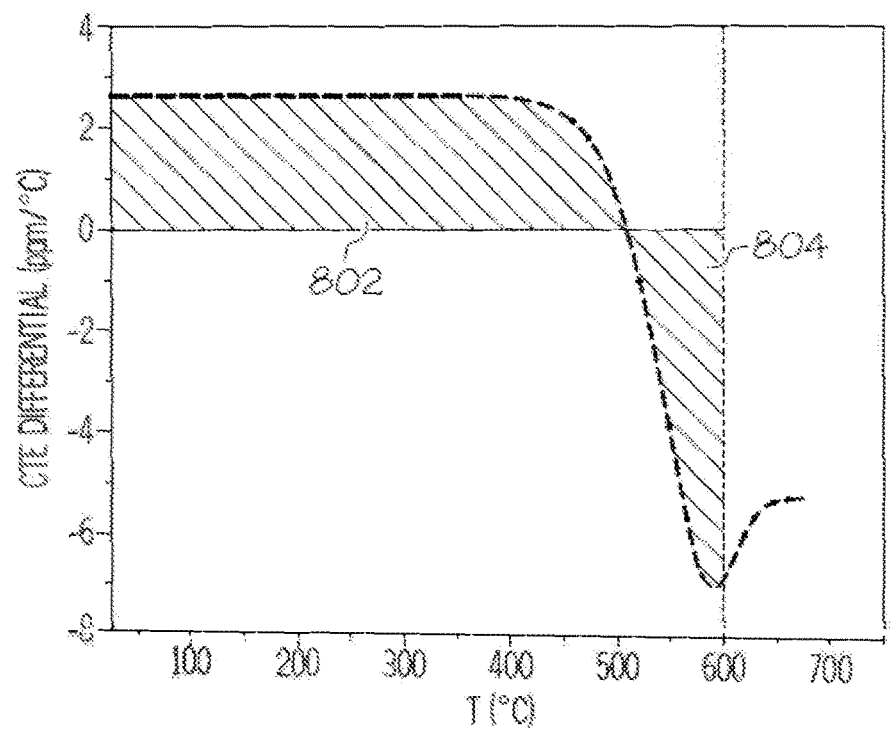
FIG. 8 is a plot of CTE differential vs. temperature (x-axis: temperature; y-axis: CTE differential) of an example clad glass composition and an example core glass composition according to one or more embodiments described herein.

Referring now to FIGS. 7 and 8, a plot CTE vs. temperature and a plot CTE differential vs. temperature of comparative glass laminate article CB are shown. Area 702, where the example core glass composition E37 CTE was higher than the example clad glass composition E29 CTE, was equivalent to area 802 above a CTE differential of 0 ppm/° C. Area 704, where the example core glass composition E37 CTE was lower than the example clad glass composition E29 CTE, was equivalent to area 804 below a CTE difference of 0 ppm/° C. The integrated CTE differential of example clad glass composition 29 and example core glass composition E37, corresponding to areas 802 and 804, was 601 ppm as calculated using Equation (4) and $T_{11}^{lower}$=600° C. (indicated by line 606), the $10^{11}$ poise temperature of example clad glass composition E29. The CTE of example clad glass composition E29 was greater than the CTE of the example core glass composition E37 at a temperature lower than lower as indicated by the cross over in CTE curves prior to line 706.

Figure 9:
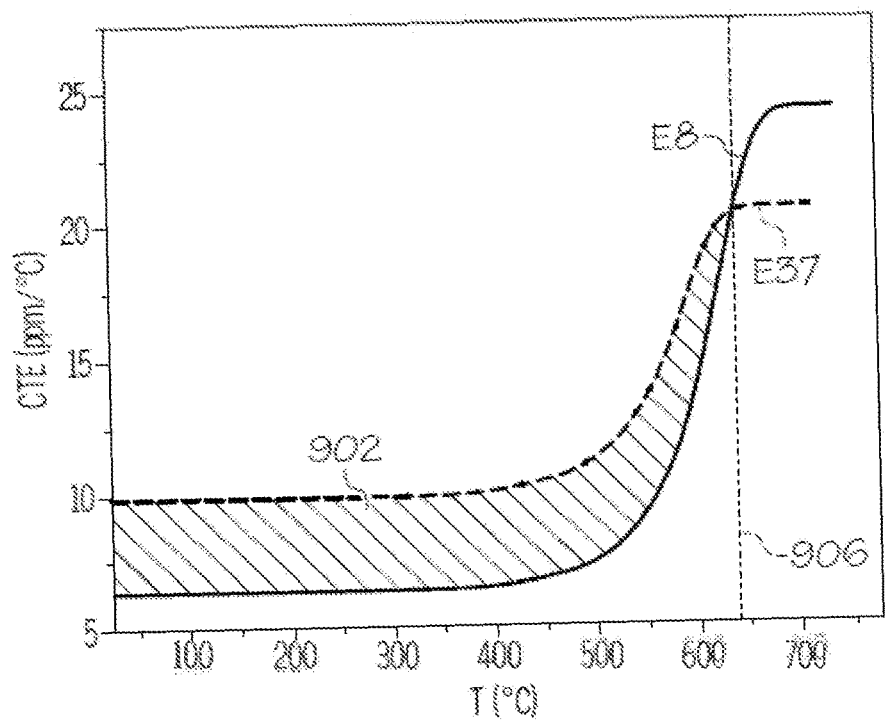
FIG. 9 is a plot of CTE vs. temperature (x-axis: temperature; y-axis: CTE) of an example clad glass composition and an example core glass composition according to one or more embodiments described herein.
Figure 10:
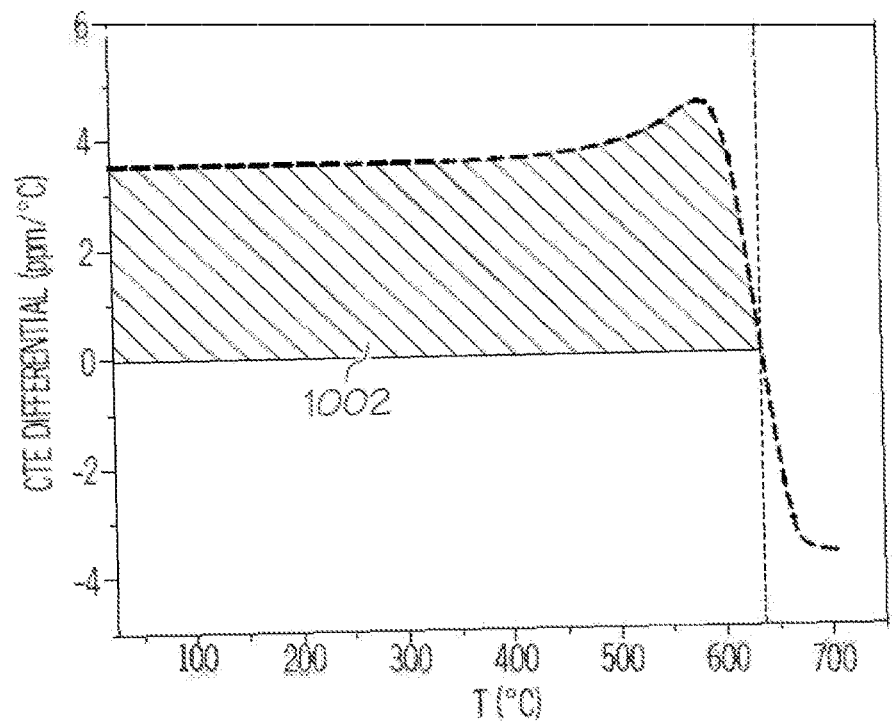
FIG. 10 is a plot of CTE differential vs. temperature (x-axis: temperature; y-axis: CTE differential) of an example clad glass composition and an example core glass composition according to one or more embodiments described herein.

Referring now to FIGS. 9 and 10, a plot of CTE vs. temperature and a plot of CTE differential vs. temperature of example glass laminate article A are shown. Area 902, where the example core glass composition E37 CTE was higher than the example clad glass composition E8 CTE, was equivalent to area 1002 above a CTE differential of 0 ppm/° C. The integrated CTE differential of example clad glass composition E8 and example core glass composition E37, corresponding to area 1002, was 2195 ppm as calculated using Equation (4) and $T_{11}^{lower}$=637° ° C. (indicated by line 906), the $10^{11}$ poise temperature of example core glass composition E37. The CTE of example clad glass composition E8 was less than the CTE of the example core glass composition E37 at temperatures lower than $T_{11}^{lower}$, as indicated by a lack of cross over in CTE curves prior to line 906.

Figure 11:
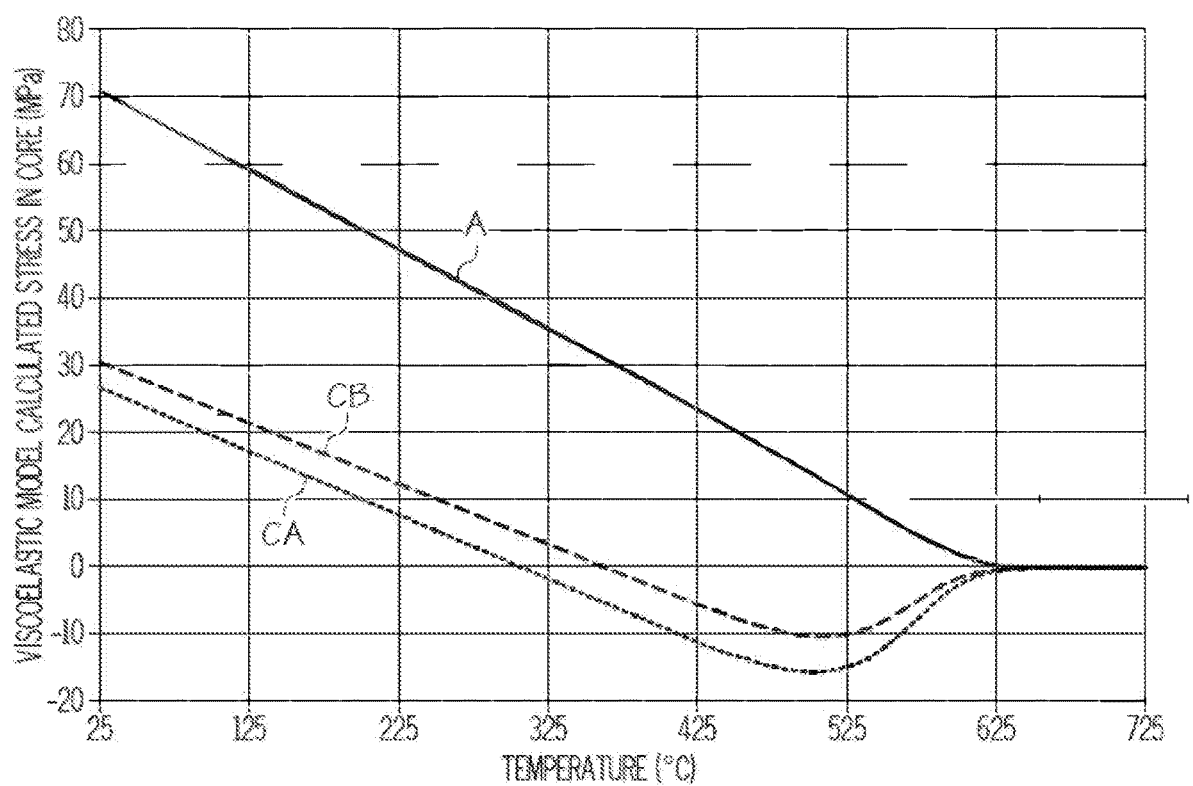
FIG. 11 is a plot of viscoelastic model calculated stress in core vs. temperature (x-axis: temperature; y-axis: viscoelastic model calculated stress in core) of comparative and example glass laminate articles according to one or more embodiments described herein.

Referring now to Table 5, the compressive stress and central tension of comparative glass laminate articles CA and CB and example glass laminate article A were estimated using Equation (1) and the viscoelastic model, and were measured using SCALP. The following parameters were used for the example glass laminate articles: thickness ratio k=1.5; thickness of the glass laminate article=0.8 mm; and clad glass layer thickness=160 (μm). The viscoelastic model calculated stresses in the core of comparative glass laminate articles CA and CB example glass laminate article A are shown in FIG. 11.

TABLE 5

| | Glass laminate article | | | | | |
|---|---|---|---|---|---|---|
| | CA | | CB | | A | |
| | CS (MPa) | CT (MPa) | CS (MPa) | CT (MPa) | CS (MPa) | CT (MPa) |
| Equation (1) | 65.0 | 43.4 | 68.5 | 45.6 | 77.4 | 51.6 |
| Viscoelastic model | 40.7 | 27.1 | 46.3 | 30.9 | 107.3 | 71.5 |
| SCALP measured | 48.0 | 32.0 | 47.7 | 31.8 | 86.4 | 57.6 |

Figure 12:
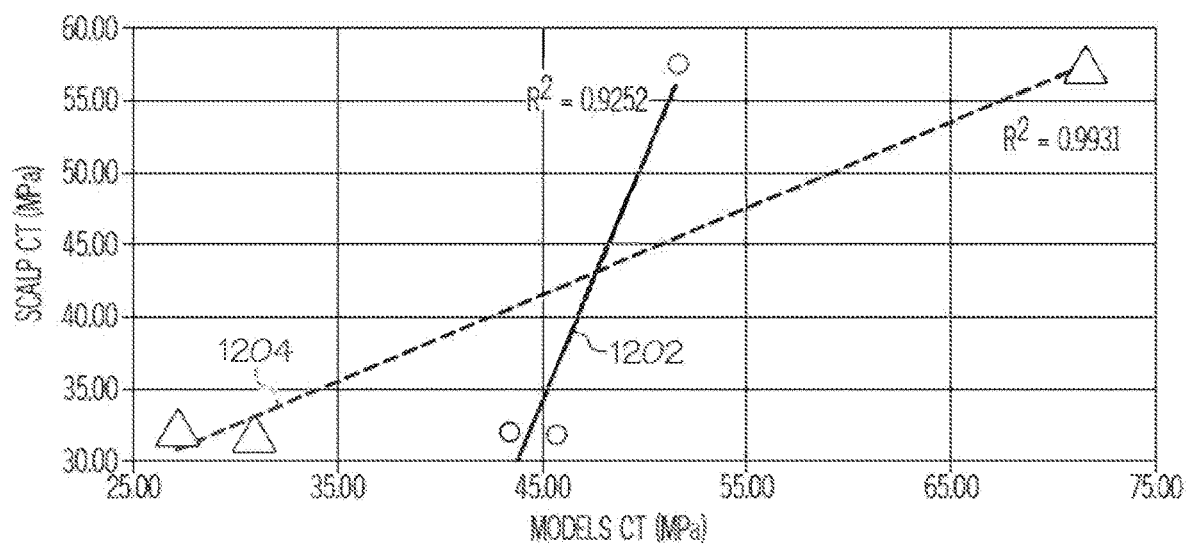
FIG. 12 is a plot of SCALP measured central tension (CT) vs. CT calculated from other models (x-axis: models CT; y-axis: SCALP CT) of comparative and example glass laminate articles according to one or more embodiments described herein.

Referring now to FIG. 12, a plot of SCALP measured CT vs. the CT calculated from Equation (1) and the viscoelastic model is shown. Circles (●) and line 1202 represent the approximation by Equation 1. Triangles (▲) and line 1204 represent the values from the viscoelastic model. As shown, the viscoelastic model shows better correlation to the SCALP measurements than Equation (1). As indicated by Table 5 and FIG. 12, the viscoelastic model is better for predicting laminate stress than Equation (1).

Referring back to FIG. 10, example glass laminate article A had the largest integrated CTE differential of 2195 ppm as compared to the integrated CTE differentials of 600 ppm and 601 ppm of comparative glass laminate articles CA and CB, respectively. Referring back to Table 5, example glass laminate article A also had the largest compressive stress of 86.4 MPa as compared to the 48.0 MPa and 47.4 MPa of comparative glass laminate articles CA and CB, respectively. As indicated by FIGS. 5-12 and Tables 4 and 5, a clad glass composition may be paired with a core glass composition such that $CTE_{clad}$ is less than $CTE_{core}$ at temperatures lower than Tower to produce a glass laminate article having a relatively large integrated CTE, thus, a relatively increased CS.

Referring now to Table 6, comparative glass laminate articles CC and CD and example glass laminate article B were formed using the example clad glass composition and example core glass composition listed in Table 6. Note that comparative glass laminate structure CC includes example clad glass composition 31 in Table 1 as the core glass composition.

TABLE 6

| Glass laminate article | CC | CD | B |
|---|---|---|---|
| Example clad glass composition | 30 | 30 | 31 |
| Example core glass composition | 31 | 39 | 33 |

TABLE 6-continued

| Glass laminate article | CC | CD | B |
|---|---|---|---|
| $LTCTE_{clad}$ | — | — | 9.79 |
| $LTCTE_{core}$ | — | — | 9.60 |
| $HTCTE_{clad}$ | — | — | 23.60 |
| $HTCTE_{core}$ | — | — | 27.99 |
| CS (MPa) | — | — | 53.4 |

Figure 13:
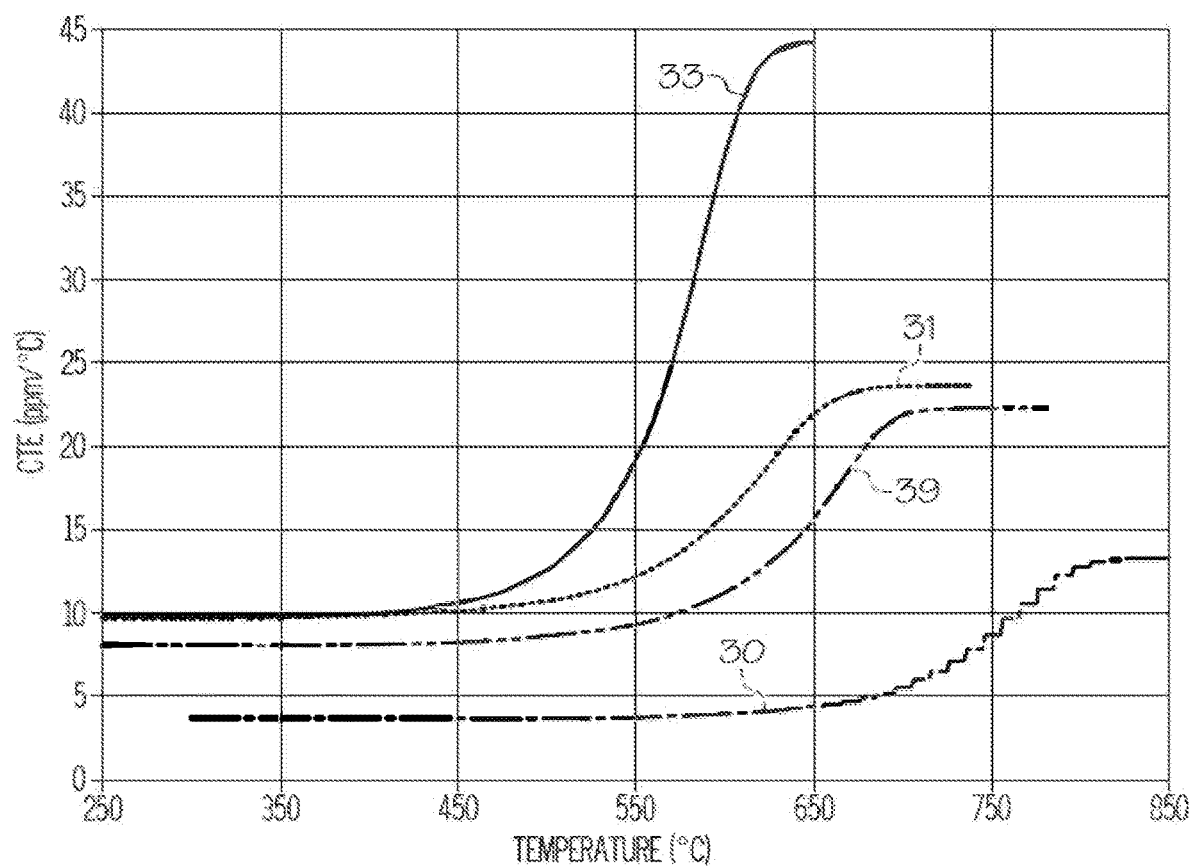
FIG. 13 is a plot of CTE vs. temperature (x-axis: temperature; y-axis: CTE) of example glass compositions according to one or more embodiments described herein.
Figure 14:
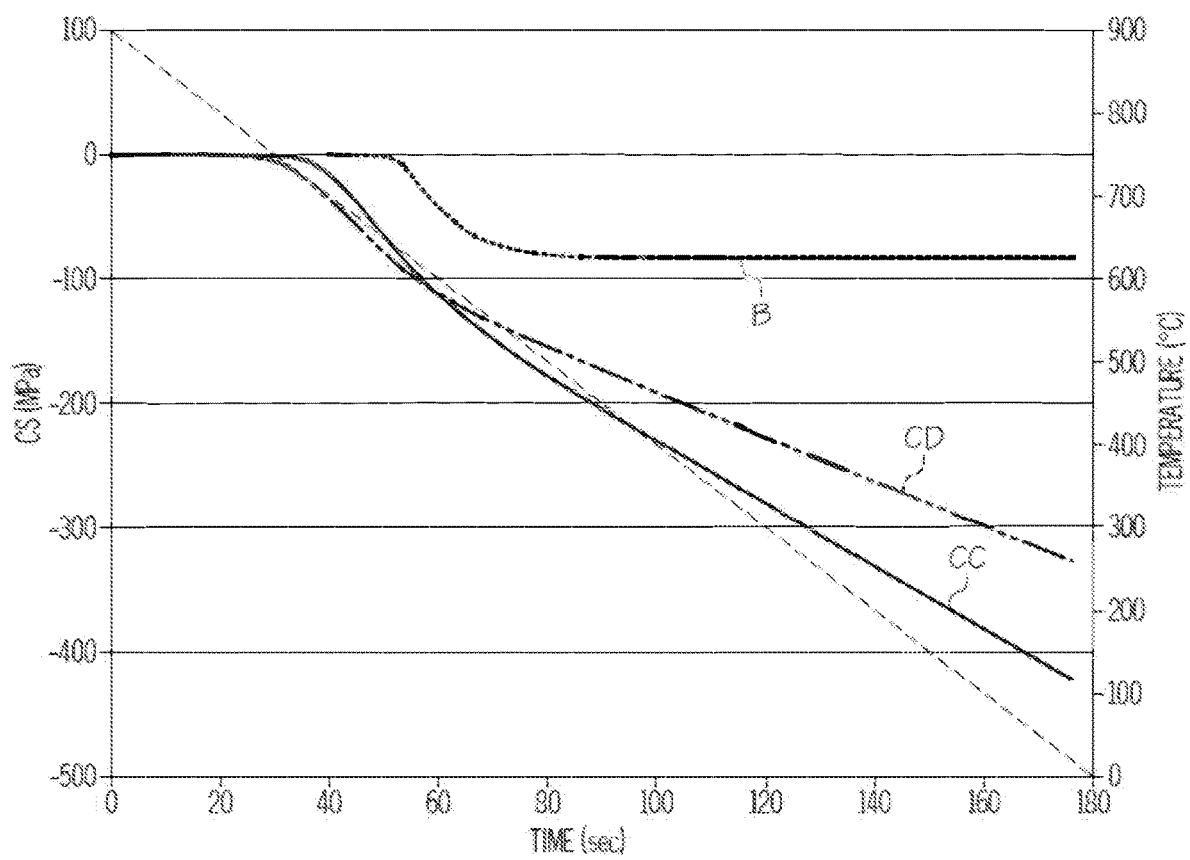
FIG. 14 is a plot of compressive stress (CS) and temperature vs. time (x-axis: time; y-axis: CS and temperature) of comparative and example glass laminate articles according to one or more embodiments described herein.

Referring now to FIG. 13, a plot of CTE vs. temperature of example glass compositions 30, 31, 33, and 39 is shown. Referring now to FIG. 14, the viscoelastic model calculated stresses of comparative glass laminate articles CC and CD and example glass laminate article B is shown. The viscoelastic model results of comparative glass laminate articles CC and CD indicate that high compressive stresses may be developed due to the LTCTE differential between the core glass composition and the clad glass composition, which is conventionally known. However, the viscoelastic model results of example glass laminate article B indicate that substantial compressive stresses may be generated due to the HTCTE differential between the core glass composition and the clad glass composition while their LTCTE are similar or matched. The LTCTE and HTCTE of the compositions of example glass laminate article E are shown in Table 6.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

ADDITIONAL INFORMATION

The above disclosure, as filed Jun. 11, 2021 in U.S. Application No. 63/209,489, is directed to glass compositions and strengthened glass-to-glass laminate articles of clad and core glasses. Table 4 describes glass laminate pairs CA, CB, and A, which correspond to glass composition 29 of Table 1 for the clad and 38 of Table 2 for the core of pair CA, 29 of Table 1 for the clad and 37 of Table 2 for the core of pair CB, and composition 8 for the clad and 37 for the core of pair A. As disclosed, Applicants manufactured glass-to-glass laminate articles, strengthened by contraction differences upon cooling corresponding to different coefficients of thermal expansion (CTEs), that contain significant alkali metal oxides, as demonstrated by pair A, by leveraging differences in both high-temperature coefficients of thermal expansion (HTCTE) and low-temperature coefficients of thermal expansion (LTCTE).

As disclosed, a core glass with significant alkali metal oxides (e.g., $R_2O$>6 mol %, >10 mol %, >12 mol %, >14 mol %, >15 mol %, where $R_2O$ is an alkali metal oxide; $Na_2O$>8 mol %, >10 mol %, >12 mol %), such as that of pair A, may have both LTCTE and HTCTE greater than the clad glass of a glass-to-glass laminate, where even if the difference in LTCTE between core and clad is not substantial or sufficient to create a large compressive stress in the clad, overall or net CTE mismatch, including difference in HTCTE between core and clad, may result in significant compression of the clad upon cooling. Such pairs allow for the practical use of expansion or contraction mismatch strengthening of glass-to-glass laminate articles as well as ion-exchange strengthening. Put another way, pair A has substantial compression in the clad upon cooling largely because HTCTE differences in pair A positively contribute to clad compression as well as LTCTE differences in clad and core glasses, and pair A may then be further strengthened by ion-exchange as disclosed.

In above disclosure, pairs CA and CB were used as examples that emphasize benefits of pair A in terms of net compressive stress in the clad upon cooling. As shown in FIGS. 5-6 for pair CA and FIGS. 7-8 for pair CB, the clad glasses of both pairs have lesser LTCTE values than the core glasses, but greater HTCTE values than the core glasses in the corresponding glass-to-glass laminates. Put another way, core and clad glasses in pairs CA and CB have crisscrossing CTE curves.

Applicants found that, upon cooling after fusion forming, stresses imparted on the corresponding glass-to-glass laminate (see, e.g., FIGS. 1, 22-23) from differences in expansion (or contraction) at high temperatures offsets stresses from differences in expansion at lower temperatures, resulting in a lower net compressive stress of the clad when compared to pair A. If the HTCTE contribution had been even greater for glasses of such pairs, the net compressive stress may have been about zero (e.g., within 50 MPa of zero) or negative such that the clad would be in tension upon cooling. But, for both the CA and CB pairs, influence of LTCTE differences on clad compression outweighed influence of the HTCTE differences, so both pairs had some compression in the clad upon cooling.

Applicants continued to experiment with glass-to-glass laminates, including pair CB, and made an incredible discovery-when glass-on-glass laminates of pair CB compositions are heat-treated at (relatively) low temperatures, the laminates strengthen significantly! As such, while pair CB was used above to accentuate benefits of pair A, pair CB is also useful (and so is pair CA), as will now be explained.

Figure 15:
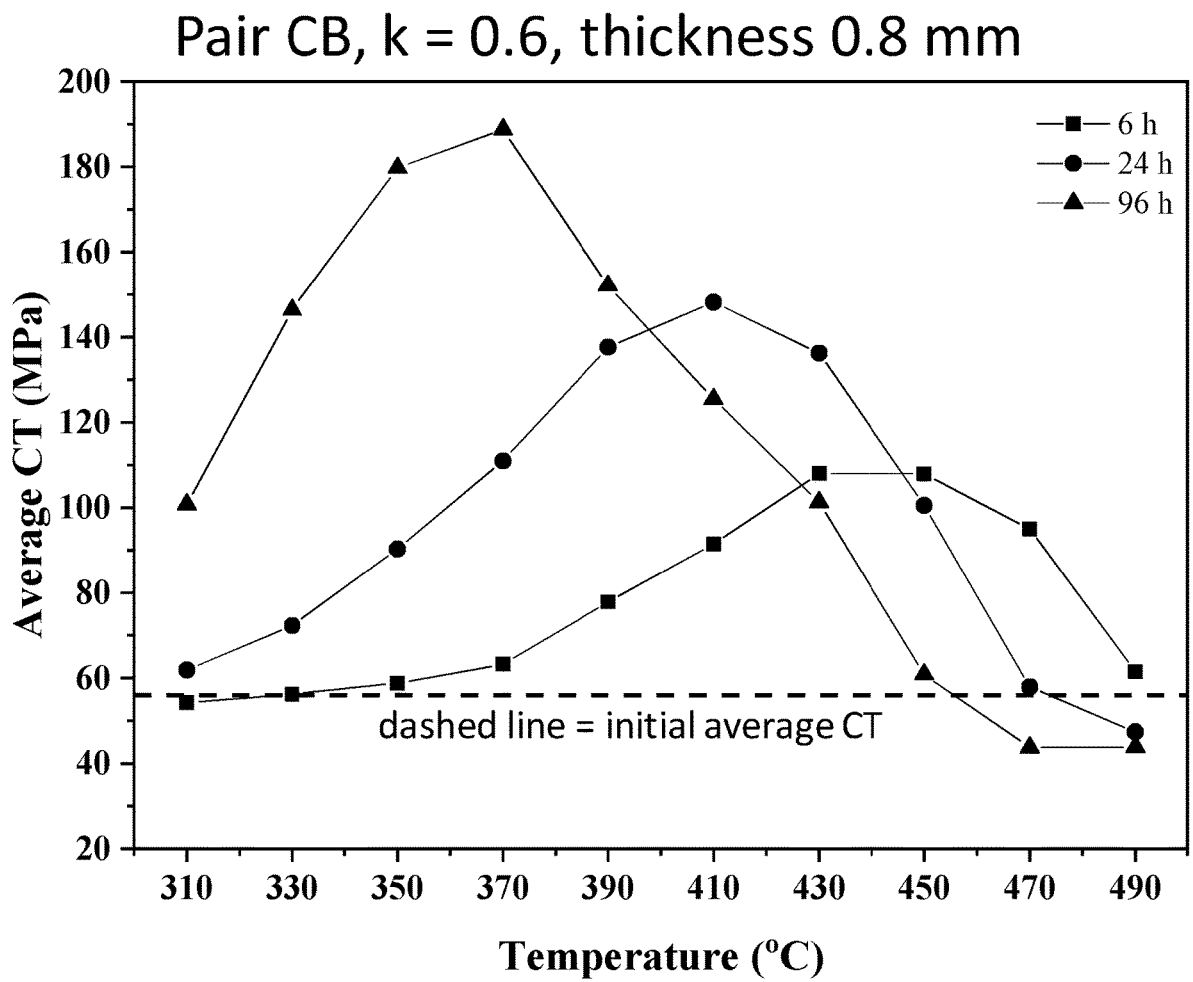
FIG. 15 is a plot of average central tension (CT) vs. temperature (x-axis: temperature y-axis: average CT) of glass laminate pair CB at 0.6 thickness ratio and 0.8 mm thickness for three durations at the temperatures compared to baseline (dashed) according to an aspect of the present disclosure.

Referring to FIG. 15, Applicants measured average central tension (CT) in the clad of laminate samples as described above with respect to FIG. 1 of pair CB glass compositions with a thickness ratio (k) of 0.6 and overall thickness of 0.8 mm (e.g., 2×2 in$^2$ or about 50×50 mm$^2$ length and width), i.e. clad layers of 0.25 mm sandwiching core layer of 0.3 mm thickness. The dashed line of about 56 MPa was the initial average central tension (CT) measured by SCALP averaged over the thickness of the core, corresponding to about 34 MPa compressive stress (CS) in the clad. Notably, in glass-to-glass laminates with clad layers sandwiching a core, as shown in FIG. 1, where stress is due to CTE mismatch upon cooling, CS*2*clad thickness=CT*(laminate thickness−2*clad thickness), or CS=(CT*(laminate thickness−2*clad thickness))/(2*clad thickness), assuming square shaped stress profile (as used herein).

Still referring to FIG. 15, the laminate samples of pair CB were heated and held at different temperatures, with the temperatures spaced apart by 20° C. increments from 310° C. to 490° C., for 6 hours, 24 hours, and 96 hours. For those samples heated to temperatures below about 370° C., there was less impact from heating the laminate samples for 6 hours. But after 24 hours, and certainly after 96 hours, average central tension increased significantly, as shown in FIG. 15, such as by more than 10%, more than 15%; and at 370° C. for 96 hours average CT increased from about 56 MPa to about 189 MPa and CS from about 34 MPa to 113 MPa, by about 3.4 times!

Applicants also found that if temperature was about 410° C. to about 450° C., the amount of time to achieve significant increase in average CT decreased, where average CT more than doubled in 6 hours at both 430° C. and 450° C., and average CT increased by about 2.5 times in 24 hours at about 410° C. Further, for each amount of time there were diminishing returns for temperatures increased greater than a threshold, where for pair CB for 470° C. and above, resulting average CT was almost the same or less than initial CT value if held for 24 hours or more, and at 490° C. for 6 hours.

Figure 16:
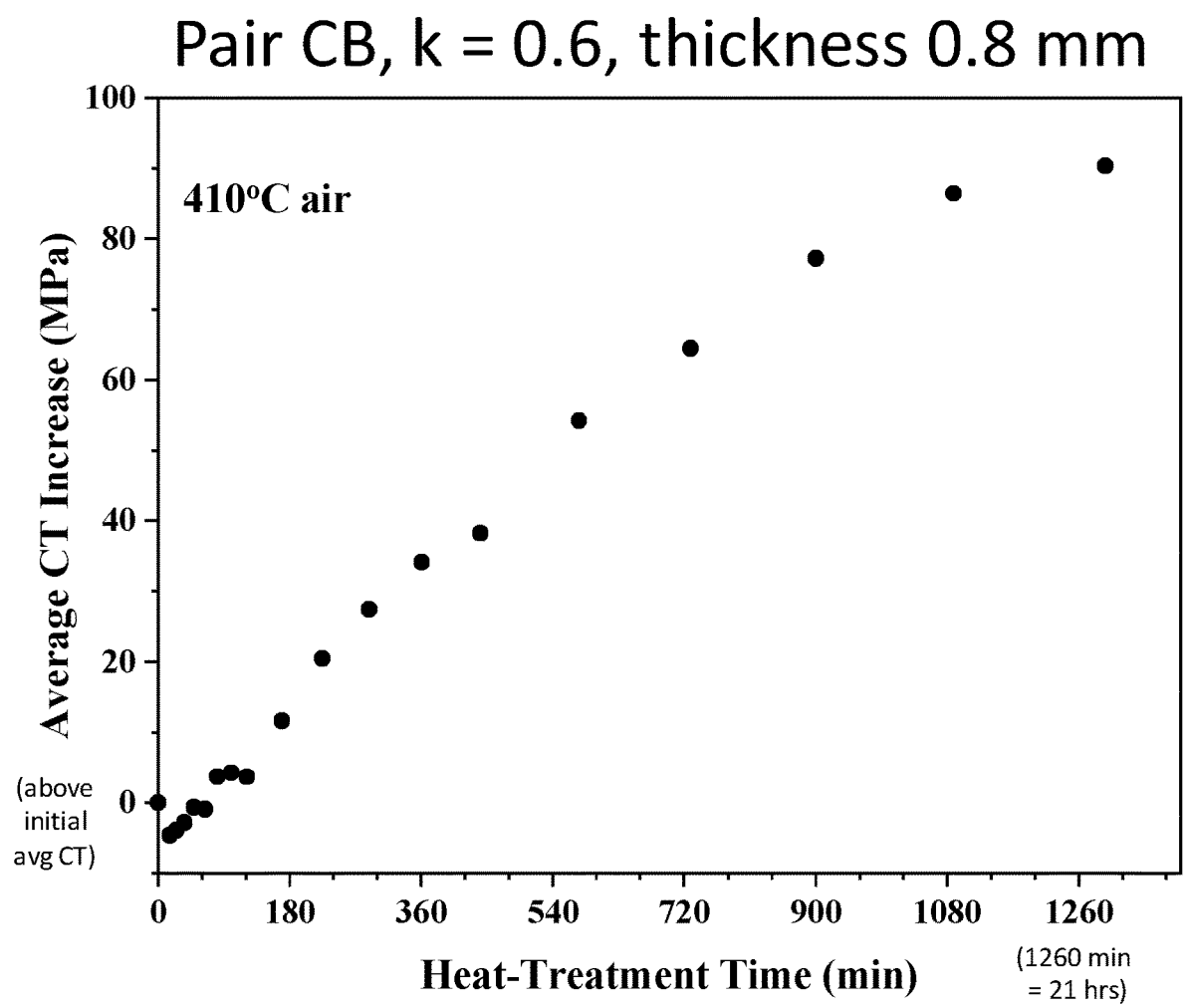
FIG. 16 is a plot of increase in average central tension (CT) vs. time (x-axis: time y-axis: increase in average CT) of glass laminate pair CB at 0.6 thickness ratio and 0.8 mm thickness at 410° C. according to an aspect of the present disclosure.

FIG. 16 show strengthening of laminate samples of pair CB of the same dimensions as FIG. 15, at different minute intervals up to 1296 minutes, or 21 hours. In FIG. 16, the Y-axis corresponds to increase in average central tension. Within the first hour, the average central tension decreased, but then increased at a gradually decreasing rate to about 90 MPa after 21 hours. Notably the data in FIG. 16 corresponds to strengthening by heating in air atmosphere (e.g., >70 mol % nitrogen, >15 mol % oxygen), but other glasses may be strengthened in other gaseous environments, as more inert gases, such including >90 mol % argon, in liquids (e.g., water, $KNO_3$ salt bath), or even in a vacuum. Further, even though heat treatment is a way to relax stresses in glass, other mechanisms, such as vibration, light, etc., may also be used. Further still, for such heat-treatment, furnace, oven, laser, flame, plasma, radiation, or other sources of heat may be used. According to an aspect, at least some such strengthening is performed in a gaseous environment, such as heating above 100° C. for at least an hour, or other such heat-treatments disclosed herein.

Figure 17:
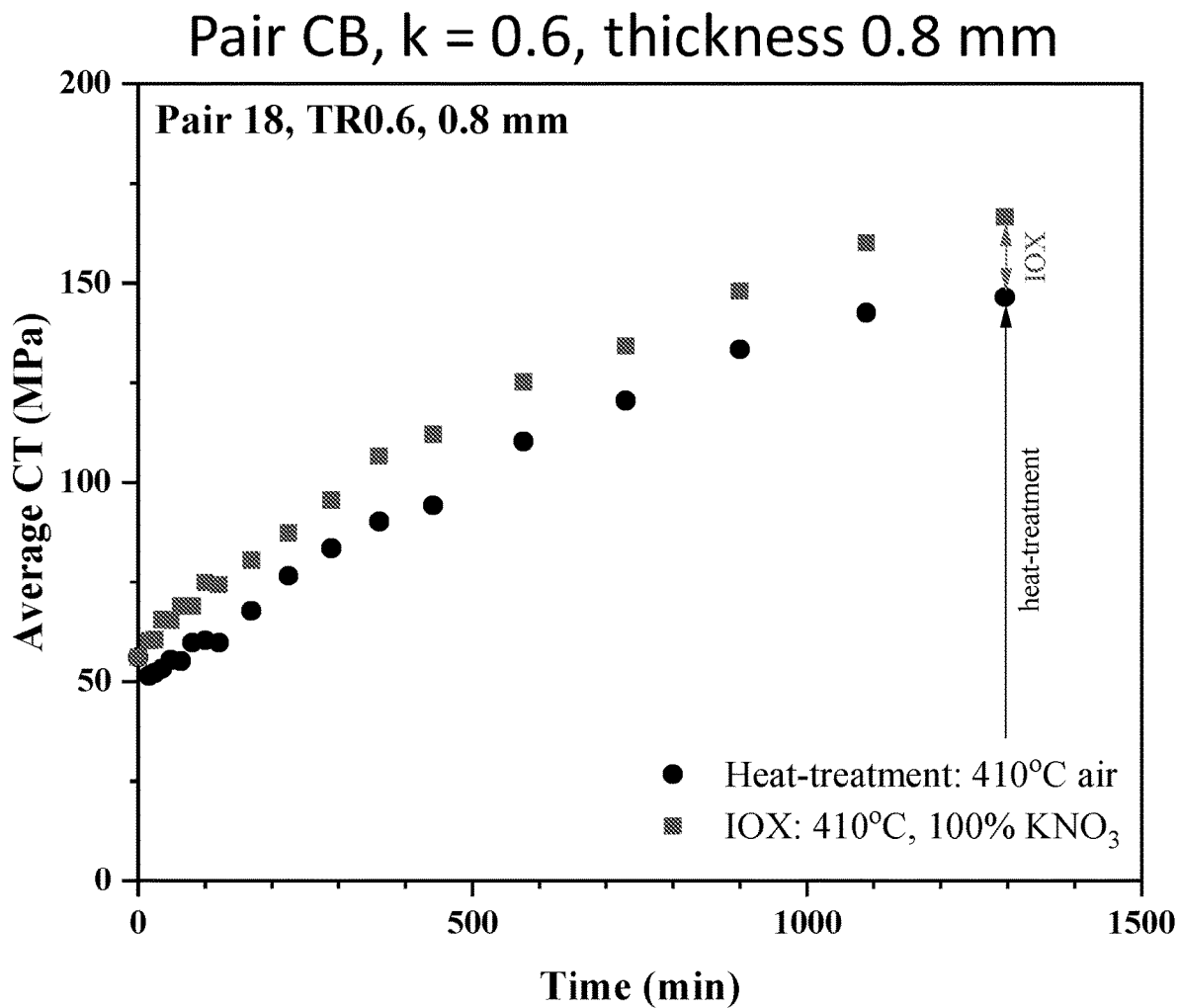
FIG. 17 is a plot of average central tension (CT) vs. time (x-axis: time y-axis: increase in average CT) of glass laminate pair CB at 0.6 thickness ratio and 0.8 mm thickness at 410° C. in air and in an ion-exchange KNO$_3$ salt for comparison bath according to an aspect of the present disclosure.

With that said, Applicants found similar strengthening if the pair CB glass was submerged liquid, such as in 100% $KNO_3$ salt bath at 410° C., as shown in FIG. 17. In FIG. 17 "IOX" is an abbreviation for ion-exchange chemical tempering. Further, by comparing strengthening by heat treatment of pair CB in air, versus strengthening in ion-exchange salt bath at the same temperature, the contribution of the heat-treatment strengthening can be compared to ion-exchange for pair CB. Notably, in the example shown in FIG. 17, the heat treatment contribution to the average central tension after 21 hours is greater than the IOX contribution, such as by more than twice, more than three times, even more than five times. Further, Applicants found that the laminate can be strengthened by both mechanisms at the same time. According to an aspect, a laminate as disclosed herein, is strengthened by heat treatment and simultaneously strengthened by ion-exchange, and that same laminate may then be further strengthened in air, such as heating above 100° C. for at least an hour, or other such heat-treatments disclosed herein, such as if time for simultaneously strengthening in ion-exchange is insufficient to achieve desired strength.

Figure 18:
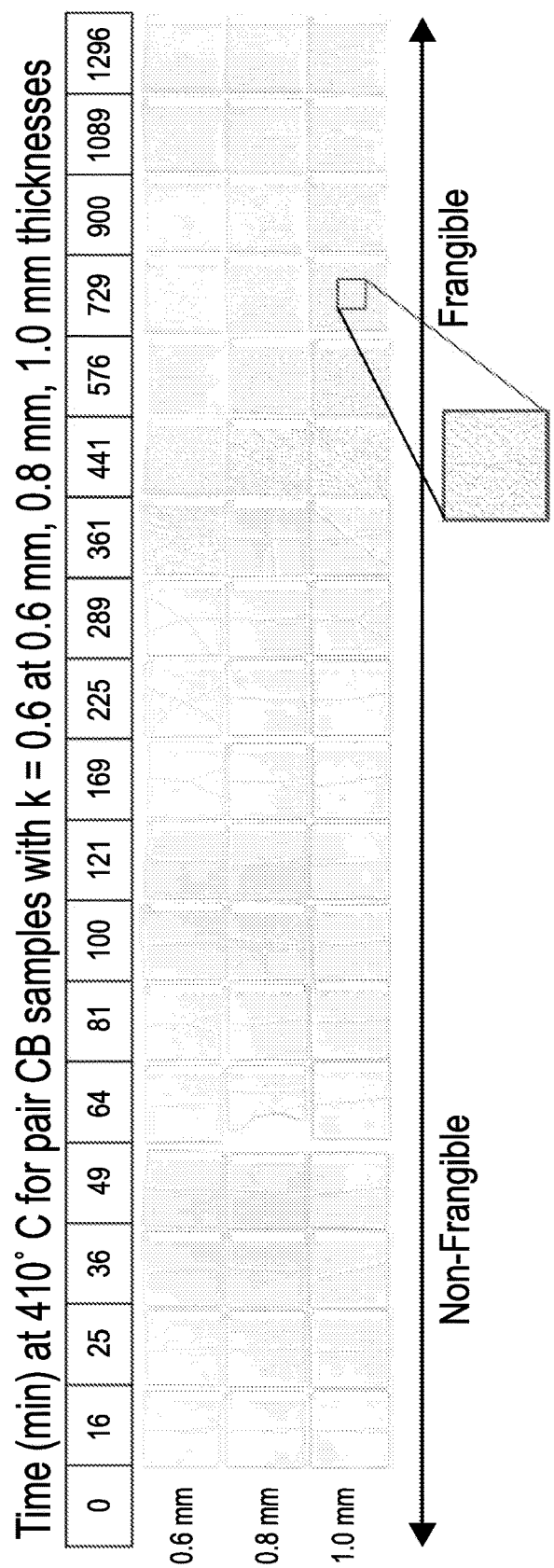
FIG. 18 is an arrangement of digital images of fractured glass samples of glass laminate pair CB at 0.6 thickness ratio at three thicknesses and at various times heat-treated at 410° C. showing a transition from non-frangible to frangible according to an aspect of the present disclosure.

Referring now to FIG. 18, samples of pair CB laminates of three different thicknesses, 0.6 mm, 0.8 mm, and 1.0 mm, at thickness ratio (k) of 0.6 are shown after being fractured by scribe incrementally loaded (or alternatively Vickers indenter, square-based, 136° four-sided, pyramidal Vickers indenter directed orthogonally into a center of the major surface at 25° C. in 50% relative humidity, quasi-statically displaced at rate of 60 μm per second). For context, the center row in FIG. 18 corresponds to 0.8 mm thick samples as shown in FIGS. 15-17. As can be seen in the facture patterns of FIG. 18, as average central tension and corresponding compressive stress in the clad increases, fracture of the samples became more frangible.

Accordingly to an aspect, strengthening glass-to-glass laminates by heat treating as disclosed herein may be stopped by lowering temperatures to room temperature (e.g., 25° C., less than 100° C.) with the laminates strengthened so that compression in the clad is just under the frangibility limit of the particular laminate (e.g., <100 MPa below the respective frangibility limit, <50 MPa, <30 MPa), so that the laminate is as strong as possible without having frangible fracture response. While frangibility limits for different geometries and compositions of glass-to-glass laminates may vary, testing for the frangibility limit by incrementally increasing heat-treatment is a simple process and can be readily accomplished by those of skill in the art as demonstrated by the present disclosure (see also FIG. 20).

In context of pair CB samples in FIG. 18, by stopping heat treatment after about 289 minutes at 410° C. for 0.6 mm thick samples, the sample may be strengthened nearly up to the "frangibility limit," where fracture still corresponds to non-frangible, but the strength is almost enough to result in frangibility of the clad. For 0.8 mm and 1.0 mm samples of pair CB samples in FIG. 18, that time limit was stopping heat treatment at 410° C. after about 361 minutes.

Figure 19:
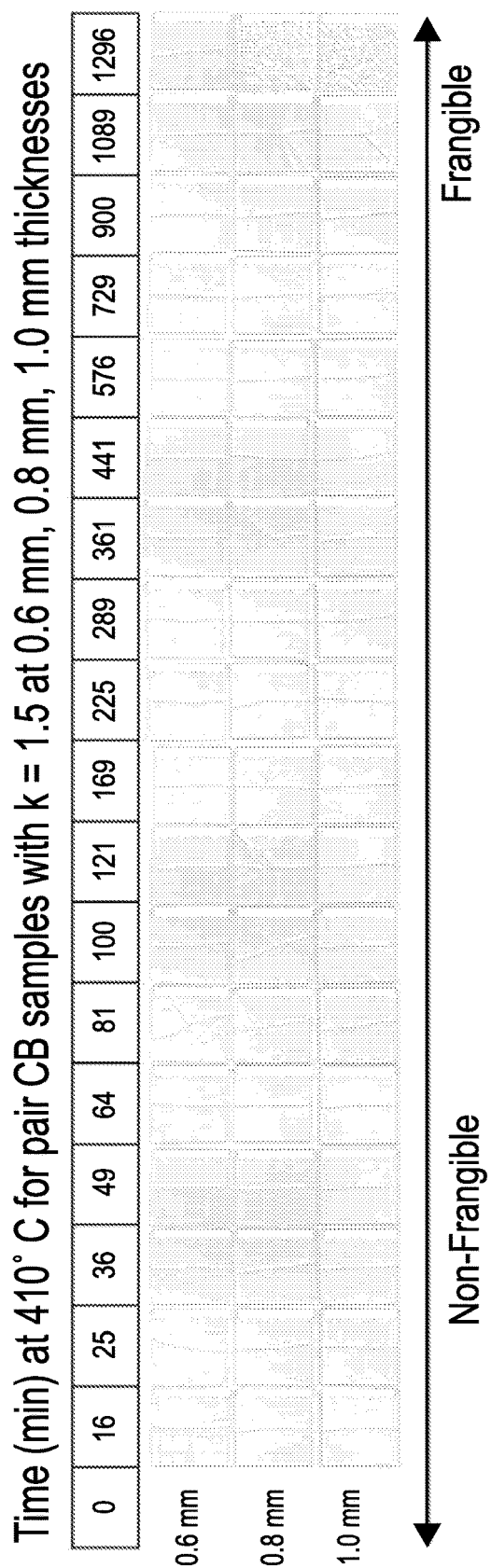
FIG. 19 is an arrangement of digital images of fractured glass samples of glass laminate pair CB at 1.5 thickness ratio at three thicknesses and at various times heat-treated at 410° C. showing a transition from non-frangible to frangible according to an aspect of the present disclosure.

Referring now to FIG. 19, samples of pair CB laminates of three different thicknesses, 0.6 mm, 0.8 mm, and 1.0 mm, at a thickness ratio 1.5 after being heated at 410° C. for varying lengths of time are also shown after being fractured by scribe. The greater thickness ratio changed the frangibility behavior by shifting the transition to longer times of heat treatment. After 1069 minutes, none of the three thickness had frangible fracture behavior; but after 1296 minutes, both the 0.8 mm and 1.0 mm thick samples were frangible.

"Frangibility" generally refers to violent or energetic fragmentation of a strengthened glass article absent external restraints, such as coatings, adhesive layers, and may be characterized by breaking of a glass article (e.g., a plate or sheet) into multiple small pieces with average cross-sectional dimension≤1 mm and violent ejection of at least one fragment from its original location. However, for the present technology, core glass may be frangible, but held in place by clad glass, so frangibility is simply characterized by violent or energetic fragmentation throughout the respective glass portion (e.g., core, or clad if in tension), into multiple small pieces with average cross-sectional dimension≤1 mm. While coatings, adhesive layers, and the like may be used in conjunction with the strengthened glass articles described herein, such external restraints are not used in determining the frangibility or frangible behavior of the glass articles. By contrast, "non-frangible" is fracture behavior absent frangibility.

Without being bound to any theory, Applicant believe that those stresses of a glass-to-glass laminate corresponding to HTCTE differences, locked or frozen into glass upon initial cooling, may be relaxed first or to a greater degree than other stresses, such as those from LTCTE differences, when relaxing stresses in the laminate. In terms of pair CB, FIG. 20 modifies FIG. 5. Applicants believe that heating the laminate of pair CB relaxes the CTE mismatch starting with influence of the HTCTE difference, which in the case of pair CB with crisscrossing CTE curves, releases stresses of the HTCTE that were counterbalancing stress from the LTCTE differences. With stresses from HTCTE relaxed, stresses from LTCTE are no longer offset and apply increased influence on the net stress of the clad, resulting in increased compressive stress.

Figure 20:
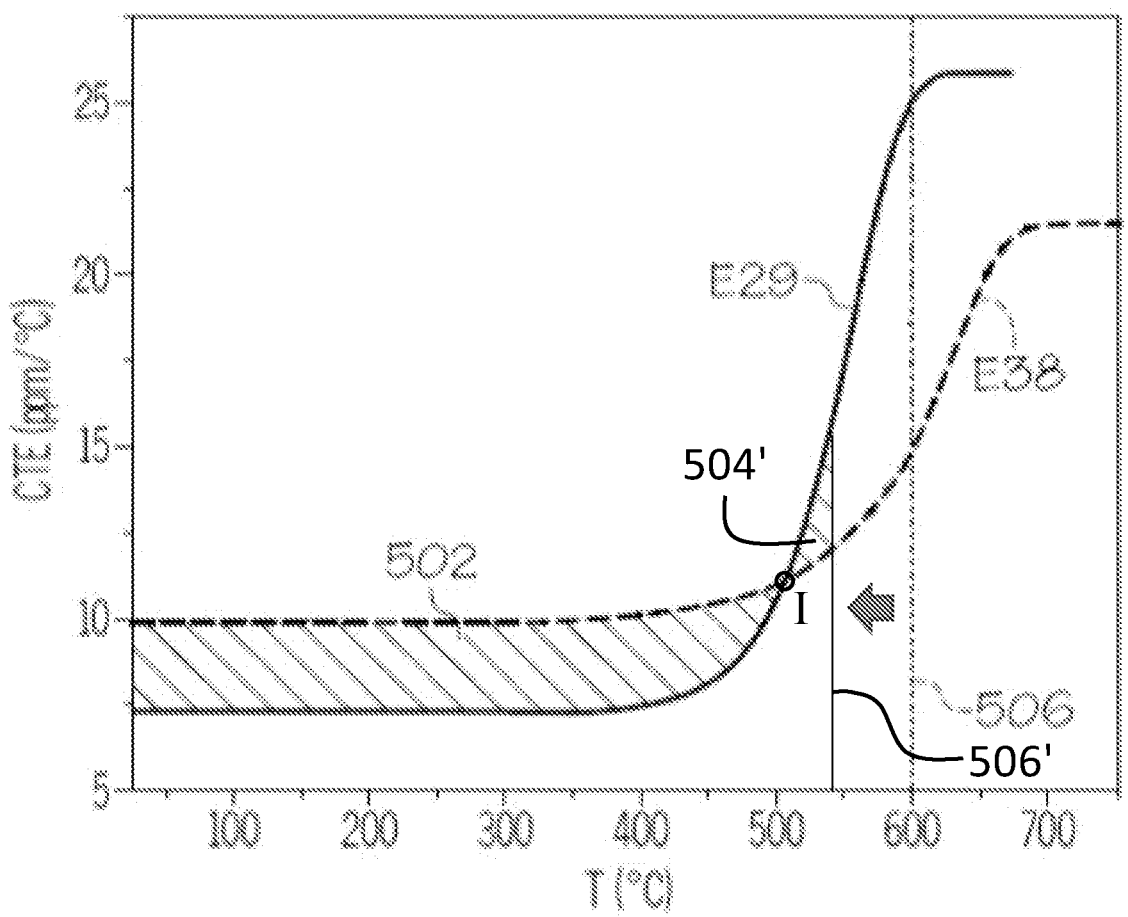
FIG. 20 is the plot of FIG. 5 modified to conceptually show effects of heat-treatment of glass laminate pair CB according to an aspect of the present disclosure.

As an analogy, after initial cooling of the laminate, HTCTE differences of the core and clad glasses act to pin a "spring" corresponding to stresses from LTCTE differences of the pair. Heating the laminate then relaxes away the HTCTE influence and gradually unpins the spring. In terms of FIG. 20, heating the laminate essentially moves the T lower line 506 to 506' and reduces area 504, where core glass composition CTE was lower than clad glass composition 29 CTE (FIG. 5) to 504' (FIG. 20). Relaxation could remove the HTCTE contribution to laminate stresses by moving line 506' to intersect the point of crisscrossing CTE curves (I), which in turn would achieve a maximum compressive stress in the clad for that pair under those conditions. Ion-exchange strengthening could then be used to further increase compressive stress, as shown in FIG. 17. Or, as demonstrated in FIG. 18, the HTCTE can be reduced to some other level, such as approaching, but just below the frangibility limit by retaining a contribution of the HTCTE difference to offset stresses from the LTCTE difference.

According to an aspect, glass-to-glass laminates, with glasses having crisscrossing CTE curves, may be relaxed so that high temperature CTE contribution to stress of the laminate is reduced. For example, HTCTE may be reduced so that the average central tension is increased by at least 20 MPa, such as at least 50 MPa, such as at least 60 MPa, such as at least 100 MPa (e.g., pair CB heated at 370° C. for 96 hours). According to an aspect, laminates with pairs of glasses having crisscrossing CTE curves may be relaxed to a degree corresponding to less than a maximum potential strengthening, such as just below a frangibility limit of the laminate.

Figure 21:
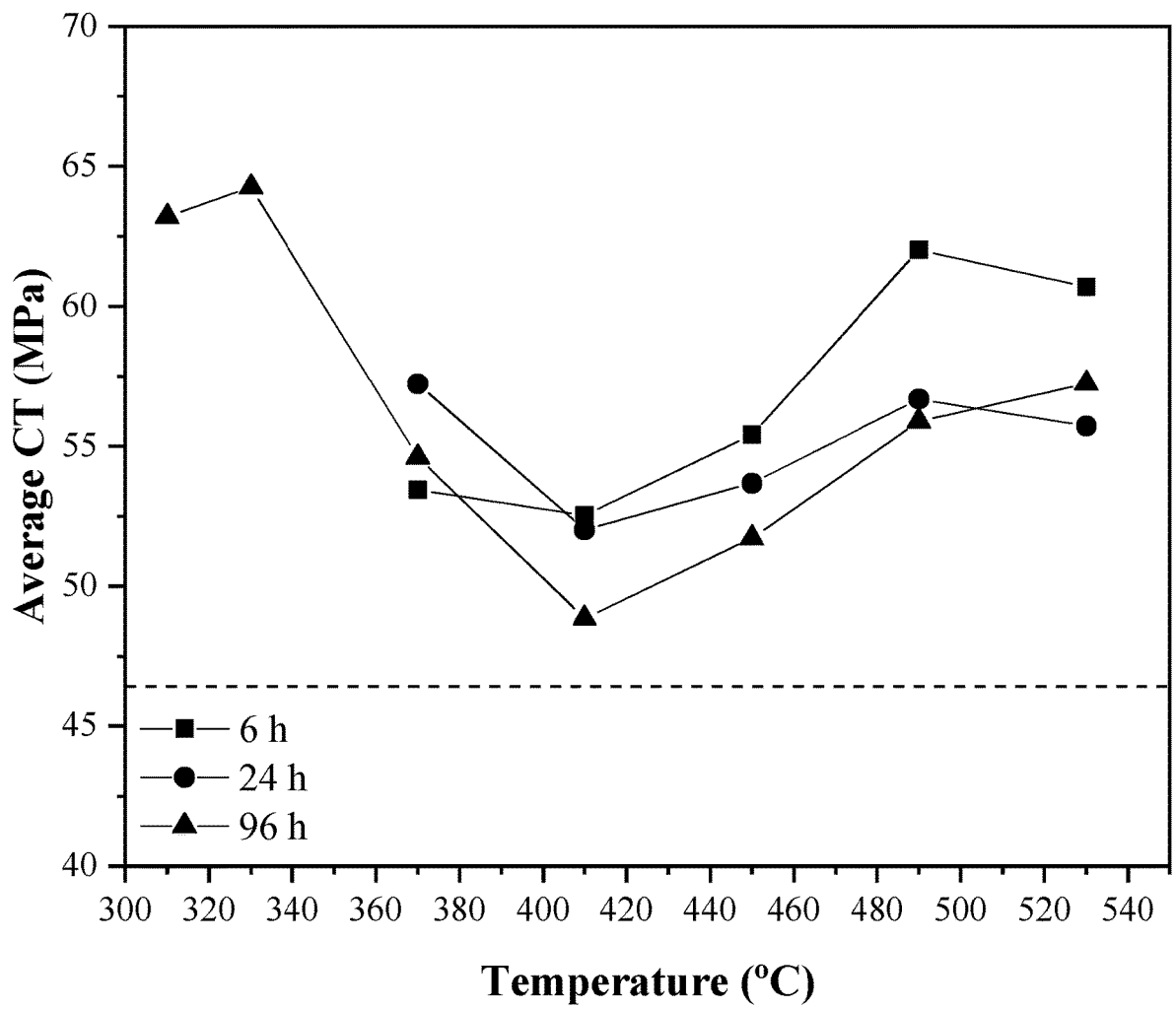
FIG. 21 is a plot of average central tension (CT) vs. temperature (x-axis: temperature y-axis: average CT) of glass laminate pair CA at 0.6 thickness ratio and 0.8 mm thickness for three durations at the temperatures compared to baseline (dashed) according to an aspect of the present disclosure.

As demonstrated by pair CB above, initial stresses within glass-to-glass laminates having crisscrossing core and clad glass CTE curves can be adjusted by relaxing influence of HTCTE differences, and in a controlled manner to achieve a desired stress state of the laminate. For example, as indicated above, pair CA also has crisscrossing CTE curves, where HTCTE negates influence of LTCTE differences in the pair as shown in FIGS. 7-8. In FIG. 21, laminates of pair CA were heat-treated in air as described with respect to laminates of pair CB. Accordingly, laminates of pair CA compositions also strengthened.

More specifically, in 6 hours at about 490° C., the central tension of laminates of pair CA compositions jumped from about 46 MPa to about 63 MPa. The nearly 20 MPa increase on core stress was substantial. The trend was not as straightforward as with pair CB heat-treatments, probably because viscosity curves/relaxation times are different for the core and clad glasses.

Figure 22:
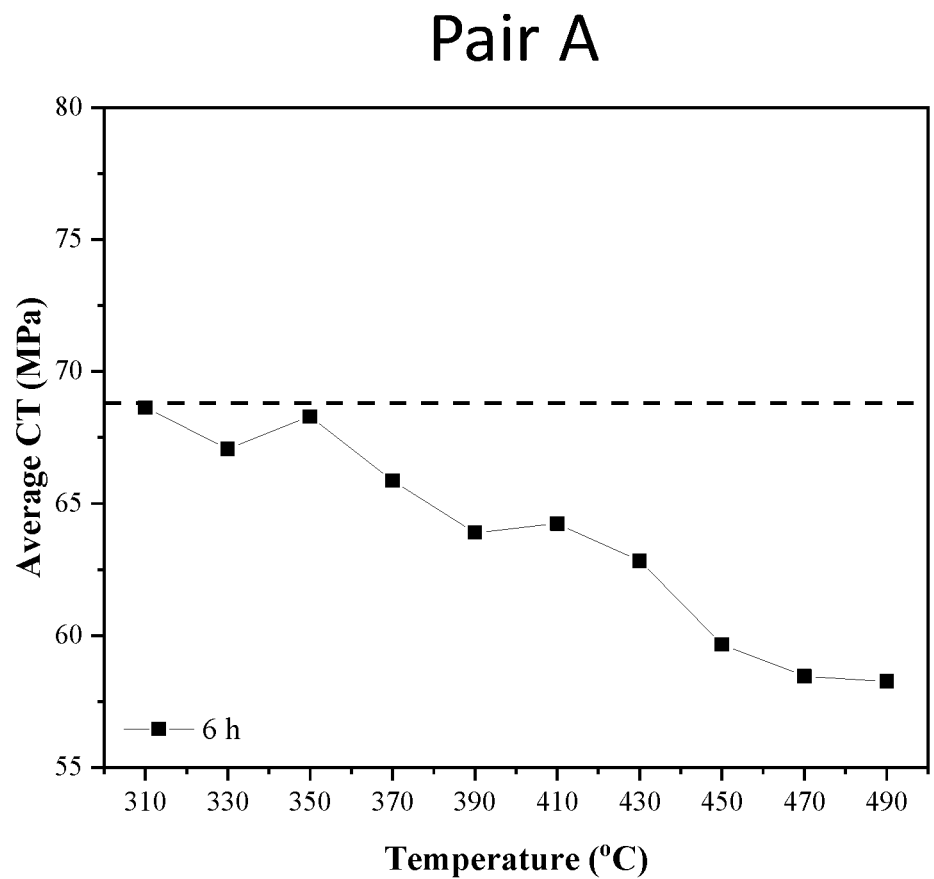
FIG. 22 is a plot of average central tension (CT) vs. temperature (x-axis: temperature y-axis: average CT) of glass laminate pair A compared to baseline (dashed) according to an aspect of the present disclosure.

In contrast to pairs CA and CB, clad and core glasses of pair A lack crisscrossing of their CTE curves at temperatures less than line 906 (FIG. 9) corresponding to the lower $10^{11}$ poise temperature of the core or the clad glasses. As such, laminates of pair lack the HTCTE offset of LTCTE contraction mismatch and corresponded "pinned spring" stress. Accordingly, as shown in FIG. 22, when pair A laminates (e.g., of same dimensions as disclosed above) are heated for 6 hours at temperatures that strengthen laminates of pair CB and CA, average CT of the laminate of pair A only decreases.

Applicants also switched compositions of the clad and core of pair CB with one another, where composition 29 of Table 1 was used for the core and 37 of Table 2 for the clad. The clad has tension and the core has compression upon initial cooling. With heat treatment, Applicants contemplate increased tension in the clad for reasons as disclosed above. Beyond compositions of the present disclosure, for example, Applicants contemplate pairing CORNING® GORILLA® GLASS 4 (GG4) as core with CORNING® GORILLA® GLASS 3 (GG3) as clad may achieve the behavior demonstrated with pairs CB and CA because GG4 has higher LTCTE that GG3, but GG3 has higher HTCTE than GG4, and their CTE curves crisscross.

A benefit of pairing glasses with crisscrossing CTE curves is that a corresponding laminate may be initially cooled at a lower net stress state. In that state, the laminate may be handled and machined, such as cut or singulated, polished, bent, etc. Then after modification, the laminate can be strengthened, "releasing the pin" on the LTCTE mismatch by relaxing influence of the HTCTE mismatch. Handling and machining of a glass-to-glass laminate that may otherwise be difficult if the laminate is under high stress may first be performed at the lower net stress state.

Figure 23:
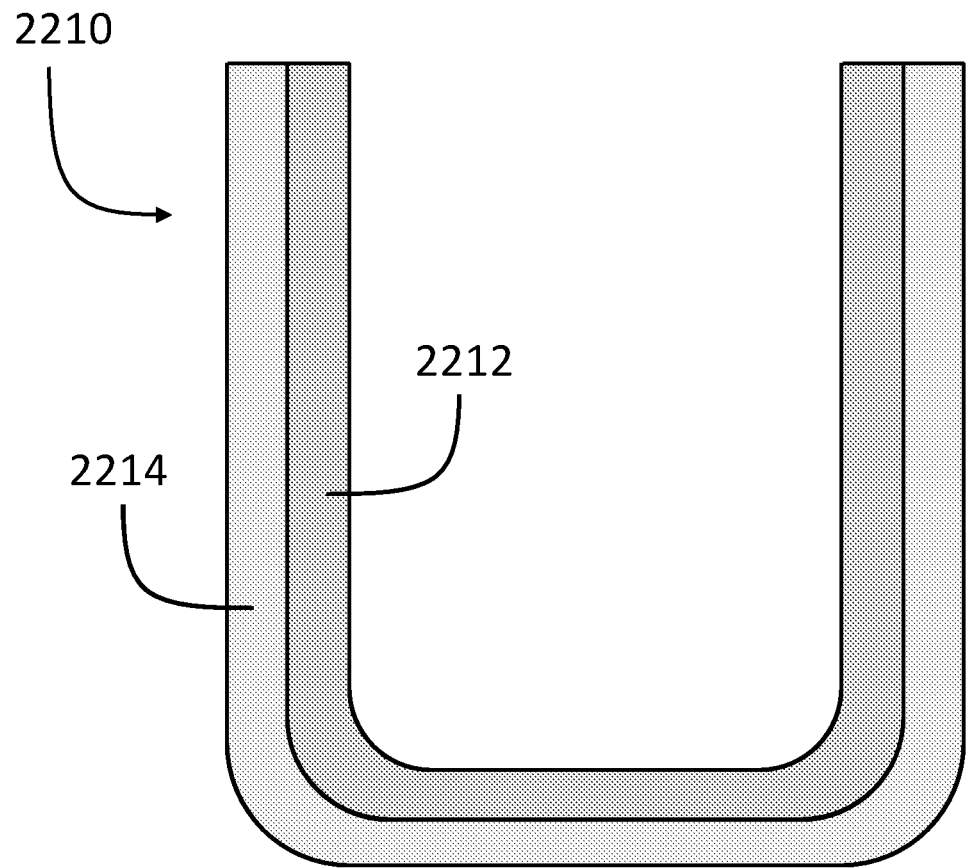
FIG. 23 is a glass-to-glass laminate according to an aspect of the present disclosure.

FIG. 23 shows a glass-to-glass laminate 2210 where core glass 2212 may be an inside surface of a bent glass or container (e.g., pharmaceutical vial, baby bottle), with the clad glass 2214 facing outward. The glasses 2212, 2214 may be fusion formed as a tube, cut, and reshaped or otherwise modified at the net lower stress state, and then subsequently influence of HTCTE may be relaxed away and the glass-to-glass laminate 2210 may correspondingly strengthen.

Figure 24:
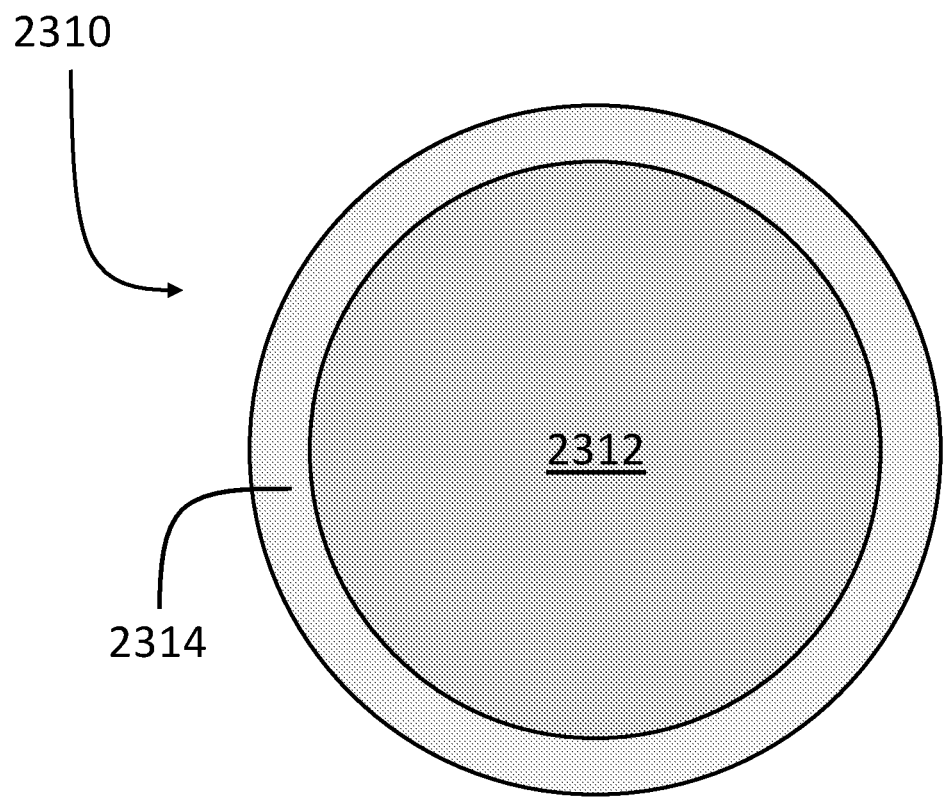
FIG. 24 is another glass-to-glass laminate according to an aspect of the present disclosure.

Or, the core and clad glasses 2312, 2314 a glass-to-glass laminate 2310 may not necessarily be arranged in layers, but instead one surrounding the other for example. According to such an aspect, FIG. 24 shows the glass-to-glass laminate 2310 as a sphere, where the interior is the core glass 2312 and the exterior is the clad glass 2314. Such an article may be polished at net lower stress and then subsequently heated to a higher stress state, as demonstrated by the pair CB examples. Applicants contemplate that such glass-to-glass laminates may be formed without a fusion draw, such as instead by float process, blown glass, or other methods of manufacturing. Further, Applicant contemplate that more intricate stress profiles can be achieved by additionally pairing (i.e. fusing to one another) third, fourth, fifth, etc. glasses with CTE curves that intersect one another and subsequently relaxing HTCTE imparted portions of corresponding stresses.

Figure 25:
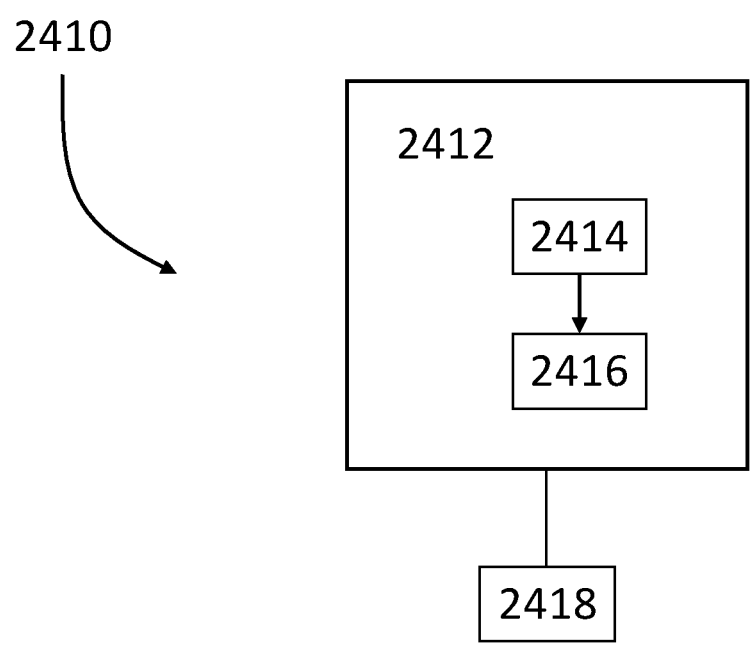
FIG. 25-27 are flowchart diagrams for methods of manufacturing according to aspects of the present disclosure.

According to a first aspect A1' as shown in FIG. 25, a method 2410 of manufacturing a strengthened glass article includes (e.g., comprises) increasing 2412 by at least a threshold compressive stress of a clad glass (e.g., 5 MPa, 10 MPa, 20 MPa, 25 MPa, 30 MPa, 50 MPa, 80 MPa, 100 MPa, 150 MPa, 200 MPa) in a laminate (see, e.g., FIGS. 1, 23-24) including a core glass fused to the clad glass by heating up 2414 the laminate from below a lower threshold temperature (e.g., 50° C., 80° C., 100° C., 150° C., 200° C., 250° C., 300° C.) to above the lower threshold temperature but below an upper threshold temperature (e.g., 300° C., 400° C., 450° C., 500° C., 550° C., 600° C., 700° C., 800° C.) and having 2416 the laminate above the lower threshold temperature but below the upper threshold temperature for longer than a threshold time (e.g., 30 minutes, 1 hour, 2 hours, 4 hours, 6 hours, 8 hours, 12 hours, 18 hours, 24 hours, 48 hours, 72 hours, 96 hours, 200 hours, two weeks), which may be in aggregate of several subset treatments shorter than the threshold time. Curves of coefficient of thermal expansion (y-axis) as a function of temperature (x-axis) of the core and clad glasses (i.e. CTE curves of the same compositions as the core and clad glasses) intersect one another above a lower bound (e.g., 50° C., 80° C., 100° C., 150° C., 200° C., 250° C., 300° C.) but below an upper bound (e.g., 600° C., 700° C., 800° C., 900° C., 1000° C., 1250° C., lower $10^{11}$ poise temperature of the core or the clad glasses).

According to an aspect A2', at least some of the heating of the of aspect A1' occurs with the laminate outside of a salt bath, such as in a furnace with gaseous environment, such as >90% argon by volume or another inert gas. According to an aspect A3', at least some of the heating of the aspect A1' occurs in a gaseous environment comprising greater than 70% nitrogen and greater than 15% oxygen by volume, such as air.

According to an aspect A4', the increasing of aspect A1', A2', or A3' is by at least 50 MPa. According to an aspect A5', the increasing of aspect A1' is by at least 100 MPa. According to an aspect A6', method of aspect A4' or A5', further includes additionally increasing 2418 (FIG. 25) compressive stress of the clad glass by ion-exchange chemical tempering.

According to an aspect A7', the threshold time of any one of aspects A1' to A6' is continuous as opposed to broken up into segments that add to longer than an hour in aggregate.

Figure 26:
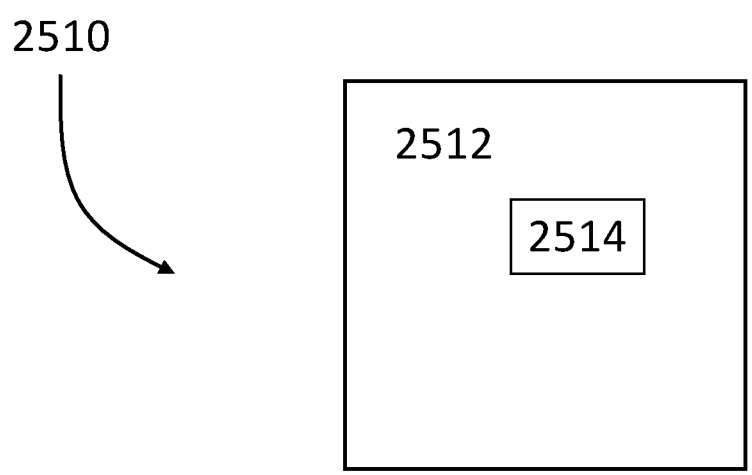
Figure 27:
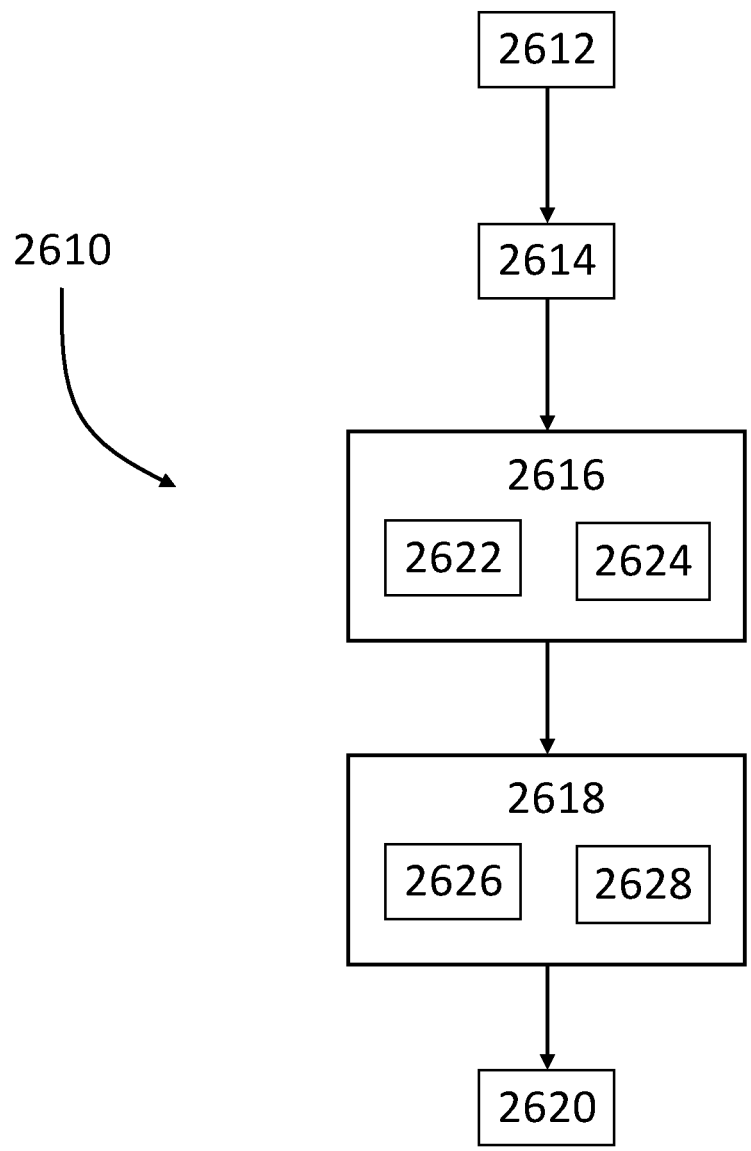

According to an aspect B1' as shown in FIG. 26', a method of manufacturing 2510 a strengthened glass article includes relaxing 2512 stresses, in a laminate comprising a core glass fused to a clad glass, corresponding to differences in high-temperature coefficients of thermal expansion of the clad and core glasses, while preserving stresses corresponding to differences in low-temperature coefficients of thermal expansion of the clad and core glasses to apply a compressive stress on the clad glass. The compressive stress applied by the relaxing is at least a threshold (e.g., 5 MPa, 10 MPa, 20 MPa, 25 MPa, 30 MPa, 50 MPa, 80 MPa, 100 MPa, 150 MPa, 200 MPa).

According to an aspect B2', the relaxing of aspect B1' includes heating up 2514 the laminate.

According to an aspect C1', a method of manufacturing 2610 a strengthened glass article includes forming 2612 a glass-to-glass laminate by fusing clad and core glasses to one another, where the clad glass has a greater high-temperature coefficient of thermal expansion (HTCTE) than the core glass but a lesser low-temperature coefficient of thermal expansion (LTCTE) than the core glass. The method further includes cooling 2614 the glass-to-glass laminate to impart stresses through contraction mismatch between the clad and core glasses, where stresses in the glass-to-glass laminate from differences in the HTCTE of the clad and core glasses at least partially offset stresses in the glass-to-glass laminate from differences in the LTCTE of the clad and core glasses. After the cooling 2614, the method includes modifying 2616 geometry of the laminate (e.g., cutting, polishing, sigulating, bending, scoring). After the modifying 2616, the method includes relaxing 2618 at least some of the stresses in the glass-to-glass laminate from differences in the HTCTE of the clad and core glasses such that the stresses in the glass-to-glass laminate from differences in the LTCTE of the clad and core glasses change (e.g., increases tensile or compressive) stresses in the clad glass by at least a threshold (e.g., 5 MPa, 10 MPa, 20 MPa, 25 MPa, 30 MPa, 50 MPa, 80 MPa, 100 MPa, 150 MPa, 200 MPa) from before the relaxing.

According to an aspect C2', the modifying of the method of aspect C1' increases compressive stresses in the clad glass by at least the threshold.

According to an aspect C3', the method of aspect C1' or C2' further includes exchanging 2620 ions of the clad glass with larger ions to further increase compressive stress of the clad glass beyond the relaxing.

According to an aspect C4', at least a portion of the relaxing of the method of aspect C1' occurs after the exchanging ions of aspect C3'.

According to an aspect C5', at least a portion of the relaxing of the method of any one of aspects C1' to C4' occurs in a gaseous environment.

According to an aspect C6', the modifying 2616 of the method of any one of aspects C1' to C5' comprises cutting 2622 the laminate.

According to an aspect C7', the modifying 2616 of the method of aspect C1' comprises polishing 2624 edges of the laminate in addition to the cutting of aspect C6'.

According to an aspect C8', the relaxing 2618 of the method of any one of aspects C1' to C7' comprises having 2626 the laminate above a lower threshold temperature (e.g., 50° C., 80° C., 100° C., 150° C., 200° C., 250° C., 300° C., and/or any temperature enumerated in FIGS. 15 and 21) to below an upper threshold temperature (e.g., 300° C., 400° C., 450° C., 500° C., 550° C., 600° C., 700° C., 800° C., and/or any temperature enumerated in FIGS. 15 and 21) for longer than a threshold time (e.g., 30 minutes, 1 hour, 2 hours, 4 hours, 6 hours, 8 hours, 12 hours, 18 hours, and/or any time enumerated in FIGS. 16-19).

According to an aspect C9', the relaxing 2618 of the method of aspect C1' further comprises heating 2628 up the laminate from below the lower threshold temperature of aspect C8' to above another threshold temperature, which may be the lower threshold temperature, prior to the having of aspect C8'.

According to an aspect C10', the aggregate time of the having 2626 the laminate above the lower threshold temperature and below an upper threshold temperature of aspect C8' is greater than a longer threshold time than specified for aspect C8' (e.g., 24 hours, 48 hours, 72 hours, 96 hours, 200 hours, two weeks, and/or any time enumerated in FIGS. 16-19).

According to an aspect D1', a glass-to-glass laminate article (see, e.g., articles 100, 2210, 2310 FIGS. 1, 23-24) includes a clad glass (see, e.g., clad glass 104a, 104b, 2214, 2314 FIGS. 1, 23-24), and a core glass (see, e.g., core glass 102, 2212, 2312 FIGS. 1, 23-24) fused to the clad glass. Compressive stress of the clad glass is less than a first stress (e.g., 25 MPa, 50, MPa, 75 MPa, 100 MPa, 150 MPa, 200 MPa, 400 MPa). However, the core and clad glasses are configured such that heating the laminate to a specific temperature (e.g., 50° C., 80° C., 100° C., 150° C., 200° C., 250° C., 300° C., 400° C., 410° C., 450° C., 500° C., 550° C., 600° C., 700° C., 800° C., and/or any temperature enumerated in FIGS. 15 and 21) for a specific amount of time (e.g., 2 hours, 4 hours, 6 hours, 10 hours, 12 hours, 18 hours, 21 hours, 24 hours, 36 hours, 48 hours, 3 days, 5 days, and/or any time enumerated in FIGS. 16-19) in air (e.g., roughly 78 mol % nitrogen, 21 mol % oxygen, 1 mol % argon, with small amounts of other gases such as carbon dioxide) increases the compressive stress by at least an amount of compressive stress (e.g., 5 MPa, 10 MPa, 20 MPa, 25 MPa, 50, MPa, 75 MPa, 100 MPa, 150 MPa, 200 MPa, 400 MPa) beyond the first stress.

According to an aspect D2', the core and clad glasses of aspect D1' are configured such that heating the laminate to the specific temperature for the specific amount of time in air increases compressive stress of the clad glass by more than the amount of compressive stress of aspect D1'.

According to an aspect E1', a glass-to-glass laminate article (see, e.g., articles 100, 2210, 2310 FIGS. 1, 23-24) includes a clad glass (see, e.g., clad glass 104a, 104b, 2214, 2314 FIGS. 1, 23-24), and a core glass (see, e.g., core glass 102, 2212, 2312 FIGS. 1, 23-24) fused to the clad glass. Curves of coefficient of thermal expansion as a function of temperature (see, e.g., FIGS. 5, 7, 20) of the core and clad glasses intersect one another (see intersection I in FIG. 20) above a lower bound (e.g., 50° C., 80° C., 100° C., 150° C., 200° C., 250° C., 300° C., and/or any temperature enumerated in FIGS. 15 and 21) to below an upper bound (e.g., 500° C., 550° C., 600° C., 700° C., 800° C., 900° C., 1000° C., 1200° C., and/or any temperature enumerated in FIGS. 15 and 21). The core and clad glasses are configured such that heating the laminate to a specific temperature (e.g., 50° C., 80° C., 100° C., 150° C., 200° C., 250° C., 300° C., 400° C., 410° C., 450° C., 500° C., 550° C., 600° C., 700° C., 800° C., and/or any temperature enumerated in FIGS. 15 and 21) for a specific amount of time (e.g., 2 hours, 4 hours, 6 hours, 10 hours, 12 hours, 18 hours, 21 hours, 24 hours, 36 hours, 48 hours, 3 days, 5 days, and/or any time enumerated in FIGS. 16-19) in air (e.g., roughly 78 mol % nitrogen, 21 mol % oxygen, 1 mol % argon, with small amounts of other gases such as carbon dioxide) increases compressive stress of the clad glass but by less than an amount of stress (e.g., 5 MPa, 10 MPa, 20 MPa, 25 MPa, 50, MPa, 75 MPa, 100 MPa, 150 MPa, 200 MPa, 400 MPa).

According to an aspect F1', a glass-to-glass laminate article (see, e.g., articles 100, 2210, 2310 FIGS. 1, 23-24) includes a clad glass (see, e.g., clad glass 104a, 104b, 2214, 2314 FIGS. 1, 23-24), and a core glass (see, e.g., core glass 102, 2212, 2312 FIGS. 1, 23-24) fused to the clad glass. Curves of coefficient of thermal expansion as a function of temperature (see, e.g., FIGS. 5, 7, 20) of the core and clad glasses intersect one another (see intersection I in FIG. 20) above a lower bound (e.g., 50° C., 80° C., 100° C., 150° C., 200° C., 250° C., 300° C., and/or any temperature enumerated in FIGS. 15 and 21) to below an upper bound (e.g., 500° C., 550° C., 600° C., 700° C., 800° C., 900° C., 1000° C., 1200° C., and/or any temperature enumerated in FIGS. 15 and 21, and/or lower $10^{11}$ poise temperature of the core or the clad glasses). The core and clad glasses are configured such that heating the laminate to a specific temperature (e.g., 50° C., 80° C., 100° C., 150° C., 200° C., 250° C., 300° C., 400° C., 410° C., 450° C., 500° C., 550° C., 600° C., 700° C., 800° C., and/or any temperature enumerated in FIGS. 15 and 21) for a specific amount of time (e.g., 2 hours, 4 hours, 6 hours, 10 hours, 12 hours, 18 hours, 21 hours, 24 hours, 36 hours, 48 hours, 3 days, 5 days, and/or any time enumerated in FIGS. 16-19) in air (e.g., roughly 78 mol % nitrogen, 21 mol % oxygen, 1 mol % argon, with small amounts of other gases such as carbon dioxide) changes stress of the clad glass from what the stress of the clad glass was prior to the heating by an amount of stress (e.g., 5 MPa, 10 MPa, 20 MPa, 25 MPa, 50, MPa, 75 MPa, 80 MPa, 100 MPa, 150 MPa, 200 MPa, 400 MPa).

According to an aspect F2', wherein the core and clad glasses of aspect F1' are configured such that heating the laminate to the specific temperature for the specific amount of time in air changes stress of the clad glass by greater than specified with respect to aspect F1'.

According to an aspect G1', a glass-to-glass laminate article (see, e.g., articles 100, 2210, 2310 FIGS. 1, 23-24) includes a clad glass (see, e.g., clad glass 104a, 104b, 2214, 2314 FIGS. 1, 23-24), and a core glass (see, e.g., core glass 102, 2212, 2312 FIGS. 1, 23-24) fused to the clad glass. The clad glass has a compressive stress, and the core and clad glasses are configured such that heating the laminate to a specific temperature (e.g., 50° C., 80° C., 100° C., 150° C., 200° C., 250° C., 300° C., 400° C., 410° C., 450° C., 500° C., 550° C., 600° C., 700° C., 800° C., and/or any temperature enumerated in FIGS. 15 and 21) for a specific amount of time (e.g., 2 hours, 4 hours, 6 hours, 10 hours, 12 hours, 18 hours, 21 hours, 24 hours, 36 hours, 48 hours, 3 days, 5 days, and/or any time enumerated in FIGS. 16-19) in air increases the compressive stress by at least a percentage (e.g., 5%, 10%, 20%, 40%, 50%, 100%, 150%, 200%, 300%) of the compressive stress prior to the heating.

According to an aspect G2', the core and clad glasses of aspect G1' are configured such that heating the laminate to the specific temperature for the specific amount of time in air increases the compressive stress by a percentage greater than that specified in aspect G1.

According to an aspect H1', a glass-to-glass laminate article (see, e.g., articles 100, 2210, 2310 FIGS. 1, 23-24) includes a clad glass (see, e.g., clad glass 104a, 104b, 2214, 2314 FIGS. 1, 23-24) in compression and a core glass (see, e.g., core glass 102, 2212, 2312 FIGS. 1, 23-24) fused to the clad glass and in tension. The clad glass has greater high-temperature coefficient of thermal expansion (HTCTE) than the core glass, but a lesser low temperature coefficient of thermal expansion (LTCTE) than the core glass. The laminate is configured such that the clad glass is non-frangible, but would be frangible if compression in the clad glass were increased by an amount of stress less than a bound (e.g., 150 MPa, 100 MPa, 75 MPa, 50 MPa, 40 MPa, 30 MPa, 20 MPa, 15 MPa, 10 MPa).

According to an aspect I1', a method of manufacturing a strengthened glass article includes increasing by at least a threshold percentage (e.g., 5%, 10%, 20%, 40%, 50%, 100%, 150%, 200%, 300%) compressive stress of a clad glass in a laminate comprising a core glass fused to the clad glass by heating up the laminate from below a lower threshold temperature (e.g., 50° C., 80° C., 100° C., 150° C., 200° C., 250° C., 300° C.) to above the lower threshold temperature but below an upper threshold temperature (e.g., 300° C., 400° C., 450° C., 500° C., 550° C., 600° C., 700° C., 800° C.) and having the laminate above the lower threshold temperature but below the upper threshold temperature for longer than a threshold time (e.g., 30 minutes, 1 hour, 2 hours, 4 hours, 6 hours, 8 hours, 12 hours, 18 hours, 24 hours, 48 hours, 72 hours, 96 hours, 200 hours, two weeks), wherein the at least the threshold percentage increase is relative to a prior compressive stress in the clad, present before the heating up, such as after cooling below the lower threshold temperature following forming and/or after annealing. Curves of coefficient of thermal expansion (y-axis) as a function of temperature (x-axis) of the core and clad glasses (i.e. CTE curves of the same compositions as the core and clad glasses) intersect one another above a lower bound (e.g., 50° C., 80° C., 100° C., 150° C., 200° C., 250° C., 300° C.) but below an upper bound (e.g., 600° C., 700° C., 800° C., 900° C., 1000° C., 1250° C., the lower $10^{11}$ poise temperature of the core or the clad glasses). According to an aspect 12', the method of aspect I1' may include additionally increasing compressive stress of the clad glass by ion-exchange chemical tempering.

Construction and arrangements of the compositions, structures, assemblies, and articles, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. The order or sequence of any process, logical algorithm, or method steps may be varied or re-sequenced according to exemplary embodiments. Other substitutions, modifications, changes and omissions may also be made in the design, operating conditions and arrangement of the various exemplary embodiments without departing from the scope of the present inventive technology.

What is claimed is:

1. A method of manufacturing a strengthened glass article, comprising:
    increasing by at least 20 MPa compressive stress of a clad glass in a laminate comprising a core glass fused to the clad glass by heating up the laminate from below 100° C. to above 100° C. but below 600° C. and having the laminate above 100° C. but below 600° C. for longer than an hour,
    wherein curves of coefficient of thermal expansion (y-axis) as a function of temperature (x-axis) of the core and clad glasses intersect one another above 100° C. but below 600° C.

2. The method of claim 1, wherein at least some of the heating occurs with the laminate outside of a salt bath.

3. The method of claim 2, wherein the at least some of the heating occurs in a gaseous environment comprising greater than 70% nitrogen and greater than 15% oxygen by volume.

4. The method of claim 1, wherein the increasing is by at least 50 MPa.

5. The method of claim 4, wherein the increasing is by at least 100 MPa.

6. The method of claim 5, further comprising additionally increasing compressive stress of the clad glass by ion-exchange chemical tempering.

7. The method of claim 1, wherein the hour is continuous as opposed to broken up into segments that add to longer than an hour in aggregate.

8. A method of manufacturing a strengthened glass article, comprising:
    relaxing stresses, in a laminate comprising a core glass fused to a clad glass, corresponding to differences in high-temperature coefficients of thermal expansion of the clad and core glasses while preserving stresses corresponding to differences in low-temperature coefficients of thermal expansion of the clad and core glasses to apply a compressive stress on the clad glass,
    wherein the compressive stress applied by the relaxing is at least 20 MPa.

9. The method of claim 8, wherein the relaxing comprises heating up the laminate.

10. The method of claim 8, further comprising additionally increasing compressive stress of the clad glass by ion-exchange chemical tempering.

11. The method of claim 8, wherein curves of coefficient of thermal expansion (y-axis) as a function of temperature (x-axis) of the core and clad glasses intersect one another above 200° C. but below a $10^{11}$ poise temperature of both the core and clad glasses if the $10^{11}$ poise temperature of at least one of the core and clad glasses is less than 600° C.

12. A method of manufacturing a strengthened glass article, comprising:
    forming a glass-to-glass laminate by fusing clad and core glasses to one another, wherein the clad glass has a greater high-temperature coefficient of thermal expansion (HTCTE) than the core glass, but a lesser low-temperature coefficient of thermal expansion (LTCTE) than the core glass;
    cooling the glass-to-glass laminate to impart stresses through contraction mismatch between the clad and core glasses,
    wherein stresses in the glass-to-glass laminate from differences in the HTCTE of the clad and core glasses at least partially offset stresses in the glass-to-glass laminate from differences in the LTCTE of the clad and core glasses;
    after the cooling, modifying geometry of the laminate;
    after the modifying, relaxing at least some of the stresses in the glass-to-glass laminate from differences in the HTCTE of the clad and core glasses such that the stresses in the glass-to-glass laminate from differences in the LTCTE of the clad and core glasses change stresses in the clad glass by at least 20 MPa.

13. The method of claim 12, wherein the modifying increases compressive stresses in the clad glass by at least 20 MPa.

14. The method of claim 13, further comprising exchanging ions of the clad glass with larger ions to further increase compressive stress of the clad glass beyond the relaxing.

15. The method of claim 14, wherein at least a portion of the relaxing occurs after the exchanging ions.

16. The method of claim 14, wherein at least a portion of the relaxing occurs in a gaseous environment.

17. The method of claim 12, wherein the modifying comprises cutting the laminate.

18. The method of claim 17, wherein the modifying further comprises polishing edges of the laminate.

19. The method of claim 12, wherein the relaxing comprises having the laminate above 300° C. and below 600° C. for at least an hour.

20. The method of claim 19, wherein the relaxing further comprises heating up the laminate from below 100° C. to above 300° C.

21. The method of claim 19, wherein aggregate time having the laminate above 300° C. and below 600° C. is greater than 21 hours.

\* \* \* \* \*